United States Patent
Jung et al.

(10) Patent No.: US 10,880,824 B2
(45) Date of Patent: *Dec. 29, 2020

(54) METHOD OF TRANSMITTING PROXIMITY SERVICE DATA AND ELECTRONIC DEVICE FOR THE SAME

(71) Applicant: Samsung Electronics Co., Ltd., Gyeonggi-do (KR)

(72) Inventors: Bu-Seop Jung, Gyeonggi-do (KR);
Young-Kwan Chung, Seoul (KR);
Dong-Il Son, Gyeonggi-do (KR);
Yong-Hae Choi, Gyeonggi-do (KR);
Ju-Ho Kim, Gyeonggi-do (KR);
Christopher Kang, Gyeonggi-do (KR);
Hyuk Kang, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

This patent is subject to a terminal disclaimer.

(21) Appl. No.: 16/378,126

(22) Filed: Apr. 8, 2019

(65) Prior Publication Data
US 2019/0239149 A1     Aug. 1, 2019

Related U.S. Application Data

(63) Continuation of application No. 14/952,500, filed on Nov. 25, 2015, now Pat. No. 10,341,942.

(30) Foreign Application Priority Data

Nov. 26, 2014  (KR) ......................... 10-2014-0166517

(51) Int. Cl.
*H04W 48/10* (2009.01)
*H04W 48/16* (2009.01)
(Continued)

(52) U.S. Cl.
CPC ............. *H04W 48/16* (2013.01); *H04W 4/80* (2018.02); *H04W 8/005* (2013.01)

(58) Field of Classification Search
CPC . H04W 48/16; H04W 4/008; H04W 72/0446; H04W 8/005; H04W 4/80;
(Continued)

(56) References Cited

U.S. PATENT DOCUMENTS 9,143,413 B1 * 9/2015 Manku .................. H04L 43/045
2003/0105865 A1   6/2003 McCanne et al.
(Continued)

FOREIGN PATENT DOCUMENTS

JP   2009-207069    9/2009
KR   2002-0048399   6/2002
(Continued)

OTHER PUBLICATIONS

IEEE Computer Society, Part 11: Wireless LAN Medium Access Control (MAC) and Physical Layer (PHY) Specifications, Amendment 9: Interworking with External Networks.
(Continued)

*Primary Examiner* — Nathan S Taylor
(74) *Attorney, Agent, or Firm* — The Farrell Law Firm, P.C.

(57) ABSTRACT

An electronic device in a neighbor awareness networking (NAN) cluster is provided. The electronic device includes a wireless fidelity (Wi-Fi) transceiver; and a processor, coupled with the Wi-Fi transceiver, configured to perform a synchronization with at least one device in the NAN cluster, wherein the at least one device comprises an external electronic device, after performing the synchronization, receive, from the external electronic device through the Wi-Fi transceiver, a frame including first data within at least one discovery window (DW) among a plurality of DWs,
(Continued)

wherein the first data comprises channel information for second data, and time information for the second data, and based on the channel information and the time information, control the Wi-Fi transceiver to receive the second data at a channel corresponding to the channel information of the received first data during a time duration corresponding to the time information of the received first data.

24 Claims, 40 Drawing Sheets

(51) Int. Cl.
    *H04W 8/00*         (2009.01)
    *H04W 4/80*         (2018.01)
(58) Field of Classification Search
    CPC ......... H04W 4/00; H04W 72/04; H04W 4/20;
                                H04W 88/02; H04W 8/26
    USPC ....................................................... 455/452.1
    See application file for complete search history.

(56) References Cited

U.S. PATENT DOCUMENTS

| | | | |
|---|---|---|---|
| 2003/0211862 A1 | 11/2003 | Hutchison, IV et al. | |
| 2006/0003775 A1 | 1/2006 | Bull et al. | |
| 2006/0046709 A1 | 3/2006 | Krumm et al. | |
| 2007/0141984 A1 | 6/2007 | Kuehnel et al. | |
| 2007/0141986 A1 | 6/2007 | Kuehnel et al. | |
| 2008/0084818 A1 | 4/2008 | Yoon et al. | |
| 2008/0130597 A1 | 6/2008 | Kalhan | |
| 2009/0157894 A1 | 6/2009 | Kim et al. | |
| 2009/0221271 A1 | 9/2009 | Soma et al. | |
| 2009/0318151 A1* | 12/2009 | Jung | H04W 36/32 455/436 |
| 2010/0086079 A1* | 4/2010 | Jung | H04L 27/0006 375/295 |
| 2010/0110930 A1* | 5/2010 | Kohvakka | H04W 56/0025 370/254 |
| 2010/0313219 A1* | 12/2010 | Jung | H04N 7/17318 725/39 |
| 2011/0075031 A1* | 3/2011 | Jung | H04N 5/45 348/565 |
| 2011/0150107 A1* | 6/2011 | Jung | H04W 52/0216 375/259 |
| 2011/0161700 A1* | 6/2011 | Jung | G06F 1/3206 713/320 |
| 2012/0221955 A1* | 8/2012 | Raleigh | H04M 15/00 715/736 |
| 2012/0229677 A1* | 9/2012 | Ugawa | H04N 5/23232 348/234 |
| 2013/0034023 A1* | 2/2013 | Jung | H04L 67/104 370/255 |
| 2013/0065627 A1* | 3/2013 | Jung | H04W 76/15 455/515 |
| 2013/0100855 A1* | 4/2013 | Jung | H04W 12/06 370/254 |
| 2013/0148545 A1* | 6/2013 | Jung | H04W 48/16 370/255 |
| 2013/0170482 A1* | 7/2013 | Jung | H04W 8/005 370/338 |
| 2013/0242805 A1* | 9/2013 | Jung | H04W 4/08 370/255 |
| 2014/0056220 A1* | 2/2014 | Poitau | H04W 76/14 370/328 |
| 2014/0078950 A1* | 3/2014 | Jung | H04W 52/0235 370/311 |
| 2014/0082205 A1* | 3/2014 | Abraham | H04W 8/005 709/227 |
| 2014/0082213 A1* | 3/2014 | Jung | H04L 67/06 709/235 |
| 2014/0112189 A1* | 4/2014 | Abraham | H04L 67/16 370/254 |
| 2014/0140288 A1* | 5/2014 | Jung | H04W 48/16 370/329 |
| 2014/0140332 A1* | 5/2014 | Jung | H04W 48/20 370/338 |
| 2014/0143435 A1* | 5/2014 | Jung | H04W 4/18 709/228 |
| 2014/0198725 A1* | 7/2014 | Abraham | H04W 76/00 370/328 |
| 2014/0235167 A1* | 8/2014 | Jung | H04W 76/10 455/41.2 |
| 2014/0241271 A1* | 8/2014 | Jung | H04L 61/2015 370/329 |
| 2014/0254426 A1* | 9/2014 | Abraham | H04W 48/10 370/254 |
| 2014/0254479 A1* | 9/2014 | Abraham | H04W 4/70 370/328 |
| 2014/0269555 A1* | 9/2014 | Sadasivam | H04W 72/0406 370/329 |
| 2014/0295762 A1* | 10/2014 | Jung | H04W 48/16 455/41.2 |
| 2015/0036540 A1* | 2/2015 | Kasslin | H04W 48/18 370/254 |
| 2015/0062410 A1* | 3/2015 | Kim | H04N 5/2353 348/362 |
| 2015/0065126 A1* | 3/2015 | Jung | H04W 48/16 455/434 |
| 2015/0071121 A1* | 3/2015 | Patil | H04W 40/24 370/255 |
| 2015/0092584 A1* | 4/2015 | Jung | H04W 52/00 370/252 |
| 2015/0099513 A1* | 4/2015 | Jung | H04W 48/20 455/432.1 |
| 2015/0103708 A1* | 4/2015 | Kang | H04W 72/0433 370/311 |
| 2015/0120504 A1* | 4/2015 | Todasco | G06Q 20/322 705/26.61 |
| 2015/0131529 A1* | 5/2015 | Zhou | H04W 8/005 370/328 |
| 2015/0143473 A1* | 5/2015 | Jung | H04W 12/06 726/4 |
| 2015/0146705 A1* | 5/2015 | Kwon | H04W 52/0277 370/338 |
| 2015/0200811 A1* | 7/2015 | Kasslin | H04L 41/12 370/254 |
| 2015/0312762 A1* | 10/2015 | Hernandez | H04W 12/06 455/41.2 |
| 2016/0005229 A1* | 1/2016 | Lee | G06F 3/0488 345/419 |
| 2016/0029215 A1* | 1/2016 | Jung | H04W 12/06 713/168 |
| 2016/0037335 A1* | 2/2016 | Jung | H04W 48/16 709/217 |
| 2016/0061933 A1* | 3/2016 | Chung | H04W 4/023 455/456.1 |
| 2016/0066255 A1* | 3/2016 | Marinier | H04W 48/16 370/350 |
| 2016/0150357 A1* | 5/2016 | Jung | H04W 52/0206 455/41.1 |
| 2016/0150392 A1* | 5/2016 | Jung | H04W 8/005 455/450 |
| 2016/0150465 A1* | 5/2016 | Jung | H04W 48/16 370/254 |
| 2016/0150466 A1* | 5/2016 | Jung | H04W 8/005 455/434 |
| 2016/0150537 A1* | 5/2016 | Jung | H04W 48/16 455/452.1 |
| 2016/0150582 A1* | 5/2016 | Jung | H04W 4/70 455/41.1 |
| 2016/0183037 A1* | 6/2016 | Grohman | H04W 4/30 709/221 |
| 2016/0323156 A1* | 11/2016 | Zakaria | H04L 43/04 |
| 2017/0006643 A1* | 1/2017 | Zakaria | H04W 4/70 |
| 2017/0034799 A1* | 2/2017 | Kim | H04W 56/00 |
| 2017/0195959 A1* | 7/2017 | Park | H04W 84/12 |

(56) References Cited

U.S. PATENT DOCUMENTS

2017/0279585 A1* 9/2017 Yang ................... H04L 5/005
2017/0295554 A1* 10/2017 Lee .................... H04J 11/00
2017/0311344 A1* 10/2017 Lee .................... H04W 56/00

FOREIGN PATENT DOCUMENTS

| KR | 10-2005-0000534 | 1/2005 |
| KR | 1020060047806 | 5/2006 |
| KR | 10-2008-0021651 | 3/2008 |
| KR | 10-2008-0085144 | 9/2008 |
| KR | 10-2008-0085843 | 9/2008 |
| KR | 10-2009-0031784 | 3/2009 |
| KR | 10-2009-0065132 | 6/2009 |
| KR | 10-2009-0091797 | 8/2009 |
| KR | 1020140011219 | 1/2014 |

OTHER PUBLICATIONS

IEEE Std 802.11u™—2011, Sponsored by the LAN/MAN Standards Committee, Feb. 25, 2011.
Korean Office Action dated Jul. 24, 2020 issued in counterpart application No. 10-2014-0166517, 14 pages.
KR Notice of Patent Grant dated Oct. 26, 2020 issued in counterpart application No. 10-2014-0166517, 5 pages.

* cited by examiner

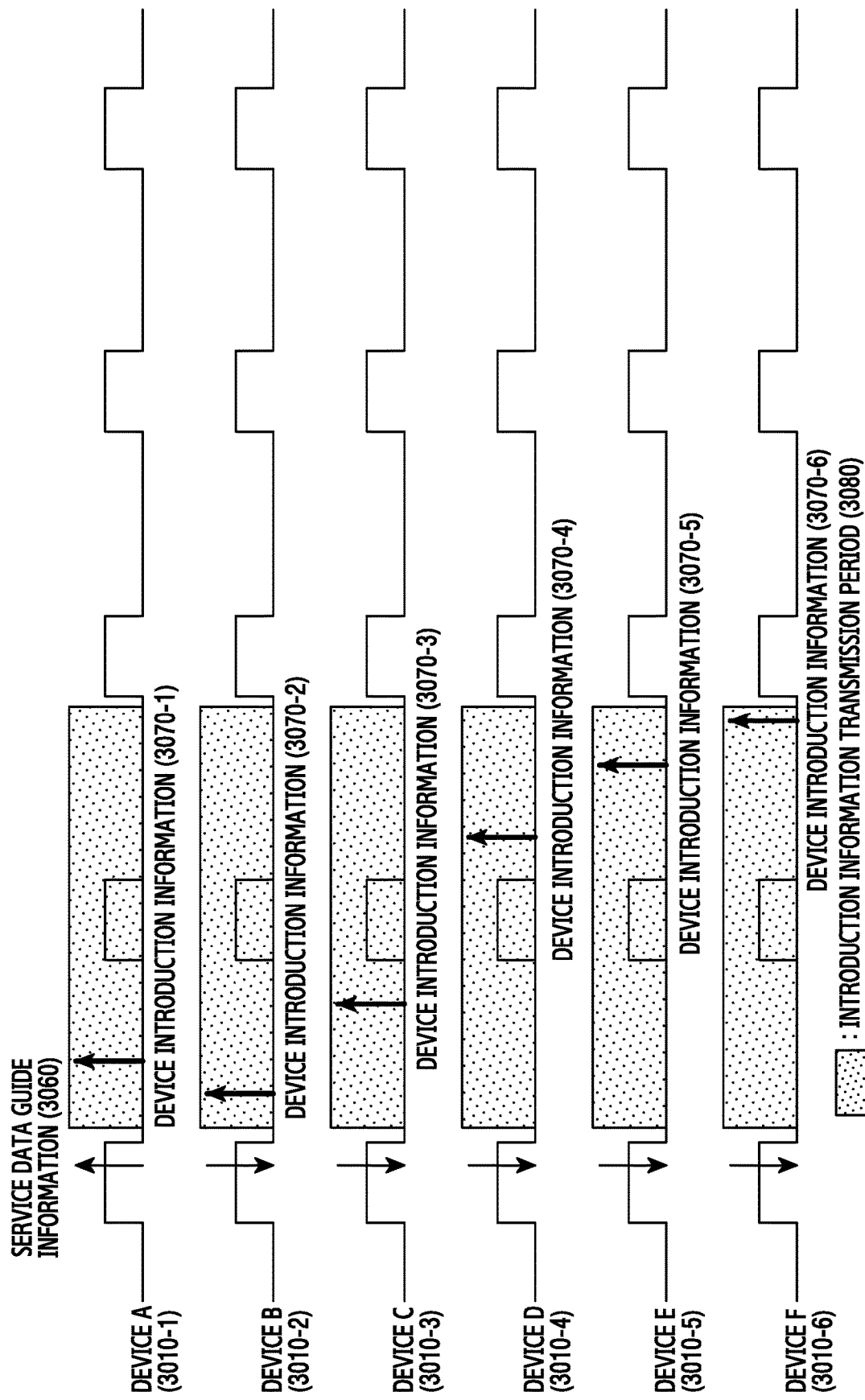

METHOD OF TRANSMITTING PROXIMITY SERVICE DATA AND ELECTRONIC DEVICE FOR THE SAME

PRIORITY

This application is a Continuation of and claims priority under 35 U.S.C. § 120 to a United States Patent Application filed on Nov. 25, 2015 in the United States Patent and Trademark Office and assigned Ser. No. 14/952,500, which claimed priority under 35 U.S.C. § 119(a) to a Korean Patent Application filed on Nov. 26, 2014 in the Korean Intellectual Property Office and assigned Serial No. 10-2014-0166517, the entire contents of each of which are incorporated herein by reference.

BACKGROUND

1. Field of the Disclosure

The present disclosure relates generally to a method of transmitting proximity service data and a device for the same, and more particularly, to a device and method for providing high-capacity data through a proximity service in an electronic device.

2. Description of the Related Art

Recently, there has been an increase in the development of various proximity-based services utilizing a short-range communication method. An example of a representative method is low-power proximity utilization that uses a Bluetooth low energy (BLE) beacon. An advertisement service may be provided by utilizing a proximity service in which devices near each other share various types of information through low-power BLE beacon transmission.

In general, a proximity service is provided through low-power communication. Therefore, data transferred through a proximity service generally contains low-capacity data, such as a small-sized image, text, etc.

SUMMARY

Due to the low-power characteristic of a proximity service, there is a limit on service capacity that is transferred. Accordingly, information transferred through a proximity service is limited to small-sized data, such as a low-capacity image, text, a uniform resource locator (URL), etc. In order to send a high-capacity image, multimedia data, and other differentiated service data through a proximity service, data transmission must be made through a short-range communication connection between a transmitting device and a receiving device that provides the proximity service. However, in the case of an advertisement system targeting a plurality of receiving devices, transmission efficiency and network efficiency may deteriorate by simultaneously connecting the plurality of devices and transmitting data, and as a result, usability may be hampered.

An aspect of the present disclosure provides a device and method for providing high-capacity data through a proximity service in an electronic device.

Another aspect of the present disclosure provides a device and method for efficiently transmitting proximity service data in an electronic device. Another aspect of the present disclosure provides a device and method for providing information on second data with higher capacity through first data with lower capacity in an electronic device.

Another aspect of the present disclosure provides an electronic device that can provide a multi-step proximity service capable of simultaneously transmitting differentiated additional service information and high-capacity multimedia proximity service data to a plurality of surrounding electronic devices.

Another aspect of the present disclosure provides a device that performs a proximity-based advertisement can increase usability by performing a more precise and differentiated advertisement.

Another aspect of the present disclosure provides a determination as to whether to receive additional proximity service data can be made according to receiving devices, thereby providing a selective proximity service.

Another aspect of the present disclosure provides various proximity services targeting a plurality of surrounding devices can be provided that can be efficiently performed irrespective of the number of receiving devices due to an operation based on multicasting.

According to an aspect of the present disclose, an electronic device in a neighbor awareness networking (NAN) cluster is provided. The electronic device includes a wireless fidelity (Wi-Fi) transceiver; and a processor, coupled with the Wi-Fi transceiver, configured to perform a synchronization with at least one device in the NAN cluster, wherein the at least one device comprises an external electronic device, after performing the synchronization, receive, from the external electronic device through the Wi-Fi transceiver, a frame including first data within at least one discovery window (DW) among a plurality of DWs, wherein the first data comprises channel information for second data, and time information for the second data, and based on the channel information and the time information, control the Wi-Fi transceiver to receive the second data at a channel corresponding to the channel information of the received first data during a time duration corresponding to the time information of the received first data.

According to another aspect of the present disclosure, an electronic device in a NAN cluster. The electronic device includes a Wi-Fi transceiver; and a processor, coupled with the Wi-Fi transceiver, configured to perform a synchronization with at least one device in the NAN cluster, after performing the synchronization, transmit, to the at least one device through the Wi-Fi transceiver, a frame including first data within at least one DW among a plurality of DWs, wherein the first data comprises channel information for second data, and time information for the second data, and based on the channel information and the time information, control the Wi-Fi transceiver to transmit the second data at a channel corresponding to the channel information of the received first data during a time duration corresponding to the time information of the received first data.

BRIEF DESCRIPTION OF THE DRAWINGS

The above and other aspects, features, and advantages of the present disclosure will be more apparent from the following detailed description, taken in conjunction with the accompanying drawings, in which:

FIGS. 30A and 30B are diagrams of proximity service data transfer according to an embodiment of the present disclosure;

DETAILED DESCRIPTION OF EMBODIMENTS OF THE PRESENT DISCLOSURE

Figure 1:
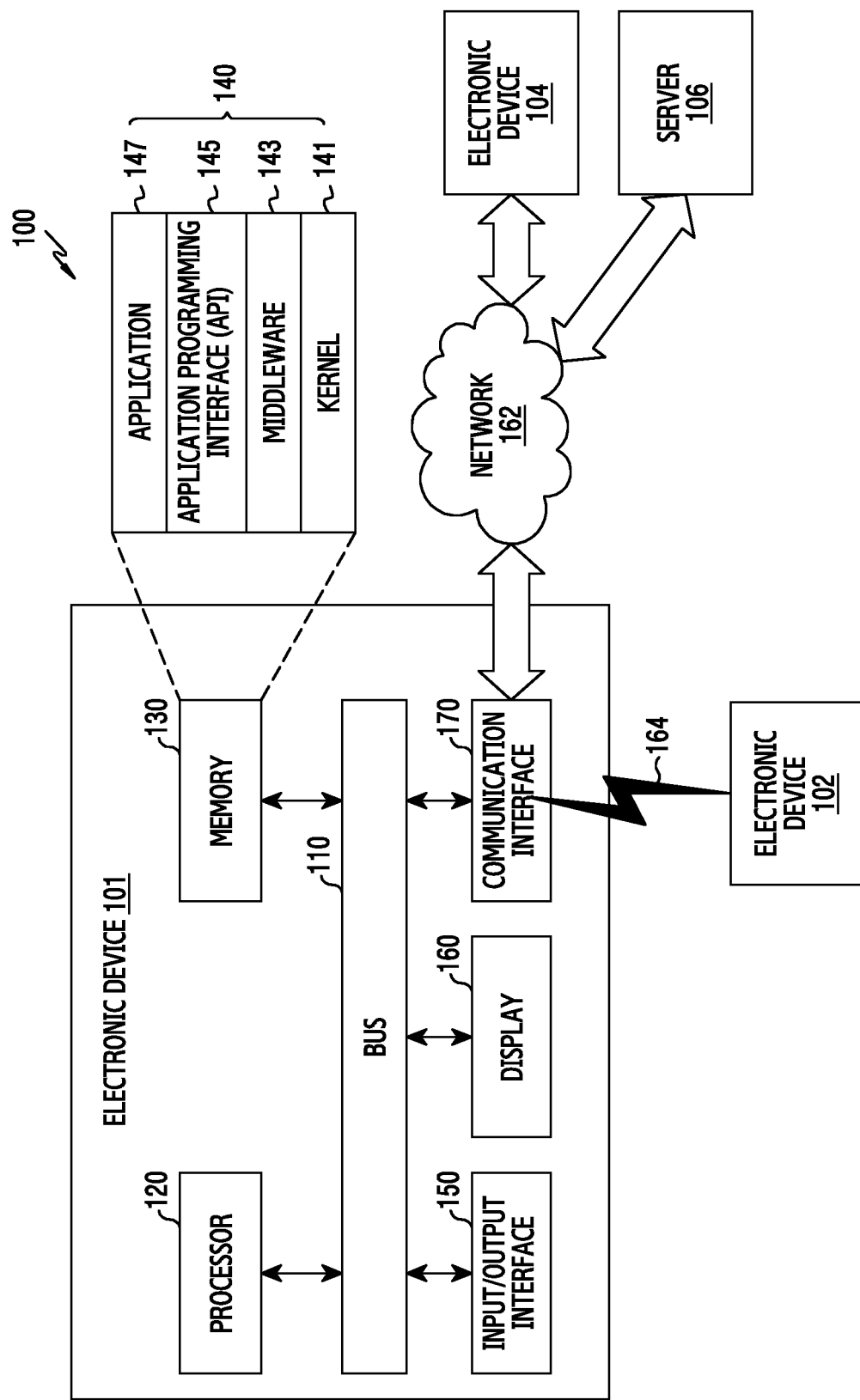
FIG. 1 is a block diagram of a network environment including an electronic device according to an embodiment of the present disclosure.

Hereinafter, various embodiments of the present disclosure are described with reference to the accompanying drawings. In the following description, certain details such as detailed configuration and components are provided merely to facilitate understanding of an embodiment of the present disclosure. Therefore, it should be apparent to those skilled in the art that various changes and modifications of an embodiment of the present disclosure described herein may be made without departing from the scope and spirit of the present disclosure. In addition, descriptions of well-known functions and constructions are omitted for clarity and conciseness.

The present disclosure may include various embodiments, and modifications and changes may be made thereto. Therefore, the present disclosure is described in detail with reference to certain embodiments of the present disclosure shown in the accompanying drawings. However, it should be understood that the present disclosure is not limited to the particular embodiments of the present disclosure, but includes all modifications/changes, equivalents, and/or alternatives falling within the scope and spirit of the present disclosure, as defined by the appended claims and their equivalents. In describing the accompanying drawings, similar reference numerals may be used to designate similar elements.

The terms "have," "may have," "include," or "may include" used in the present disclosure indicate the presence of disclosed corresponding functions, operations, elements, and the like, but do not limit additional one or more functions, operations, elements, and the like. In addition, it should be understood that the terms "include" or "have" used in the present disclosure indicate the presence of features, numbers, steps, operations, elements, parts, or a combination thereof described in the present disclosure, but do not preclude the presence or addition of one or more other features, numbers, steps, operations, elements, parts, or a combination thereof.

The terms "A or B," "at least one of A and/or B" or "one or more of A and/or B" used in the present disclosure include any and all combinations of the words enumerated with them. For example, "A or B," "at least one of A and B" or "at least one of A or B" indicates (1) including at least one A, (2) including at least one B, or (3) including both at least one A and at least one B.

Although the terms such as "first" and "second" used in an embodiment of the present disclosure may modify various elements of the embodiments, these terms do not limit the corresponding elements. For example, these terms do not limit an order and/or the importance of the corresponding elements. These terms may be used for the purpose of distinguishing one element from another element. For example, a first user device and a second user device indicate user devices and may indicate different user devices. For example, a first element may be referred to as a second element without departing from the scope and spirit of the present disclosure, and similarly, a second element may be referred to as a first element.

It will be understood that when an element (e.g., a first element) is "connected to" or "(operatively or communicatively) coupled with/to" another element (e.g., a second element), the element may be directly connected or coupled to the other element, and there may be an intervening element (e.g., a third element) between the element and the other element. In contrast, it will be understood that when an element (e.g., the first element) is "directly connected" or "directly coupled" to another element (e.g., the second element), there is no intervening element (e.g., the third element) between the element and the other element.

The term "configured to (or set to)" used in the present disclosure may be replaced with "suitable for," "having the capacity to," "designed to," "adapted to," "made to," or "capable of" according to the situation. The term "configured to (or set to)" does not necessarily indicate "specifically designed to" in a hardware level. Instead, the term "apparatus configured to . . . " may indicate that the apparatus is "capable of . . . " along with other devices or parts in a certain situation. For example, "a processor configured to (or set to) perform A, B, and C" may be a dedicated processor, e.g., an embedded processor, for performing a corresponding operation, or a general purpose processor, e.g., a central processing unit (CPU) or an application processor (AP), capable of performing a corresponding operation by executing one or more software programs stored in a memory device.

The terms used herein merely describe certain embodiments of the present disclosure and are not intended to limit the present disclosure. As used herein, singular forms may include plural forms as well unless the context explicitly indicates otherwise. Further, all of the terms used herein are intended to be interpreted as having the same meanings as commonly understood by those skilled in the art to which the present disclosure pertains, and should not be interpreted to have ideal or excessively formal meanings unless explicitly defined in a certain embodiment of the present disclosure.

A module or programming module according to an embodiment of the present disclosure may further include at least one element among the aforementioned elements, may omit some of them, or may further include additional elements. Operations performed by a module, programming module, or other element according to an embodiment of the present disclosure may be executed in a sequential, parallel, repetitive, or heuristic manner. In addition, some of the operations may be executed in a different order or may be omitted, or other operations may be added.

In the embodiments of the present disclosure described above, the elements included in the present disclosure are expressed in singular or plural forms according to the proposed embodiments. However, the singular or plural expressions are selected to be suitable for proposed situations for convenience of description, and the present disclosure is not limited to the singular or plural elements. An element expressed in a plural form may be configured in a singular form, or an element expressed in a singular form may be configured in a plural form.

An electronic device according to an embodiment of the present disclosure may be a device. For example, the electronic device according to an embodiment of the present disclosure may include at least one of a smart phone; a tablet personal computer (PC); a mobile phone; a video phone; an electronic book (e-book) reader; a desktop PC; a laptop PC; a netbook computer; a workstation, a server, a personal digital assistant (PDA); a portable multimedia player (PMP); a moving picture experts group audio layer 3 (MP3) player; a mobile medical device; a camera; or a wearable device (e.g., a head-mount-device (HMD), electronic glasses, electronic clothing, an electronic bracelet, an electronic necklace, an electronic appcessory, an electronic tattoo, a smart mirror, or a smart watch).

In an embodiment of the present disclosure, an electronic device may be a smart home appliance. For example, a smart home appliance may include at least one of a television (TV); a digital video disk (DVD) player; an audio component;

a refrigerator; an air conditioner; a vacuum cleaner; an oven; a microwave oven; a washing machine; an air cleaner; a set-top box; a home automation control panel; a security control panel; a TV box (e.g., Samsung HomeSync®, Apple TV®, or Google TV); a game console (e.g., Xbox® PlayStation®); an electronic dictionary; an electronic key; a camcorder; or an electronic frame.

In an embodiment of the present disclosure, an electronic device may include at least one of a medical device (e.g., a mobile medical device (e.g., a blood glucose monitoring device, a heart rate monitor, a blood pressure monitoring device or a thermometer), a magnetic resonance angiography (MRA) machine, a magnetic resonance imaging (MRI) machine, a computed tomography (CT) scanner, or an ultrasound machine); a navigation device; a global positioning system (GPS) receiver; an event data recorder (EDR); a flight data recorder (FDR); an in-vehicle infotainment device; an electronic device for a ship (e.g., a ship navigation device and/or a gyrocompass); an avionics device; a security device; a head unit for a vehicle; an industrial or home robot; an automated teller machine (ATM) of a financial institution, a point of sale (POS) device at a retail store, or an internet of things (IoT) device (e.g., a lightbulb, various sensors, an electronic meter, a gas meter, a sprinkler, a fire alarm, a thermostat, a streetlamp, a toaster, sporting equipment, a hot-water tank, a heater, or a boiler and the like).

In an embodiment of the present disclosure, an electronic device may include at least one of a piece of furniture or a building/structure; an electronic board; an electronic signature receiving device; a projector; and various measuring instruments (e.g., a water meter, an electricity meter, a gas meter, or a wave meter).

An electronic device according to an embodiment of the present disclosure may also include a combination of one or more of the above-mentioned devices.

Further, it will be apparent to those skilled in the art that an electronic device according to an embodiment of the present disclosure is not limited to the above-mentioned devices.

Herein, the term "user" may indicate a person who uses an electronic device or a device (e.g., an artificial intelligence electronic device) that uses the electronic device.

FIG. 1 is a block diagram of a network environment 100 including an electronic device 101 according to an embodiment of the present disclosure. The electronic device 101 in the network environment 100, according to an embodiment of the present disclosure, is described below with reference to FIG. 1.

Referring to FIG. 1, the electronic device 101 may include a bus 110, a processor 120, a memory 130, an input/output interface 150', a display 160, and a communication interface 170. In an embodiment of the present disclosure, at least one of the elements of the electronic device 101 may be omitted, or other elements may be included.

The bus 110 may include, for example, a circuit that interconnects the elements 110 to 170 and transfers communication (e.g., a control message and/or data) between the elements 110 to 170.

The processor 120 may include at least one or more of CPU, an AP, and a CP.

The processor 120 may, for example, perform an operation or process data under control of and/or in communication with at least one other element of the electronic device 101. For example, according to an embodiment of the present disclosure, the processor 120 may control to receive first proximity service data and receive second proximity service data using guide information required to receive the second proximity service data included in the first proximity service data. Alternatively, the processor 120 may control to transmit first proximity service data that includes guide information required to receive second proximity service data.

The memory 130 may include a volatile memory and/or a non-volatile memory. The memory 130 may store, for example, commands or data relating to at least one other element of the electronic device 101. According to an embodiment of the present disclosure, the memory 130 may store software and/or a program 140. The program 140 may include, for example, a kernel 141, middleware 143, an application programming interface (API) 145, and/or at least one application program (or "application") 147. At least some of the kernel 141, the middleware 143, and the API 145 may be referred to as an operating system (OS).

The kernel 141 may control or manage system resources (e.g., the bus 110, the processor 120, or the memory 130) used to execute an operation or function implemented in other programs (e.g., the middleware 143, the API 145, or the application 147). Furthermore, the kernel 141 may provide an interface by which the middleware 143, the API 145, or the application 147 may access the individual elements of the electronic device 101 to control or manage system resources.

The middleware 143 may, for example, serve as an intermediary that allows the API 145 or the application 147 to communicate with the kernel 141 to transmit/receive data. Furthermore, in regard to task requests received from the application 147, the middleware 143 may perform a control (e.g., scheduling or load balancing) on the task requests using, for example, a method of assigning a priority for using the system resources (e.g., the bus 110, the processor 120, or the memory 130) of the electronic device 101 to at least one application 147.

The API 145 is, for example, an interface by which the application 147 controls functions provided by the kernel 141 or the middleware 143, and may include, for example, at least one interface or function (e.g., a command) for file control, window control, image processing, or text control.

The input/output interface 150 may, for example, serve as an interface that can transfer commands or data input from a user or another external device to the other element(s) of the electronic device 101. Furthermore, the input/output interface 150 may output commands or data received from the other element(s) of the electronic device 101 to the user or the other external device.

The display 160 may include, for example, a liquid crystal display (LCD), a light emitting diode (LED) display, an organic light emitting diode (OLED) display, a micro electro mechanical system (MEMS) display, or an electronic paper display. The display 160 may, for example, display various types of content (e.g., text, images, videos, icons, or symbols) to a user. The display 160 may include a touch screen, and may receive, for example, a touch input, a gesture input, a proximity input, or a hovering input using an electronic pen or a part of a user's body.

The communication interface 170 may, for example, establish communication between the electronic device 101 and an external device (e.g., a first external electronic device 102, a second external electronic device 104, or a server 106). For example, the communication interface 170 may be connected to a network 162 through wireless or wired communication to communicate with the second external electronic device 104 or the server 106.

The wireless communication may use, for example, at least one of long term evolution (LTE), LTE advanced (LTE-A), code division multiple access (CDMA), wideband CDMA (WCDMA), universal mobile telecommunications system (UMTS), wireless broadband (WiBro), and global system for mobile communications (GSM), for example, as a cellular communication protocol. The wired communication may include, for example, at least one of a universal serial bus (USB), a high definition multimedia interface (HDMI), recommended standard 232 (RS-232), and a plain old telephone service (POTS). The network 162 may include a communication network, for example, at least one of a computer network (e.g., a local area network (LAN) or a wide area network (WAN)), the internet, and a telephone network.

Each of the first external electronic device 102 and the second external electronic device 104 may be the same as or different from the electronic device 101. According to an embodiment of the present disclosure, the server 106 may include a group of one or more servers. According to an embodiment of the present disclosure, all or some of the operations executed by the electronic device 101 may be executed by another electronic device or a plurality of electronic devices (e.g., the first external electronic device 102, the second external electronic device 104, or the server 106). According to an embodiment of the present disclosure, when the electronic device 101 must perform a function or service automatically or in response to a request, the electronic device 101 may request the first external electronic device 102, the second external electronic device 104, or the server 106 to perform at least one function relating to the at least one function or service, instead of or in addition to performing the at least one function or service itself. The first external electronic device 102, the second external electronic device 104, or the server 106 may perform the requested function or an additional function and transfer the result to the electronic device 101. The electronic device 101 may provide the requested function or service by processing the received result as is or in addition to the result. To accomplish this, for example, cloud computing, distributed computing, or a client-server computing method may be used.

Figure 2:
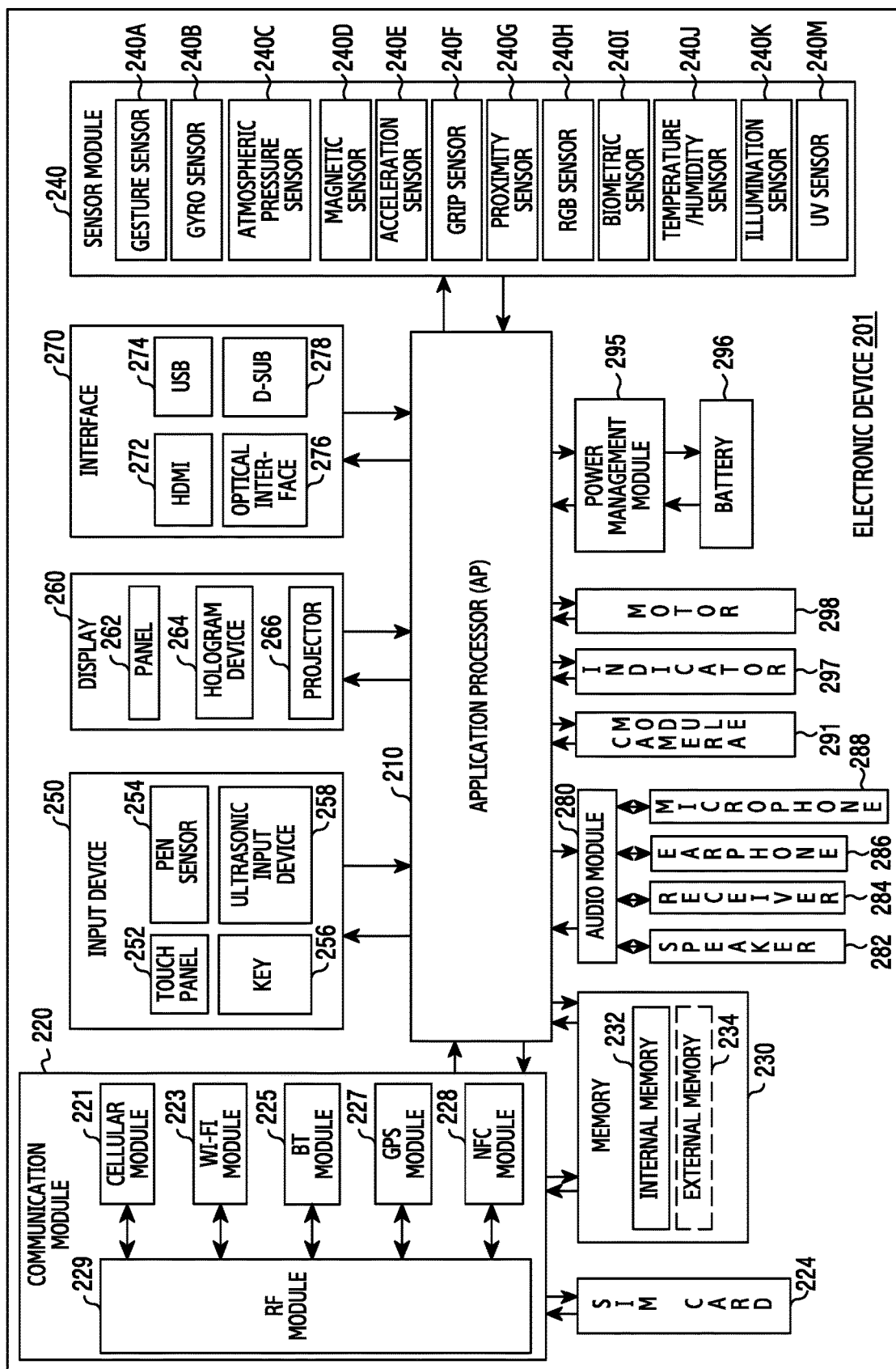
FIG. 2 is a block diagram of an electronic device according to an embodiment of the present disclosure.

FIG. 2 is a block diagram of an electronic device 201 according to an embodiment of the present disclosure.

Referring to FIG. 2, the electronic device 201 may include, for example, all or a part of the electronic device 101 illustrated in FIG. 1. The electronic device 201 may include at least one AP 210, a communication module 220, a subscriber identification module (SIM) card 224, a memory 230, a sensor module 240, an input device 250, a display 260, an interface 270, an audio module 280, a camera module 291, a power management module 295, a battery 296, an indicator 297, and a motor 298.

The AP 210 may, for example, control a plurality of hardware or software elements connected thereto and perform a variety of data processing and calculations by driving an operating system or application programs. The AP 210 may be implemented as, for example, a system on chip (SoC). According to an embodiment of the present disclosure, the AP 210 may further include a graphics processing unit (GPU) and/or an image signal processor. The AP 210 may include at least some of the elements (e.g., a cellular module 221) illustrated in FIG. 2. The AP 210 may load commands or data, received from at least one other element (e.g., a non-volatile memory), in a volatile memory to process the loaded commands or data, and may store various types of data in the non-volatile memory.

The communication module 220 may be configured the same as or similar to that of the communication interface 170 of FIG. 1. The communication module 220 may include, for example, the cellular module 221, a wireless fidelity (Wi-Fi) module 223, a Bluetooth (BT) module 225, a GPS module 227, a near field communication (NFC) module 228, and a radio frequency (RF) module 229. The communication module 220 provides a function of transmitting/receiving a signal. Accordingly, the communication module 220 may be referred to as a "receiver," a "transmitter," a "transmission and reception unit," a "communication unit," or the like.

The cellular module 221 may provide, for example, a voice call, a video call, a text message service, or an internet service through a communication network. According to an embodiment of the present disclosure, the cellular module 221 may distinguish and authenticate the electronic device 201 in the communication network by using the SIM card 224. According to an embodiment of the present disclosure, the cellular module 221 may perform at least some of the functions that the AP 210 may provide. According to an embodiment of the present disclosure, the cellular module 221 may include a CP.

The Wi-Fi module 223, the BT module 225, the GPS module 227, or the NFC module 228 may include, for example, a processor for processing data transmitted/received through the corresponding module. According to an embodiment of the present disclosure, at least some (e.g., two or more) of the cellular module 221, the Wi-Fi module 223, the BT module 225, the GPS module 227, and the NFC module 228 may be included in a single integrated circuit (IC) or IC package.

The RF module 229 may, for example, transmit/receive a communication signal (e.g., an RF signal). The RF module 229 may include, for example, a transceiver, a power amplifier module (PAM), a frequency filter, a low noise amplifier (LNA), or an antenna. According to another embodiment of the present disclosure, at least one of the cellular module 221, the Wi-Fi module 223, the BT module 225, the GPS module 227, and the NFC module 228 may transmit/receive an RF signal through a separate RF module.

The SIM card 224 may include, for example, an embedded SIM, and may further include unique identification information (e.g., an integrated circuit card identifier (IC-CID)) or subscriber information (e.g., an international mobile subscriber identity (IMSI)).

The memory 230 may include, for example, an internal memory 232 or an external memory 234. The internal memory 232 may include, for example, at least one of a volatile memory (e.g., a dynamic random access memory (DRAM), a static RAM (SRAM), a synchronous dynamic RAM (SDRAM), or the like) and a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), a hard disc drive, or a solid state drive (SSD)).

The external memory 234 may further include a flash drive, for example, a compact flash (CF) drive, a secure digital (SD) memory card, a micro secure digital (Micro-SD) memory card, a mini secure digital (Mini-SD) memory card, an extreme digital (xD) memory card, a memory stick, or the like. The external memory 234 may be functionally and/or physically connected to the electronic device 201 through various interfaces.

The sensor module 240 may, for example, measure a physical quantity or detect an operating state of the electronic device 201, and may convert the measured or detected information into an electrical signal. The sensor module 240 may include, for example, at least one of, a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red, green, and blue (RGB) sensor), a biometric sensor 240I, a temperature/humidity sensor 240J, an illumination sensor 240K, and a ultra violet (UV) light sensor 240M. Additionally or alternatively, the sensor module 240 may include an electronic nose (E-nose) sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling one or more sensors included therein. In an embodiment of the present disclosure, the electronic device 201 may further include a processor that is configured as a part of the AP 210 or a separate element from the AP 210 in order to control the sensor module 240, thereby controlling the sensor module 240 while the AP 210 is in a reduced power or sleep state.

The input device 250 may include, for example, a touch panel 252, a (digital) pen sensor 254, a key 256, or an ultrasonic input device 258. The touch panel 252 may include at least one of, for example, a capacitive type, a resistive type, an infrared type, and an ultrasonic type. In addition, the touch panel 252 may further include a control circuit. The touch panel 252 may further include a tactile layer to provide a tactile reaction to a user.

The (digital) pen sensor 254 may be, for example, a part of the touch panel 252, or may include a separate recognition sheet. The key 256 may include, for example, a physical button, an optical key, or a keypad. The ultrasonic input device 258 may identify data by detecting acoustic waves with a microphone (e.g., a microphone 288) of the electronic device 201 through an input unit for generating an ultrasonic signal.

The display 260 (e.g., the display 160 of FIG. 1) may include a panel 262, a hologram device 264, or a projector 266. The panel 262 may be configured the same as or similar to that of the display 160 of FIG. 1. The panel 262 may be implemented to be, for example, flexible, transparent, or wearable. The panel 262 may be configured as a single module integrated with the touch panel 252. The hologram device 264 may show a stereoscopic image in the air using the interference of light. The projector 266 may project light onto a screen to display an image. The screen may be located, for example, internal or external to the electronic device 201. According to an embodiment of the present disclosure, the display 260 may further include a control circuit for controlling the panel 262, the hologram device 264, or the projector 266.

The interface 270 may include, for example, a high-definition multimedia interface (HDMI) 272, a universal serial bus (USB) 274, an optical interface 276, or a D-sub-miniature (D-sub) connector 278. The interface 270 may be included in, for example, the communication interface 170 illustrated in FIG. 1. Additionally or alternatively, the interface 270 may include, for example, a mobile high-definition link (MHL) interface, a secure digital (SD) memory card/multi-media card (MMC) interface, or an Infrared Data Association (IrDA) standard interface.

The audio module 280 may, for example, convert a sound into an electrical signal, and vice versa. At least some elements of the audio module 280 may be included in, for example, the input/output interface 150 illustrated in FIG. 1. The audio module 280 may, for example, process sound information that is input or output through a speaker 282, a receiver 284, an earphone 286, the microphone 288, or the like.

The camera module 291 may be, for example, a device that can take a still image or a moving image, and according to an embodiment of the present disclosure, the camera module 291 may include one or more image sensors (e.g., a front sensor or a rear sensor), a lens, an image signal processor (ISP), or a flash (e.g., an LED or a xenon lamp).

The power management module 295 may, for example, manage power of the electronic device 201. According to an embodiment of the present disclosure, the power management module 295 may include a power management integrated circuit (PMIC), a charger integrated circuit (IC), or a battery gauge. The PMIC may include a wired and/or a wireless charging method. A wireless charging method may include, for example, a magnetic resonance method, a magnetic induction method, an electromagnetic method, and the like. Additional circuits (e.g., a coil loop, a resonance circuit, a rectifier, etc.) for wireless charging may be further included. The battery gauge may measure, for example, a residual quantity of the battery 296, and a voltage, a current, or a temperature while charging. The battery 296 may include, for example, a rechargeable battery and/or a solar battery.

The indicator 297 may indicate a certain state of the electronic device 201 or a part thereof (e.g., the AP 210), for example, a booting state, a message state, a charging state, or the like. The motor 298 may convert an electrical signal into a mechanical vibration, and may generate a vibration or haptic effect. The electronic device 201 may include a processing unit (e.g., a GPU) for mobile TV support. The processing device for mobile TV support may, for example, process media data according to a standard of digital multimedia broadcasting (DMB), digital video broadcasting (DVB), media flow, or the like.

Each of the components of the electronic device 201 according to an embodiment of the present disclosure may be implemented by one or more components and the name of the corresponding component may vary depending on a type of the electronic device 201. In an embodiment of the present disclosure, the electronic device 201 may include at least one of the above-described elements. Some of the above-described elements may be omitted from the electronic device 201, or the electronic device 201 may further include additional elements. Further, some of the elements of the electronic device 201 according to an embodiment of the present disclosure may be coupled to form a single entity while performing the same functions as those of the corresponding elements before coupling.

Figure 3:
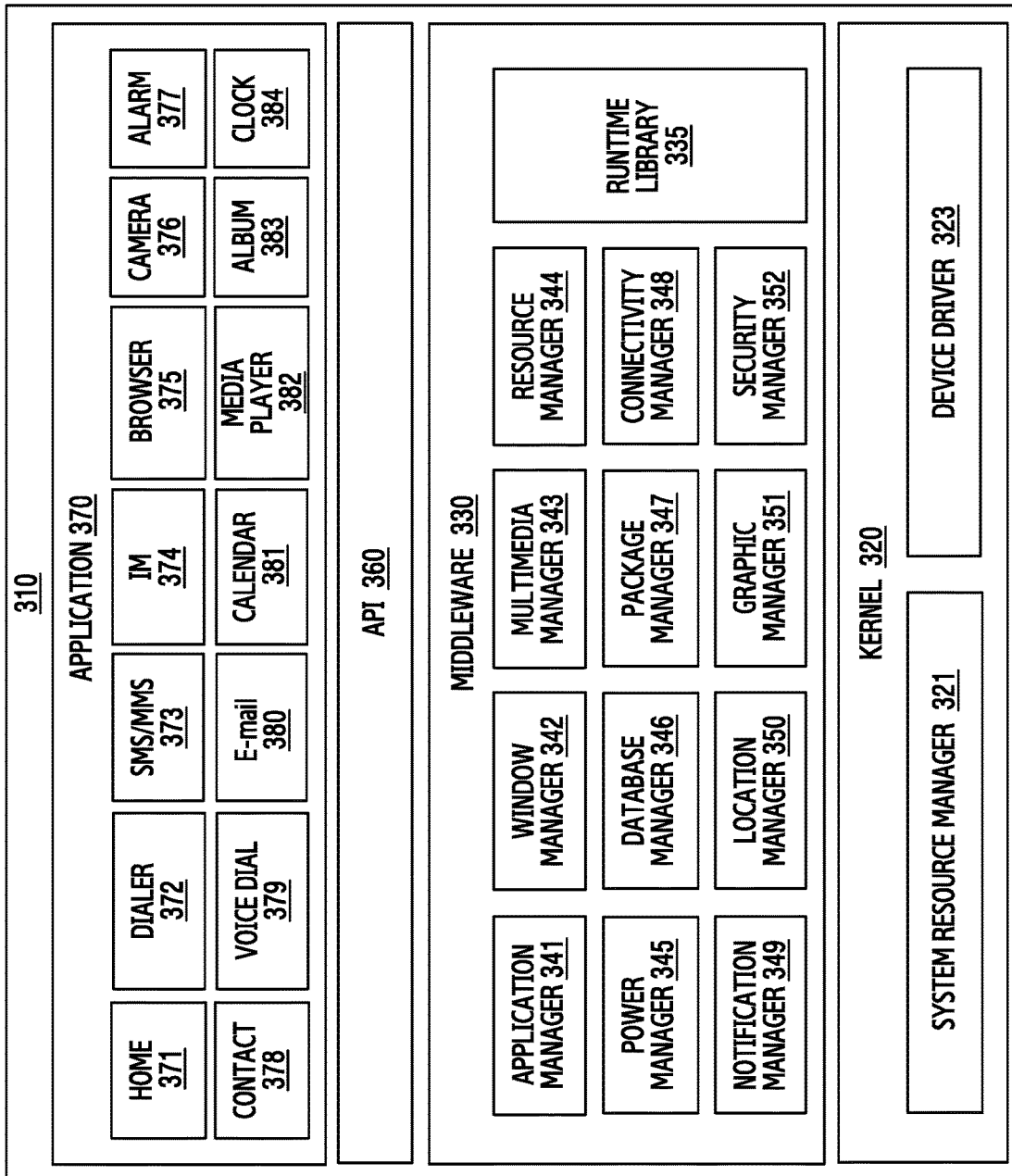
FIG. 3 is a block diagram of a programming module according to an embodiment of the present disclosure.

FIG. 3 is a block diagram of a program module 310 according to an embodiment of the present disclosure.

Referring to FIG. 3, the program module 310 (e.g., the program 140 of FIG. 1) may include an OS that controls resources relating to the electronic device 101 of FIG. 1 and/or the application 147 of FIG. 1 executed in the OS. The OS may be, for example, Android, iOS, Windows®, Symbian, Tizen™, Bada, or the like.

The programming module 310 may include a kernel 320, middleware 330, an API 360, and/or at least one application 370. At least some of the program module 310 may be preloaded in the electronic device, or may be downloaded from a server (e.g., the server 106).

The kernel 320 (e.g., the kernel 141 of FIG. 1) may include, for example, a system resource manager 321 or a device driver 323. The system resource manager 321 may control, allocate, or collect system resources. According to an embodiment of the present disclosure, the system resource manager 321 may include a process management unit, a memory management unit, or a file system management unit. The device driver 323 may include, for example, a display driver, a camera driver, a Bluetooth driver, a shared-memory driver, a USB driver, a keypad driver, a Wi-Fi driver, an audio driver, or an inter-process communication (IPC) driver.

The middleware 330 may provide a function required by the application 370, or may provide various functions to the application 370 through the API 360 to enable the application 370 to efficiently use limited system resources in the electronic device. According to an embodiment of the present disclosure, the middleware 330 (e.g., the middleware 143 in FIG. 1) may include at least one of a run time library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module used by a complier in order to add a new function through a programming language during the execution of the application 370. The run time library 335 may perform input/output management, memory management, or a function for an arithmetic function.

The application manager 341 may manage, for example, a life cycle of at least one of the applications of the application 370. The window manager 342 may manage graphical user interface (GUI) resources used by a screen. The multimedia manager 343 may identify a format required for reproducing various media files, and may encode or decode a media file using a coder/decoder (codec) suitable for the corresponding format. The resource manager 344 may manage resources of at least one of the applications of the application 370, such as source code, memory, storage space, and the like.

The power manager 345 may operate with, for example, a basic input/output system (BIOS) to manage a battery or power and provide power information required for an operation of the electronic device. The database manager 346 may generate, search, or change a database to be used by at least one of the applications of the application 370. The package manager 347 may manage an installation or an update of an application distributed in the format of a package file.

The connectivity manager 348 may manage, for example, a wireless connection, such as Wi-Fi or Bluetooth. The notification manager 349 may display, or notify of, an event, such as a received message, an appointment, and a proximity notification, in such a manner as to not disturb a user. The location manager 350 may manage location information of the electronic device. The graphic manager 351 may manage a graphic effect to be provided to a user, or a user interface related thereto. The security manager 352 may provide all security functions required for system security or user authentication. According to an embodiment of the present disclosure, in cases where the electronic device 101 in FIG. 1 has a telephone call function, the middleware 330 may further include a telephony manager for managing a voice or video call function of the electronic device.

The middleware 330 may include a middleware module that forms combinations of various functions of the aforementioned elements. The middleware 330 may provide specialized modules according to the types of operating systems in order to provide differentiated functions. In addition, the middleware 330 may dynamically delete some of the existing elements, or may add new elements.

The API 360 (e.g., the API 145 in FIG. 1) may be, for example, a set of API programming functions, and may be provided with different configurations according to different operating systems. For example, in the case of Android or iOS platforms, an API set may be provided for each platform, and in the case of Tizen™, two or more API sets may be provided for each platform.

The application 370 (e.g., the application 147 in FIG. 1) may include, for example, one or more applications that can provide functions, such as a home application 371, a dialer application 372, an SMS/MMS application 373, an instant messaging (IM) application 374, a browser application 375, a camera application 376, an alarm application 377, a contact application 378, a voice dialer application 379, an electronic mail (e-mail) application 380, a calendar application 381, a media player application 382, an album application 383, a clock application 384, a health care application (e.g., a application to measure a quantity of exercise or a blood sugar level), or an environmental information application (e.g., an application for providing atmospheric pressure, humidity, or temperature information).

According to an embodiment of the present disclosure, the application 370 may include an application (hereinafter, an "information exchange application") that supports information exchange between the electronic device 101 in FIG. 1 and the external electronic devices 102 and 104 in FIG. 1. The information exchange application may include, for example, a notification relay application for transmitting certain information to an external electronic device, or a device management application for managing an external electronic device.

For example, the notification relay application may include a function for transferring, to the external electronic device 102 or the external electronic device 104 of FIG. 1, notification information generated from other applications of the electronic device (e.g., an SMS/MMS application, an e-mail application, a health management application, or an environmental information application). Furthermore, the notification relay application may, for example, receive notification information from an external electronic device and provide the received notification information to a user. The device management application may, for example, manage (e.g., install, delete, or update) at least one function of the electronic device 104 of FIG. 1 communicating with the electronic device (for example, a function of turning on/off the external electronic device (or some elements thereof), or a function of adjusting luminance (or a resolution) of the display), applications operating in the external electronic device, or services provided by the external electronic device (e.g., a telephone call service or a message service).

According to an embodiment of the present disclosure, the application 370 may include an application (e.g., a health care application) specified according to attributes (e.g., attributes of the electronic device such as the type of electronic device which corresponds to a mobile medical device) of the external electronic device 102 or 104 of FIG. 1. According to an embodiment of the present disclosure, the application 370 may include an application received from the server 106 or the external electronic devices 102 or 104 in FIG. 1. According to an embodiment of the present disclosure, the application 370 may include a preloaded application or a third party application that can be downloaded from a server. The names of the elements of the program module 310, according to embodiment of the present disclosure, may vary according to the type of operating system.

According to an embodiment of the present disclosure, at least a part of the programming module 310 may be implemented in software, firmware, hardware, or a combination of two or more thereof. At least some of the programming module 310 may be implemented (for example, executed) by, for example, a processor (for example, the AP 210 in FIG. 2). At least some of the programming module 310 may include, for example, a module, a program, a routine, sets of instructions, a process, or the like for performing one or more functions.

The term "module" as used herein may, for example, indicate a unit including one of hardware, software, and firmware or a combination of two or more thereof. The term "module" may be interchangeably used with, for example, the terms "unit," "logic," "logical block," "component," or "circuit." The term "module" may indicate a minimum unit of an integrated component element or a part thereof. The term "module" may indicate a minimum unit for performing one or more functions or a part thereof. The term "module" may indicate an entity that is mechanically or electronically implemented. For example, the term "module" according to the present disclosure may include at least one of an application specific integrated circuit (ASIC), a field programmable gate array (FPGA), and a programmable-logic device for performing operations which are known or will be developed.

According to an embodiment of the present disclosure, at least some of the devices (for example, modules or functions thereof) or the method (for example, operations) according to the present disclosure may be implemented by a command stored in a non-transitory computer-readable recording medium in a programming module form. The instruction, when executed by a processor (e.g., the processor 120 in FIG. 1), may cause one or more processors to execute the function corresponding to the instruction. The non-transitory computer-readable recording medium may be, for example, the memory 220 in FIG. 2.

The non-transitory computer readable recoding medium may include a hard disk, a floppy disk, magnetic media (e.g., a magnetic tape), optical media (e.g., a compact disc read only memory (CD-ROM) and a DVD), magneto-optical media (e.g., a floptical disk), a hardware device (e.g., a ROM, a RAM, a flash memory), and the like. In addition, the program instructions may include high level language codes, which can be executed in a computer by using an interpreter, as well as machine code generated by a compiler. Any of the hardware devices described above may be configured as one or more software modules in order to perform the operations according to an embodiment of the present disclosure, and vice versa.

Any of the modules or programming modules according to an embodiment of the present disclosure may include at least one of the above described elements, exclude some of the elements, or further include other elements. The operations performed by the modules, programming module, or other elements according to an embodiment of the present disclosure may be executed in a sequential, parallel, repetitive, or heuristic manner. Further, some operations may be executed according to another order or may be omitted, or other operations may be added.

An electronic device, according to an embodiment of the present disclosure, may transmit or receive proximity service data using a proximity service. In this case, the proximity service data is advertisement content, and may include images, audio, videos, and the like. A proximity service indicates a service provided through communication between devices within a short range of each other using low power. In this case, "low power" indicates a power less than or equal to a predetermined threshold value, and "short range" indicates a distance less than or equal to a predetermined threshold value.

Furthermore, the proximity service data, according to an embodiment of the present disclosure, is transmitted without association. In other words, the proximity service data may be transmitted based on non-association. In this case, transmitting the proximity service data without association indicates transmitting/receiving data only through a procedure of acquiring physical synchronization between a device for transmitting the proximity service data and a device for receiving the proximity service data and identifying the presence thereof, without a procedure of configuring a logical association between the devices. For example, in the case of a wireless LAN system (e.g., Institute of Electrical and Electronics Engineers (IEEE) standard 802.11), the proximity service data may be transmitted and received without performing a registration procedure and an association procedure.

The proximity service is provided by a discovery based network. The discovery based network may be configured by periodically transmitting, by one transmitting device, a signal for which a receiver is not specified. In this case, the periodically transmitted signal announces the presence of the network or the transmitting device, and may be referred to as a "beacon." Namely, in an embodiment of the present disclosure which is described below, proximity service data may be transmitted through a network that periodically transmits a non-directional signal for which a receiver is not indicated.

Although the terms "station" (STA), "access point" (AP), "requesting STA," "responding STA," "neighbor awareness networking" (NAN) device, "device," "broadcasting device," "service providing device," "proximity service data providing device," "transmitting device," "receiving device," and the like are hereinafter used for convenience of description, the listed terms are employed for distinguishing between electronic devices according to roles thereof. However, the present disclosure is not limited to the listed terms, and any type of electronic device may operate according to a procedure which is described below.

Figure 4:
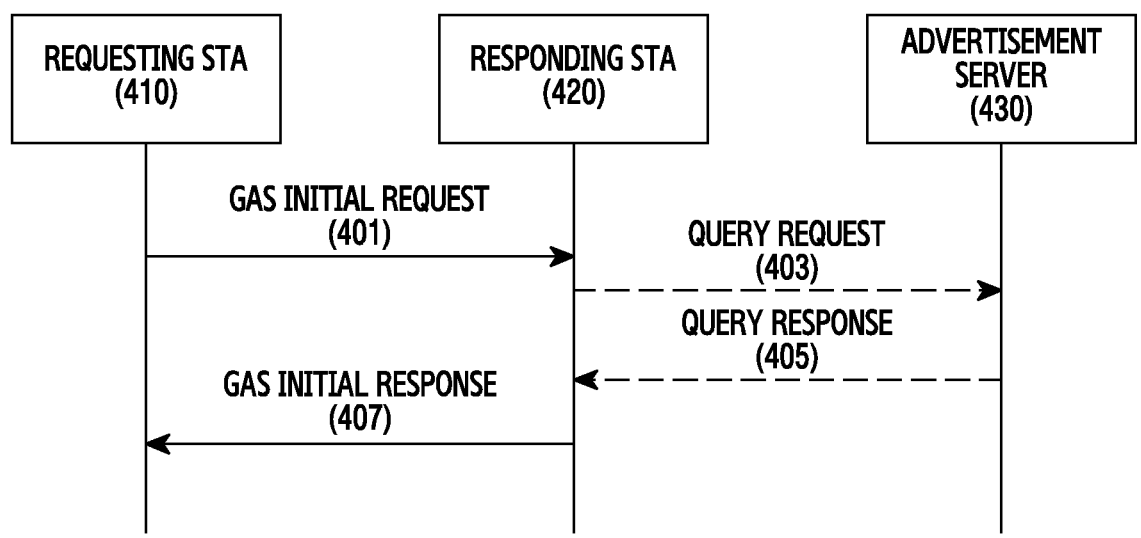
FIG. 4 is a flow diagram of a method of providing proximity service data according to an embodiment of the present disclosure.

FIG. 4 is a flow diagram of a method of providing proximity service data according to an embodiment of the present disclosure. FIG. 4 is a method of providing a proximity service based on the IEEE 802.11u standard for discovering external network information of an AP. The IEEE 802.11u standard allows network discovery with an external network without an association with an AP.

Referring to FIG. 4, in operation 401, a requesting STA 410 may transmit a generic advertisement service (GAS) initial request to a responding STA 420. The GAS initial request may be an action frame defined in the IEEE 802.11u standard. For example, the GAS initial request may include a category, an action, a dialog token, an advertisement protocol element, a query request length, a query request, and the like. In the case where there is a plurality of action requests, the dialog token may be used to match the action requests with action responses. The advertisement protocol element may include information on an advertisement protocol that the requesting STA 410 wants to configure together with the responding STA 420, and the query request may include information on a service that the requesting STA 410 requests through the GAS initial request.

In operation 403, the responding STA 420 may transmit a query request to an advertisement server 430. The query request requests proximity service data for an advertisement service required by the GAS initial request, namely, advertisement data. In operation 405, the advertisement server 430 may transmit a query response that includes proximity service data for advertisement. The query response may include the proximity service data for the advertisement service required by the GAS initial request, namely, the advertisement data.

In operation 407, the responding STA 420 may transmit a GAS initial response to the requesting STA 410. The GAS initial response may further include at least one of a status code and a comeback delay in addition to the information included in the GAS initial request. The information included in Table 1 below is an example, and some information may be added or deleted if it does not depart from the scope and spirit of the present disclosure.

TABLE 1

(1) A category may include frame category information of a GAS initial response frame. For example, the GAS initial response frame may be included in a public action frame.
(2) An action may be used as an indicator for specifying the GAS initial response frame among the public action frame.
(3) A dialog token is information used to match a plurality of action requests and action responses. A dialog token of a GAS initial request frame 410 may be copied and used. The status code indicates whether a response to the GAS initial request has succeeded or failed.

The responding STA 420 may be an AP in the method illustrated in FIG. 4. The GAS initial request and the GAS initial response may be transmitted between the requesting STA 410 and the responding STA 420 without association therebetween. In other words, the GAS initial request and the GAS initial response may be transmitted in a pre-association state. The procedure of performing the network discovery for the external advertisement server through the GAS initial request/response, illustrated in FIG. 4, may be referred to as an access network query protocol (ANQP).

Figure 5:
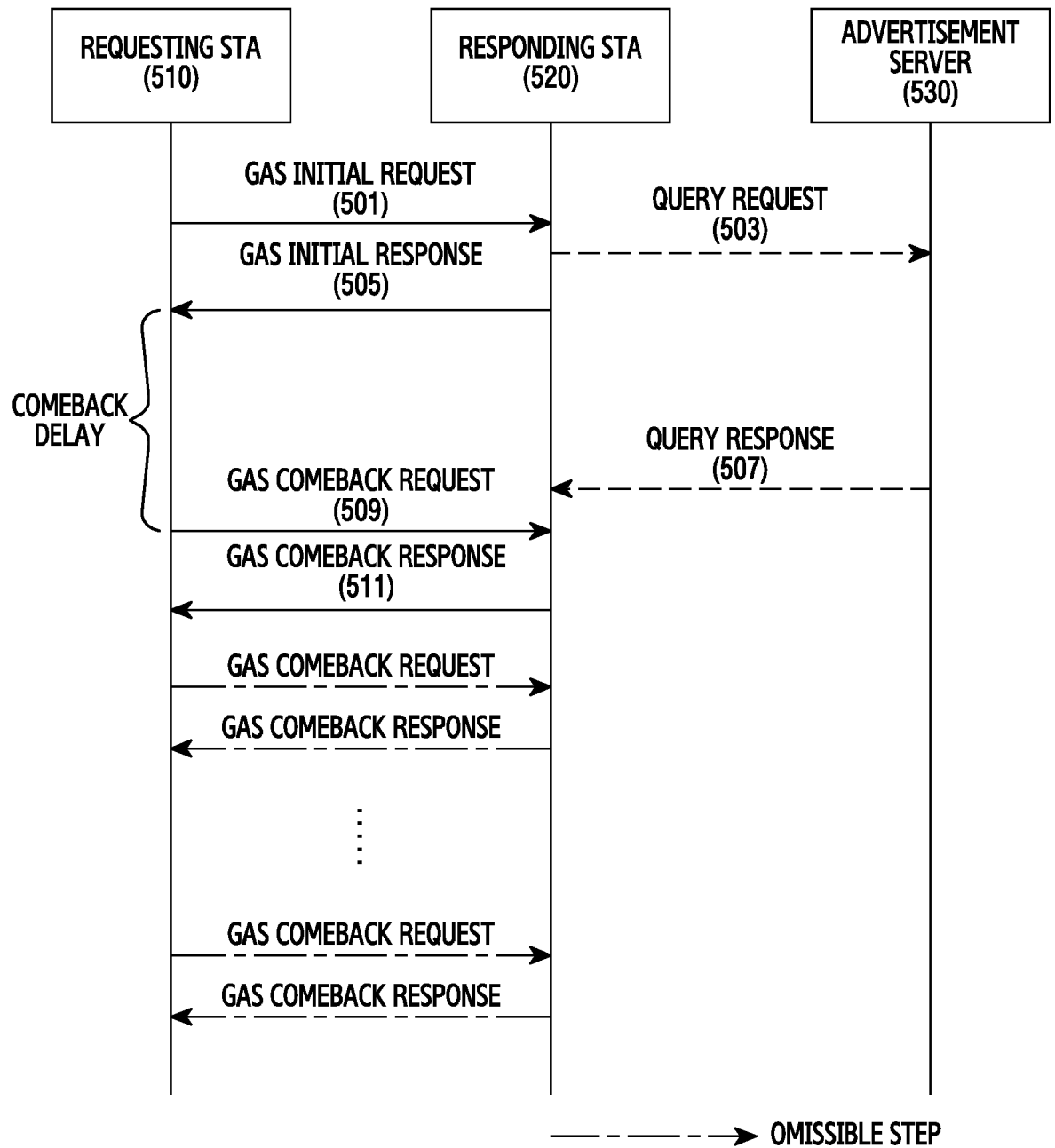
FIG. 5 is a flow diagram of a method of providing proximity service data according to another embodiment of the present disclosure.

FIG. 5 is a flow diagram of a method of providing proximity service data according to an embodiment of the present disclosure. FIG. 5 is an example of a method of providing a proximity service based on the IEEE 802.11u standard for discovering external network information of an AR The IEEE 802.11u standard allows network discovery with an external network without association with an AP.

Referring to FIG. 5, in operation 501, a requesting STA 510 may transmit a GAS initial request to a responding STA 520. That is, the requesting STA 510 queries the responding STA 520 about ANQP information. In operation 503, the responding STA 520 may transmit a query request to an advertisement server 530. In this case, the response of the advertisement server 530 is delayed. Accordingly, in operation 505, the responding STA 520 may transmit a GAS initial response including comeback delay information to the requesting STA 510. The comeback delay information represents a delay time until a GAS comeback request is received from the requesting STA 510 by the responding STA 520 after the responding STA 520 transmits the GAS initial response. In contrast to FIG. 5, in the case where an ANQP query value for the query request is large, that is, in the case where the size of data to be received in response to the query request is greater than a predetermined level so that the data cannot be received through a single query response, the GAS initial response may include the comeback delay.

Thereafter, in operation 507, the advertisement server 530 may transmit a query response including proximity service data for advertisement to the responding STA 520. After the GAS initial response is received and the comeback delay lapses, the requesting STA 510 may transmit a GAS comeback request to the responding STA 520 in operation 509. Accordingly, in operation 511, the responding STA 520 may transmit a GAS comeback response to the requesting STA 510. The GAS comeback response includes ANQP information, that is, proximity service data provided from the advertising server 530. Thereafter, operations of transmitting the GAS comeback request and the GAS comeback response may be repeatedly performed. The repeatedly performed operations of transmitting the GAS comeback request and the GAS comeback response may be omitted.

The responding STA 520 may be an AP in the method illustrated in FIG. 5. The GAS initial request and the GAS initial response may be transmitted between the requesting STA 510 and the responding STA 520 without association therebetween. In other words, the GAS initial request and the GAS initial response may be transmitted in a pre-association state.

In the method illustrated in FIG. 5, the operations 503 and 507 indicated by dashed lines are signaling between the responding STA 520 and the advertisement server 530. In this case, the operations 503 and 507 are not directly associated with a proximity service, and may be modified in various ways.

Figure 6:
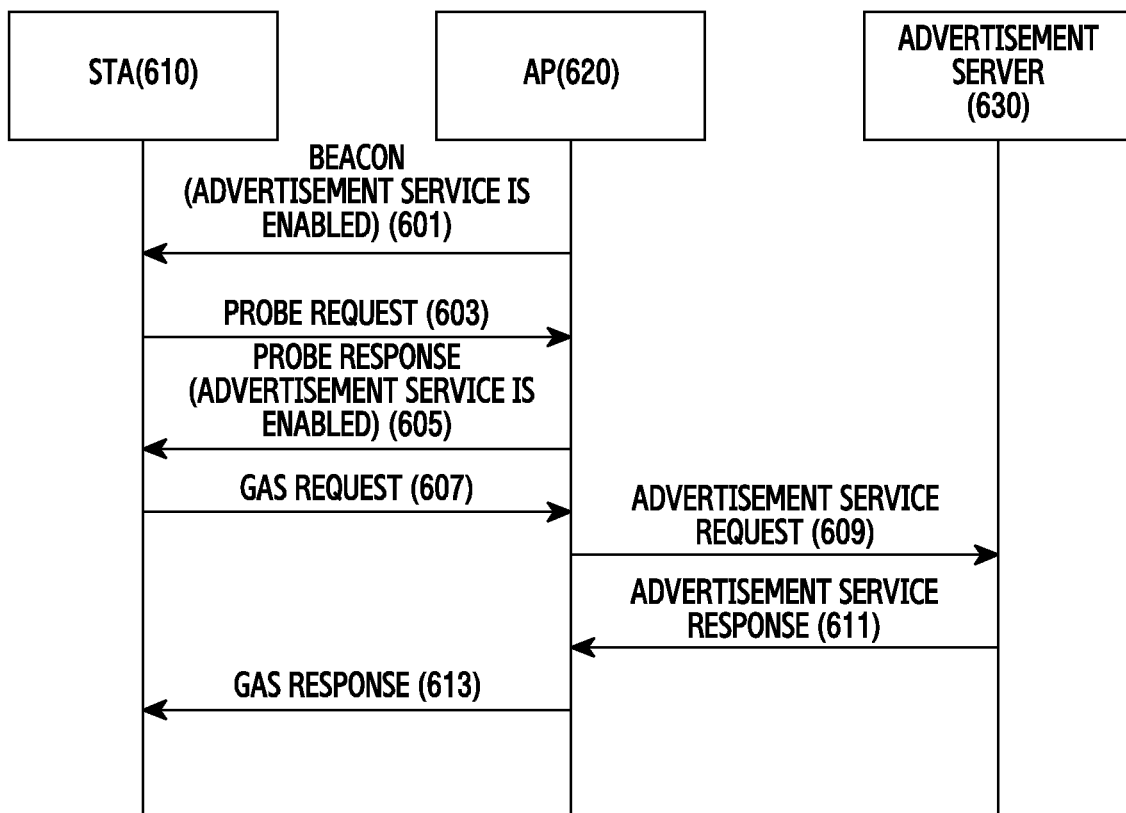
FIG. 6 is a flow diagram of a method of providing proximity service data according to an embodiment of the present disclosure.

FIG. 6 is a flow diagram of a method of providing proximity service data according to an embodiment of the present disclosure. FIG. 6 is an example of a method of providing a proximity service based on the IEEE 802.11u standard for discovering external network information of an AP. The IEEE 802.11u standard allows network discovery with an external network without association with an AP.

Referring to FIG. 6, in operation 601, an STA 610 may receive a beacon transmitted by an AP 620. The beacon is a signal for announcing the presence of the AP 620. The beacon may include information indicating that an advertisement service is enabled.

In operation 603, the STA 610 may transmit a probe request to the AP 620. The probe request is a signal transmitted in order to scan an AP in the relevant channel. The probe request may be transmitted to a certain AP, or may be broadcast to a plurality of APs.

In operation 605, the AP 620 may transmit a probe response to the STA 610. The probe response is a response signal corresponding to the associated probe request. The probe response may include information on the AP 620, and may include information indicating that an advertisement service is enabled.

In operation 607, the STA 610 may transmit a GAS initial request to the AP 620. That is, the STA 610 queries the AP 620 about information of an external network. The GAS initial request may be a signal according to an ANQP protocol. In this case, the GAS initial request is transmitted after the STA 610 receives the probe response from the AP 620. In other words, the GAS initial request is transmitted in a pre-association state.

In operation 609, the AP 620 may transmit an advertisement service request to the advertisement server 630. That is, the AP 620 requests proximity service data for advertisement from the advertisement server 630 according to a query of the STA 610.

In operation 611, the advertisement server 630 may transmit an advertisement service response to the AP 620. The advertisement service response includes the proximity service data for advertisement. For example, the proximity service data may include at least one of an image, audio, a video, and text.

In operation 613, the AP 620 may transmit a GAS response to the STA 610. The GAS response includes the proximity service data provided from the advertisement server 630.

The method illustrated in FIG. 6 has been described as being performed before the association between the STA 610 and the AP 620. However, according to an embodiment of the present disclosure, the method illustrated in FIG. 6, for example, the operations 607 to 613 may be performed in a post-association state.

The above described proximity service may be provided through various communication standards, such as Bluetooth low energy (BLE), near field communication (NFC), Wi-Fi, Zigbee, or the like, in addition to the IEEE 802.11u standard illustrated in FIG. 6. For example, the proximity service, according to an embodiment of the present disclosure, may be provided by the low power NAN discovery method, which is being developed under the Wi-Fi standard. The NAN is a low power discovery method based on the Wi-Fi method, which exchanges information through a cluster illustrated in FIG. 7, which is described below.

Figure 7:
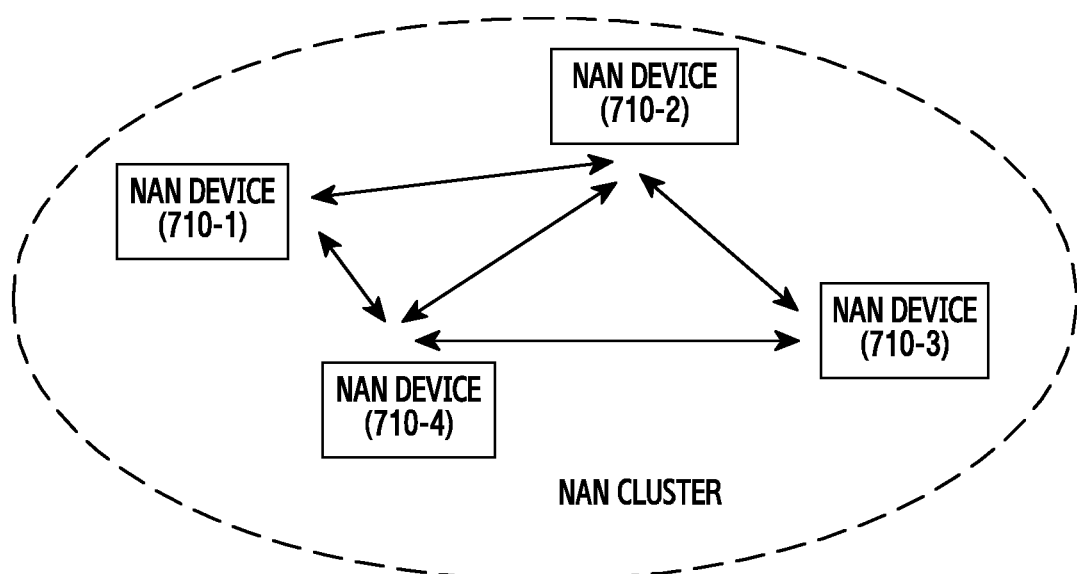
FIG. 7 is a diagram of a cluster configuration for a proximity service according to an embodiment of the present disclosure.

FIG. 7 is a diagram of a cluster configuration for a proximity service according to an embodiment of the present disclosure.

Referring to FIG. 7, NAN devices 710-1, 710-2, 710-3, and 710-4 constitute a single cluster. The NAN devices 710-1, 710-2, 710-3, and 710-4 are synchronized, and may transmit/receive a beacon and service discovery frame in a synchronized discovery window. In a period other than a discovery window (DW), the NAN devices 710-1, 710-2, 710-3, and 710-4 may be maintained in a sleep state, thereby maintaining a discovery state with low power, where a service and information may be exchanged between adjacent devices. The NAN devices 710-1, 710-2, 710-3, and 710-4 using the DW may operate as illustrated in FIGS. 8 and 9, which are described below.

Figure 8:
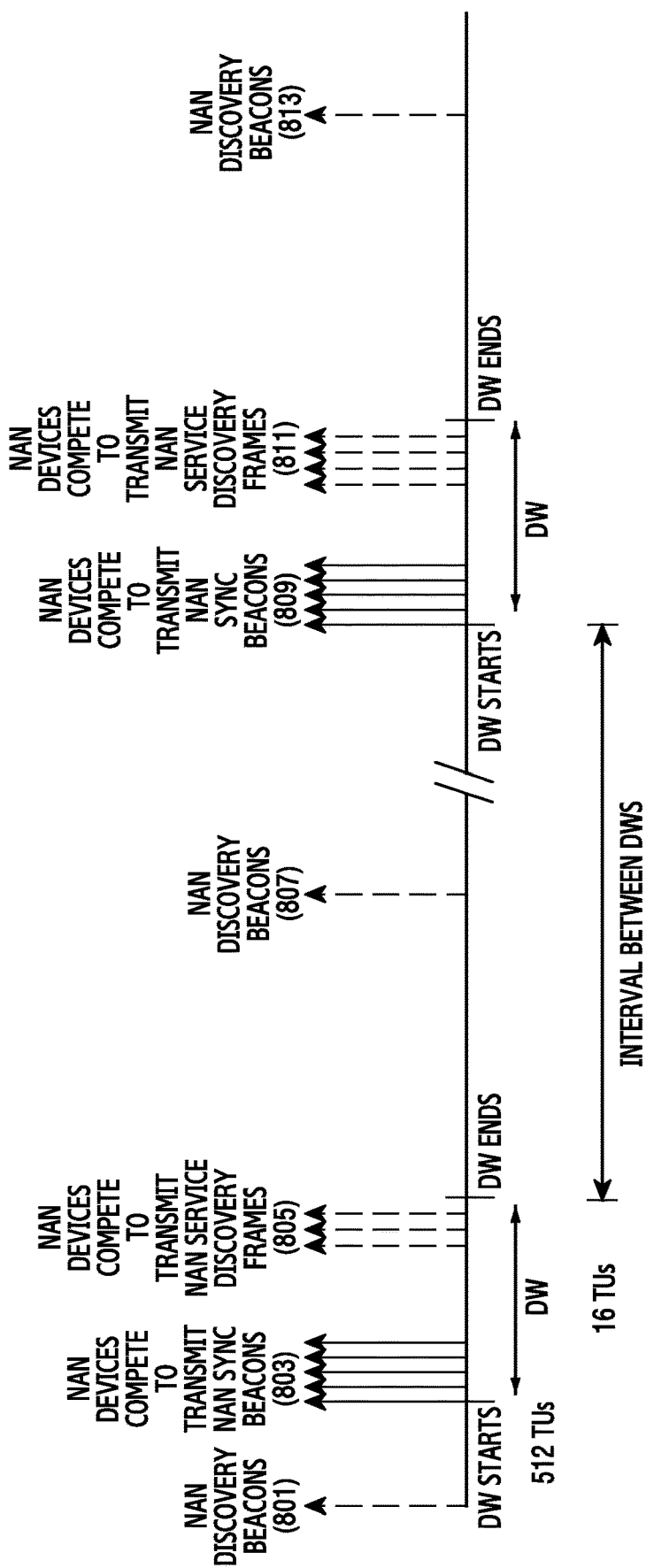
FIG. 8 is a flow diagram of a method of providing proximity service data according to an embodiment of the present disclosure.

FIG. 8 is a flow diagram of a method of providing proximity service data according to an embodiment of the present disclosure.

Referring to FIG. 8, in operation 801, among devices in a cluster, an NAN device 710-1, 710-2, 710-3, or 710-4 functioning as a master transmits NAN discovery beacons. In FIG. 8, the NAN discovery beacons are transmitted in channel 6. Thereafter, a DW starts, and in operation 803, the NAN devices 710-1, 710-2, 710-3, and 710-4 in the cluster compete to transmit NAN synchronization or "sync" beacons. Then, in operation 805, the NAN devices 710-1, 710-2, 710-3, and 710-4 compete to transmit NAN service discovery frames. The NAN sync beacons and the NAN service discovery frames may be transmitted by another synchronized NAN device 710-1, 710-2, 710-3, or 710-4 as well as the NAN device 710-1, 710-2, 710-3, or 710-4 functioning as the master. Then, the DW ends. In operation 807, the NAN device 710-1, 710-2, 710-3, or 710-4 functioning as the master transmits NAN discovery beacons again. Thereafter, a DW starts, and in operation 809, the NAN devices 710-1, 710-2, 710-3, and 710-4 compete to transmit NAN sync beacons. Then, in operation 811, the NAN devices 710-1, 710-2, 710-3, and 710-4 compete to transmit NAN service discovery frames. Then, the DW ends. Thereafter, similar methods may be repeated. For example, in operation 813, the NAN device 710-1, 710-2, 710-3, or 710-4 functioning as the master may transmit NAN discovery beacons.

Figure 9:
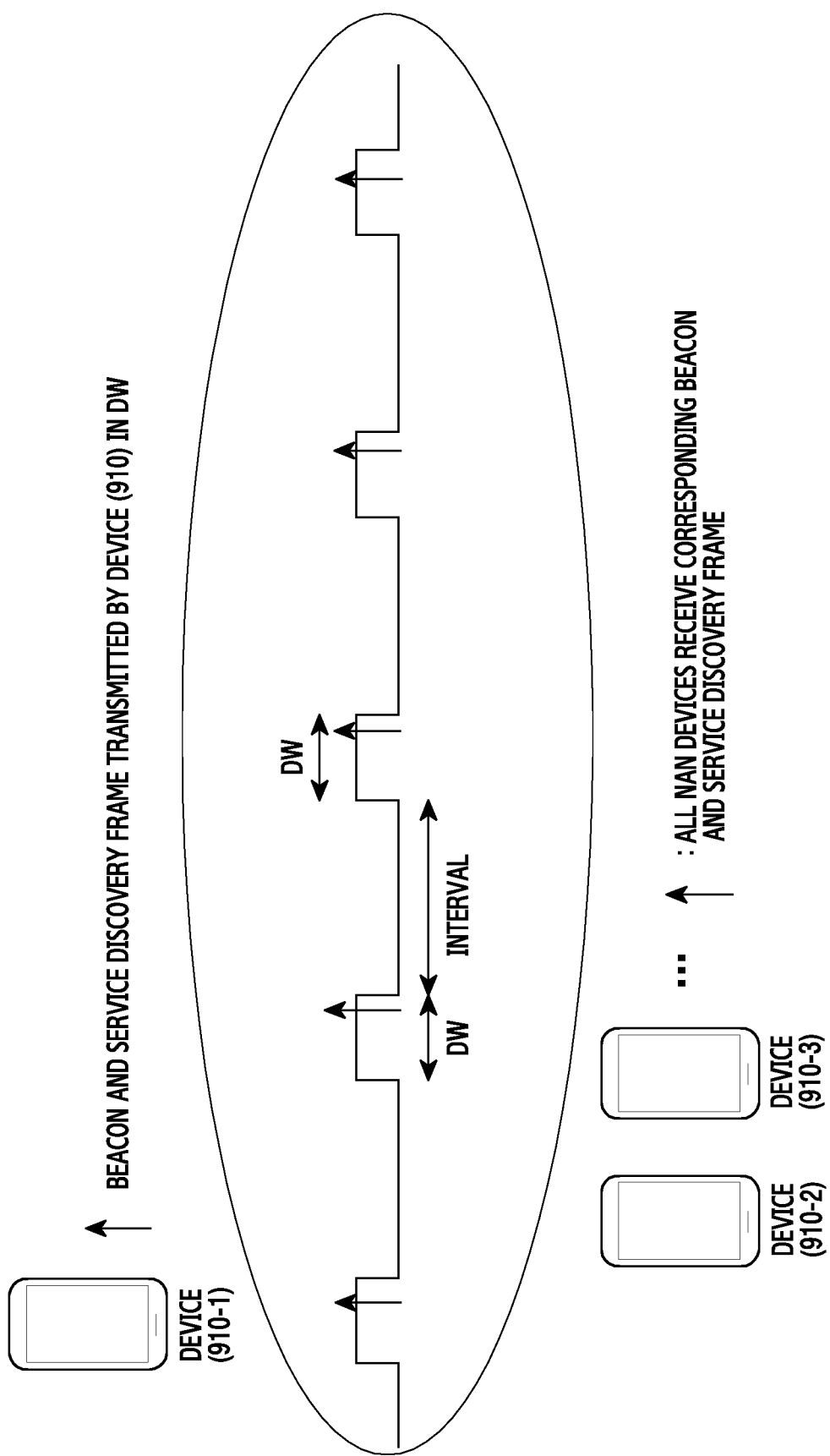
FIG. 9 is a diagram of a method of providing proximity service data according to an embodiment of the present disclosure.

FIG. 9 is a diagram of a method of providing proximity service data according to yet an embodiment of the present disclosure.

Referring to FIG. 9, a device 910-1 may transmit a beacon and service discovery frame in a DW. Accordingly, devices 910-2 and 910-3 may receive the beacon and service discovery frame transmitted by the device 910-1.

Proximity service data (e.g., advertisement) transmitted through a proximity service, according to an embodiment of the present disclosure, may be distinguished into first proximity service data and second proximity service data. For example, the features of the first and second proximity service data are listed in Table 2 below.

TABLE 2

| First proximity service data | Second proximity service data |
| --- | --- |
| venue, identifier (ID) and short information, service ID and short information, short message, image, URL, etc. transmit through short-range communication discovery method (e.g., Wi-Fi (scan, 802.11u, NAN, P2P, IBSS), BT (BLE), Zigbee, NFC, etc.) information relating to first proximity service data including multimedia data such as audio, image, long message, etc. association formation guide information characteristic (e.g., designate association method, association method, security, etc.) for second proximity service data transmission channel, transmission start time, transmission end time, transmission cycle, transmission period, transmitting device information, transmission data description, transmission communication, reception condition (e.g., reception range using reception signal strength, etc.) | high capacity of audio, video, image transmitted according to service data guide information of first proximity service data device to transmit first proximity service data and device to transmit second proximity service data may be identical to or different from each other |

TABLE 2-continued

| First proximity service data | Second proximity service data |
| --- | --- |
| identification information of target devices to receive second proximity service data boundary information of region to receive second proximity service data guide information can be separately specified according to types of proximity data data transmission period and association formation period can be separately specified | |

As listed in Table 2 above, the first and second proximity service data include advertisement content. Further, the second proximity service data includes a higher capacity of data than the first proximity service data. For example, the first proximity service data includes information necessary for receiving the second proximity service data. In other words, the first proximity service data includes information that facilitates reception of the second proximity service data (hereinafter "guide information"). In this case, the second proximity service data includes a higher capacity or a higher quality of data than the first proximity service data.

A proximity service data transmitting device, according to an embodiment of the present disclosure, may support various short-range communication technologies that may be utilized in a proximity service, such as BLE, BT, Wi-Fi, NAN, IEEE 802.11u, NFC, Zigbee, etc. Furthermore, the transmitting device, according to an embodiment of the present disclosure, may transmit the first proximity service data for transmitting a venue, an identifier (ID) and short information, a service ID and short information, a device ID and short information, short text, an image, and a URL, and the second proximity service data for transmitting a higher capacity of multimedia data and additional service data.

A description of the first proximity service data is provided below.

Based on various short-range communication technologies, the first proximity service data may include at least one of a venue ID and related information, a service ID and related information, a device ID and related information, a short text, an image, and a URL.

For example, the first proximity service data includes guide information for notifying of a method by which the second proximity service data may be received. For example, in consideration of power efficiency of a receiving device, the guide information may include information for notifying of a transmission period, a transmission start time, a transmission cycle, a transmission end time, a transmission channel, a transmission method (e.g., short-range communication such BT, Wi-Fi, NFC, Zigbee, etc.), a transmission identifier (ID), or a communication ID (e.g., a service set identification (SSID), a media access control (MAC) address, a service ID, a service protocol ID, a service/device/group name, a certain positive integer value, etc.) for the second proximity service data. Furthermore, the guide information may include data description information included in the second proximity service data. For example, the description information may include at least one of a data type (e.g., audio, video, image, etc.), a data capacity, and content related information.

In addition, the guide information may include information on a device for transmitting the second proximity service data (e.g., an MAC address, a device name, a device ID, a transmitting device group ID, a transmitting device service ID, a service name, etc.). In this case, the second proximity service data may be transmitted by at least one of unicasting, broadcasting, and multicasting, and information on a target device that must receive the second proximity service data (e.g., a device ID, a device name, an MAC address, an MAC address list, an IP address, an IP address list, etc.) may be included in service data guide information.

The guide information may be defined according to types of data included in the second proximity service data. For example, different guide information may be provided in cases where different types of data are included.

A device for transmitting the second proximity service data may differ from a device for transmitting the first proximity service data. In this case, the guide information may include information (e.g., identification information, location information, etc.) on the device for transmitting the second proximity service data.

The second proximity service data may be encrypted. In this case, the guide information may include information on a connection for the acquisition of an encryption key in addition to a data transmission period such that encryption acquisition through a connection with a receiving device may be performed.

Furthermore, the guide information may include information on a reception condition for determining whether a receiving device for receiving the second proximity service data receives the second proximity service data. For example, a maximum distance and a minimum signal strength for receiving the second proximity service data may be indicated as reception conditions in the guide information. In this case, only a device that is located within the maximum distance or has the minimum signal strength may receive the second proximity service data. This may ensure a reception quality for the second proximity service data.

A description of the second proximity service data is provided below.

The second proximity service data may include a higher capacity of multimedia data than the first proximity service data. For example, the second proximity service data may include a high capacity of audio, video, image, etc. The second proximity service data is transmitted according to the guide information included in the first proximity service data. In the case where information for acquiring an encryption key is included in the first proximity service data, a transmitting device broadcasts encrypted data using the corresponding key. A device for transmitting the second proximity service data may differ from a device for transmitting the first proximity service data.

According to the above description, the first proximity service data and the second proximity service data may be provided as illustrated in FIGS. 10, 11, and 13 to 16 which are described below.

Figure 10:
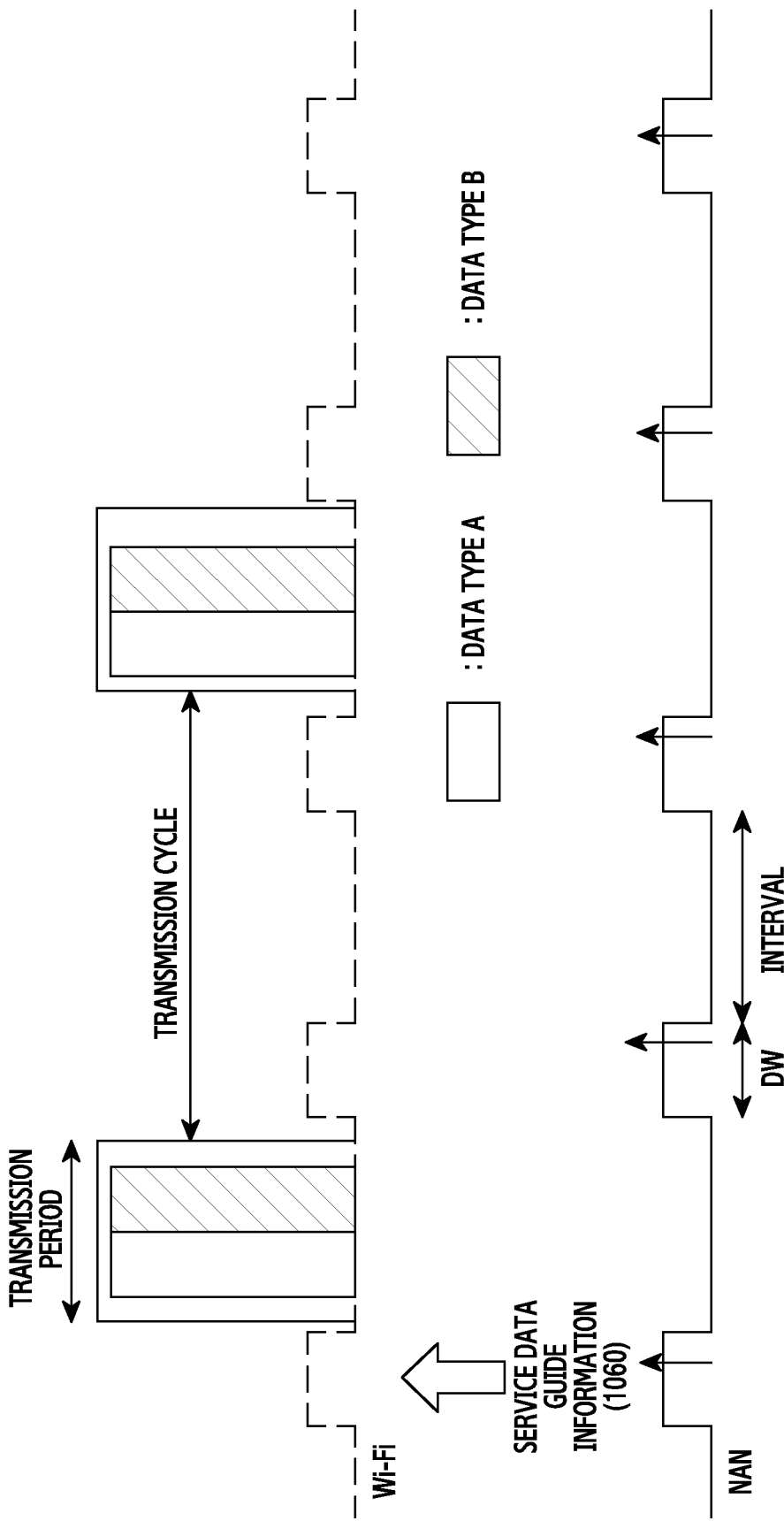
FIG. 10 is a diagram of a method of providing proximity service data according to an embodiment of the present disclosure.

FIG. 10 is a diagram of a method of providing proximity service data according to an embodiment of the present disclosure. FIG. 10 is an example of the case where first proximity service data is provided by NAN and second proximity service data is provided by Wi-Fi.

Referring to FIG. 10, the first proximity service data may be repeatedly transmitted during a synchronized DW period according to NAN. For example, the first proximity service data may be transmitted through at least one of a service discovery frame and a discovery beacon frame. In this case, the first proximity service data includes service data guide information 1060. For example, the service data guide information may include information on a channel, a transmission start time, a transmission cycle, a transmission period, transmitting device information, a transmission data description, a transmission communication method, etc. for the transfer of the second proximity service data.

Accordingly, a receiving device for receiving the first proximity service data may receive a signal for discovery that is transmitted by a transmitting device, synchronize with the transmitting device using the signal, and then receive the first proximity service data through a synchronized DW. For example, the signal for discovery may be a discovery beacon frame, and the first proximity service data may be included in a service discovery frame. In another example, the signal for discovery may include the first proximity service data. In this case, the receiving device may receive the first proximity service data through the signal for discovery.

The second proximity service data may be transmitted according to Wi-Fi. The second proximity service data may include a plurality of types (e.g., type A and type B) of data. However, according to an embodiment of the present disclosure, the second proximity service data may include a single type of data. In this case, the transmission period of the second proximity service data may be allocated to a period other than a DW period according to the NAN method. That is, the second proximity service data may be transmitted during a time interval that does not overlap in time with the first proximity service data. Furthermore, the second proximity service data may be transmitted through a different channel than the first proximity service data.

Figure 11:
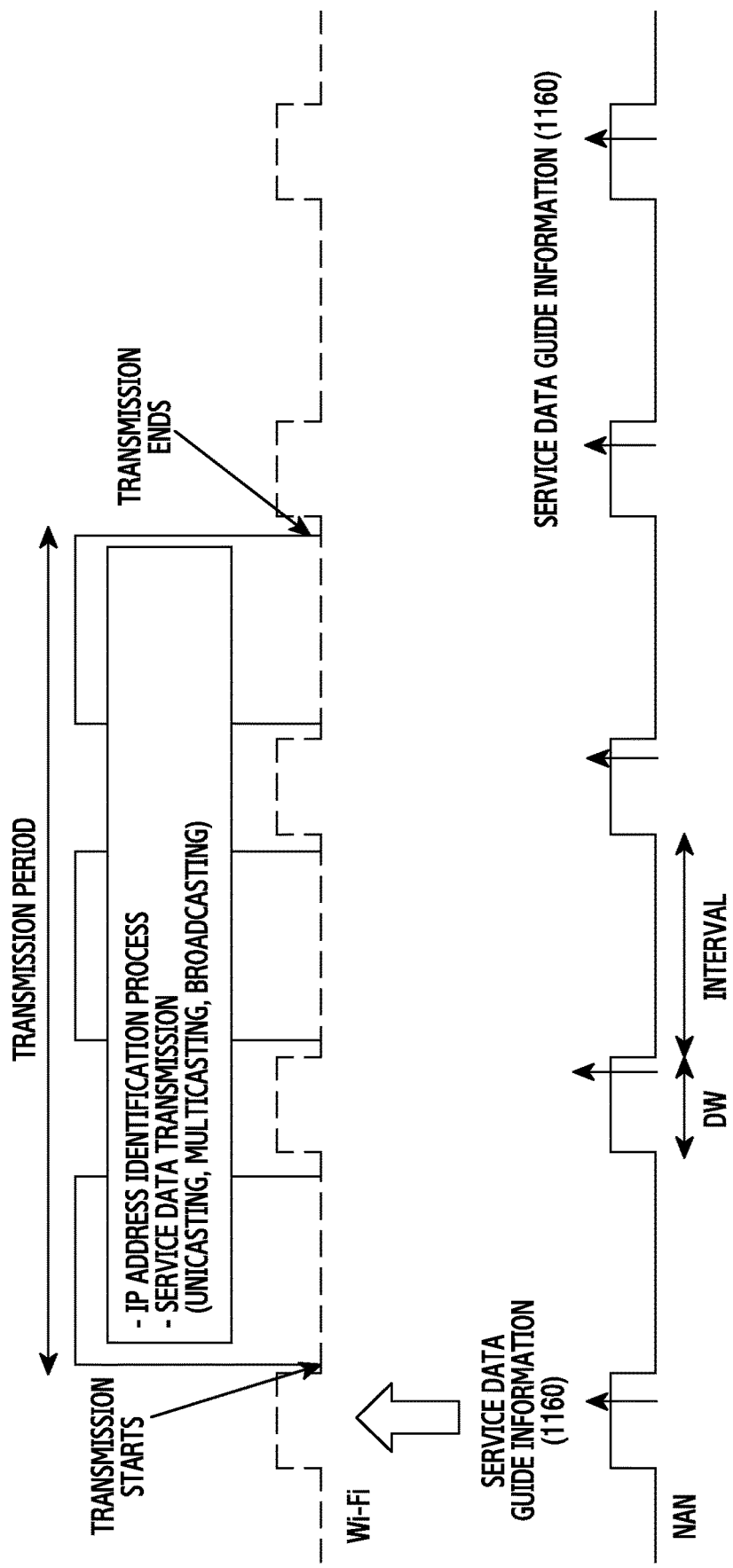
FIG. 11 is a diagram of a method of providing proximity service data according to an embodiment of the present disclosure.

FIG. 11 is a diagram of a method of providing proximity service data according to an embodiment of the present disclosure. FIG. 11 is an example of the case where first proximity service data is provided by NAN and second proximity service data is provided by Wi-Fi.

Referring to FIG. 11, the first proximity service data may be repeatedly transmitted during a synchronized DW period according to NAN. For example, the first proximity service data may be transmitted through at least one of a service discovery frame and a discovery beacon frame. In this case, the first proximity service data includes service data guide information 1160. In accordance with the above described embodiments of the present disclosure, the service data guide information may include information on a channel, a transmission start time, a transmission cycle, a transmission period, a transmission end time, a transmitting device information, a transmission data description, a transmission communication method, etc. for the transfer of the second proximity service data. However, according to an embodiment of the present disclosure, the service data guide information may include only the transmission start time and the transmission end time.

The transmission start time and the transmission end time may be represented by at least one of an absolute time, a relative time, and a DW identification number. For example, the transmission start time and the transmission end time may be indicated as an accurate time based on a synchronized DW, or may be indicated only with a DW number. In an NAN network, each DW has a number. For example, if a transmission start time is indicated as DW 2, the transmission of the second proximity service data starts after the DW 2. In FIG. 11, the second proximity service data is transmitted in a period between DWs except for each DW. Further, in the case where a transmission end time is specified as DW 5, the second proximity service data is not transmitted after the fifth DW. In the above embodiment of the present disclosure, it is described that the transmission of the second proximity service data starts or ends after the DW with an indicated number. However, according to an embodiment of the present disclosure, the transmission of the second proximity service data may start or end before the DW with an indicated number.

The second proximity service data may be transmitted according to Wi-Fi. The second proximity service data may be transmitted through unicasting, multicasting, or broadcasting. The second proximity service data may include a plurality of types (e.g., type A and type B) of data. However, according to an embodiment of the present disclosure, the second proximity service data may include a single type of data. In this case, the transmission period of the second proximity service data may be allocated to a period other than a DW period according to NAN. That is, the second proximity service data may be transmitted during a time interval that does not overlap in time with the first proximity service data. Furthermore, the second proximity service data may be transmitted through a different channel than the first proximity service data.

Transmission, according to an embodiment of the present disclosure, is performed without a separate connection process, and may include IP layer transmission of each device. That is, the ID of a transmission target may be indicated as an IP address. In FIG. 11, it is assumed that, initially, each device has an IP address. Generally, in wireless communication, an IP address may be allocated after a connection is completed. However, in an embodiment of the present disclosure, since data communication (e.g., IP layer communication, transmission control protocol (TCP)/IP communication, user datagram protocol (UDP) communication, etc.) is performed with no separate connection process, an IP address must be allocated in advance.

Figure 12:
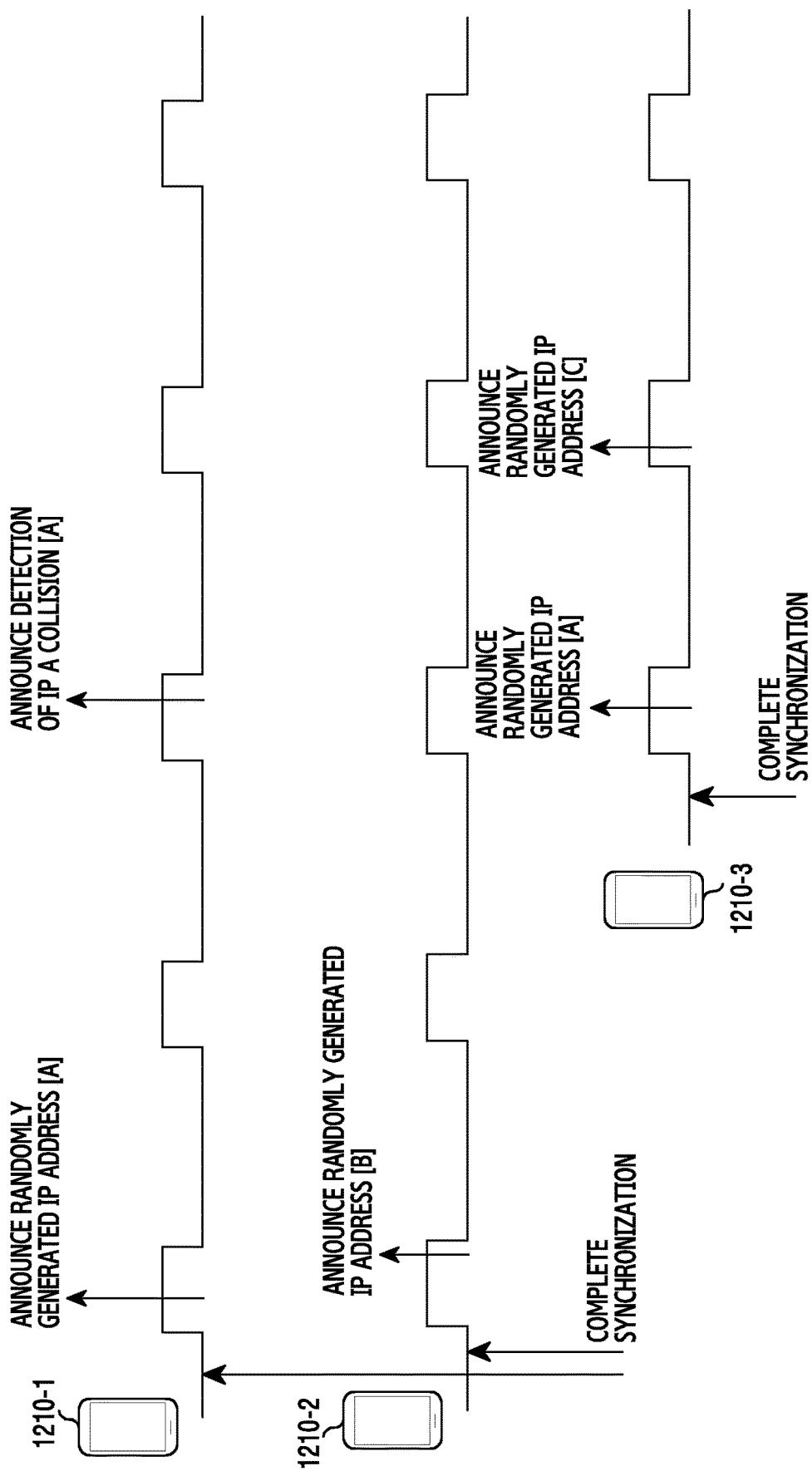
FIG. 12 is a diagram of a method of allocating an internet protocol (IP) address through a proximity service according to an embodiment of the present disclosure.

FIG. 12 is a diagram of a method of allocating an IP address through a proximity service according to an embodiment of the present disclosure. FIG. 12 illustrates allocating an IP address without a separate connection process between devices constituting a network.

Referring to FIG. 12, when synchronization is completed, devices 1210-1 and 1210-2 synchronized in a certain cluster generate IP addresses in a certain band (e.g., class B/C). The IP addresses may be generated according to a pre-defined rule. For example, the IP addresses may be determined based on a random number generation algorithm. Further, the respective devices 1210-1 and 1210-2 advertise or publish the IP addresses through a DW. In FIG. 12, the device 1210-1 generates and announces IP A, and the device 1210-2 generates and announces IP B. In other words, the device 1210-1 broadcasts the IP A.

Since the IP addresses are generated by the respective devices, the synchronized devices 1210-1 and 1210-2 may generate an identical IP address, namely, IP collision may occur. Accordingly, each of the devices 1210-1 and 1210-2 detects whether an identical IP address is published by another device, namely, whether IP collision occurs. In FIG. 12, a device 1210-3 generates and announces the IP A, and accordingly the device 1210-1 detects IP collision. Accordingly, the device 1210-1 having detected the IP collision transmits a message announcing that the IP addresses have collided through a DW. The message may include the colliding IP address. The device 1210-3 that received the message generates and announces a different IP address. Through the above described method, the devices 1210-1 to 1210-3 constituting the NAN may be allocated non-colliding IP addresses at the same time that the devices are synchronized.

FIG. 12 is an example of allocating an IP address. However, the method illustrated in FIG. 12 may also be applied to the case of allocating a device address (e.g., an MAC address or interface address) in a different layer or for a different purpose with the exception of the IP address.

Figure 13:
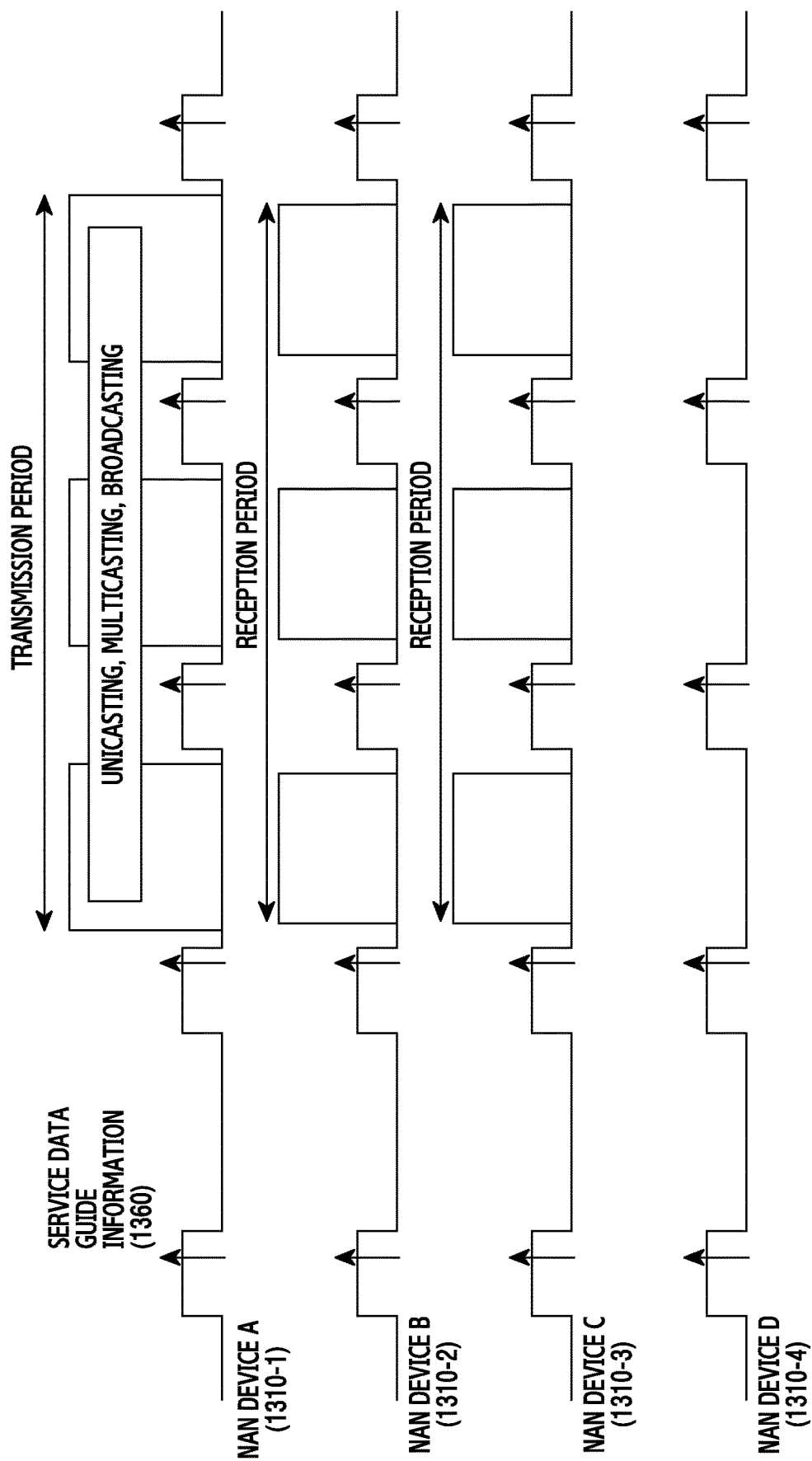
FIG. 13 is a diagram of a method of providing proximity service data according to an embodiment of the present disclosure.

FIG. 13 is a diagram of a method of providing proximity service data according to an embodiment of the present disclosure. FIG. 13 is an example of the case where first proximity service data and second proximity service data are provided by NAN.

Referring to FIG. 13, the first proximity service data may be repeatedly transmitted during a synchronized DW period according to NAN. For example, the first proximity service data may be transmitted through at least one of a service discovery frame and a discovery beacon frame. In this case, the first proximity service data includes service data guide information 1360. For example, the service data guide information 1360 may include information on a channel, a transmission start time, a transmission cycle, a transmission period, a transmission end time, transmitting device information, a transmission data description, a transmission communication method, etc. for the transfer of the second proximity service data.

In addition, the service data guide information 1360 may further include identification information of a transmission target. For example, the identification information of a transmission target may include at least one of an MAC address of a target device, an NAN interface address, a device ID of the target device, a device name, a target service ID, and a service name. In FIG. 13, device B 1310-2 and device C 1310-3 are indicated as the transmission target. Accordingly, the device B 1310-2 and the device C 1310-3 receive the second proximity service data during a transmission period indicated by the service data guide information 1360. In contrast, device D 1310-4 that is not indicated as the transmission target is not woken up from a sleep state and does not receive data in the transmission period.

The second proximity service data may be transmitted through unicasting, multicasting, or broadcasting. For example, the transmitting device 1310-1 may change a transmission scheme according to the number of target devices that will receive the second proximity service data. In the case where the number of target devices is less than or equal to a predefined threshold value, the second proximity service data may be transferred to each target device through unicasting. In contrast, in the case where the number of target devices exceeds the predefined threshold value, the second proximity service data may be multicast or broadcast.

The second proximity service data may be transmitted through a post operation of the NAN standard. A post operation indicates an operation additionally performed in a period other than a synchronized DW. In this case, all or some of the information items included in the service data guide information 1360 may be included in scheduling information on the post operation.

Figure 14:
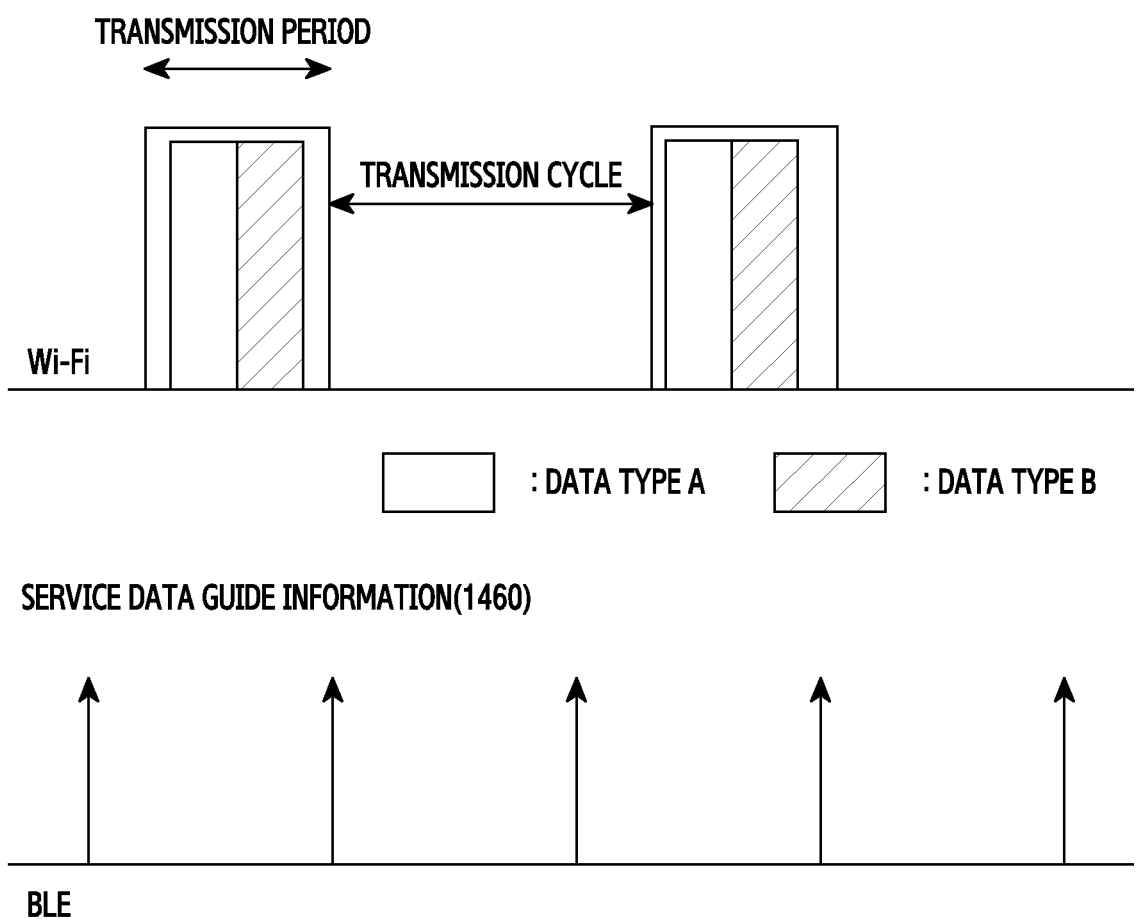
FIG. 14 is a diagram of a method of providing proximity service data according to an embodiment of the present disclosure.

FIG. 14 is a diagram of a method of providing proximity service data according to an embodiment of the present disclosure. FIG. 14 is an example of the case where first proximity service data is provided by BLE and second proximity service data is provided by Wi-Fi.

Referring to FIG. 14, the first proximity service data may be repeatedly transmitted by BLE. For example, the first proximity service data may be transmitted through a BLE beacon. The BLE beacon does not require synchronization, as opposed to the above described NAN. Accordingly, a receiving device may receive the first proximity service data by receiving the BLE beacon without a synchronization procedure. In this case, the first proximity service data includes service data guide information 1460. For example, the service data guide information 1460 may include information on a channel, a transmission start time, a transmission cycle, a transmission period, a transmission end time, transmitting device information, a transmission data description, a transmission communication method, a transmission target, etc. for the transfer of the second proximity service data.

The second proximity service data may be transmitted according to Wi-Fi. The second proximity service data may include a plurality of types (e.g., type A and type B) of data. However, according to an embodiment of the present disclosure, the second proximity service data may include a single type of data. In this case, the transmission period of the second proximity service data may be allocated to a period other than the transmission period of the first proximity service data according to BLE. That is, the second proximity service data may be transmitted during a time interval that does not overlap in time with the first proximity service data. Furthermore, the second proximity service data may be transmitted through a different channel than the first proximity service data.

Figure 15:
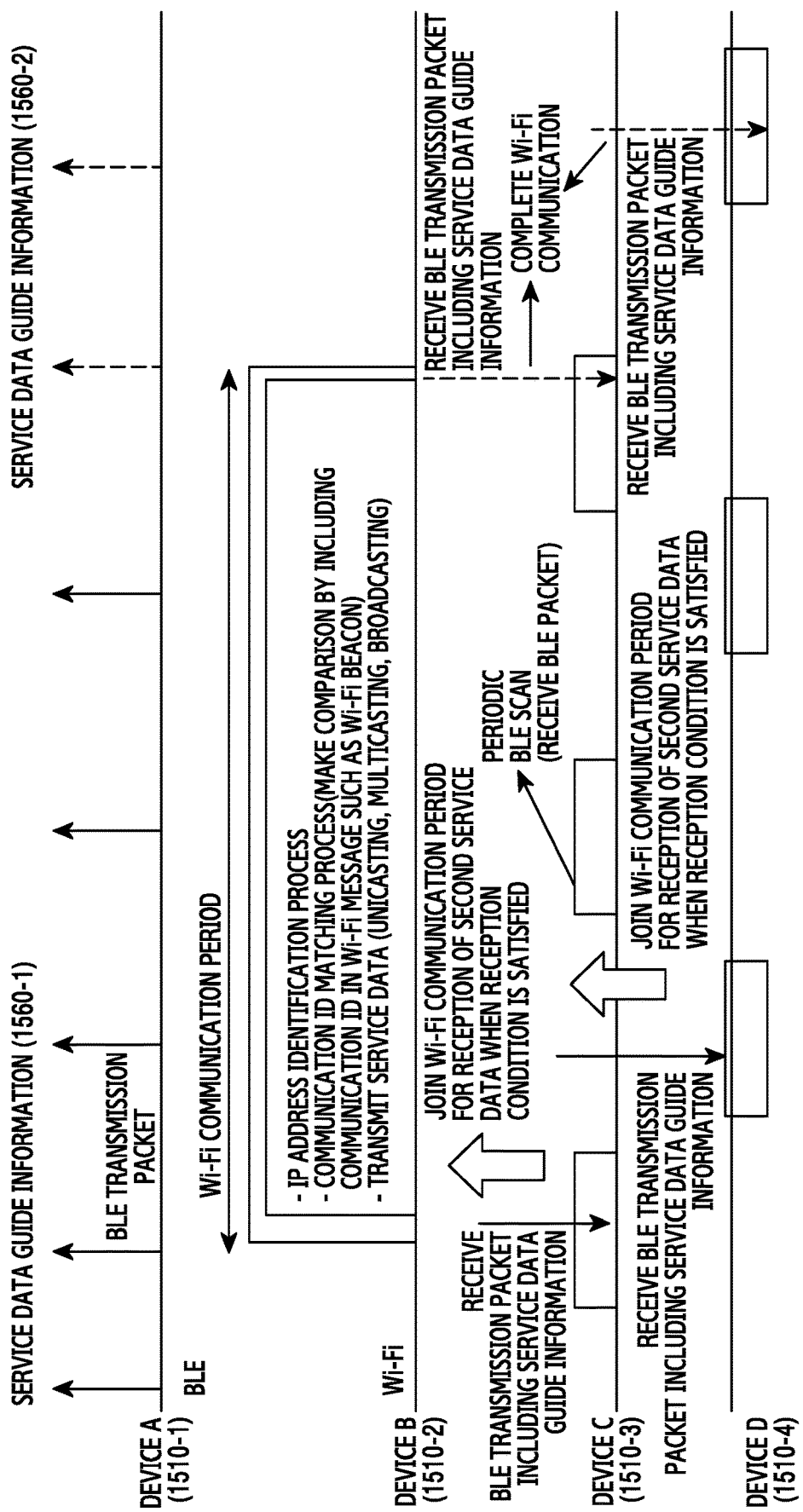
FIG. 15 is a diagram of a method of providing proximity service data according to an embodiment of the present disclosure.

FIG. 15 is a diagram of a procedure of providing proximity service data according to an embodiment of the present disclosure. FIG. 15 is an example of the case where first proximity service data is provided by BLE and second proximity service data is provided by Wi-Fi.

Referring to FIG. 15, the first proximity service data may be repeatedly transmitted by BLE. For example, the first proximity service data may be transmitted through a BLE beacon. The first proximity service data includes service data guide information 1560-1. For example, the service data guide information 1560-1 may include information on a channel, a transmission start time, a transmission cycle, a transmission period, a transmission end time, transmitting device information, a transmission data description, a transmission communication method, a transmission target, etc. for the transfer of the second proximity service data. Alternatively, according to an embodiment of the present disclosure, the service data guide information 1560-1 may include only the transmission start time and the transmission end time of the second proximity service data.

In FIG. 15, device A 1510-1 transfers a transmission start time and information on a channel for transmission through the service data guide information 1560-1. For example, the service data guide information 1560-1 may include information for notifying that the transmission of the second proximity service data starts. Then, device B 1510-2 transmits the second proximity service data through a channel indicated by the service data guide information 1560-1. That is, a transmission period starts in the channel indicated by the service data guide information 1560-1. In this case, although the device B 1510-2 may start the transmission through broadcasting, the device B 1510-2 may unicast the second proximity service data to each of devices 1510-3 and 1510-4, or may multicast the second proximity service data to the devices 1510-3 and 1510-4.

The devices 1510-3 and 1510-4 may perform a periodic BLE scan for receiving the BLE beacon. BLE scan periods and timing of the devices 1510-3 and 1510-4 may be different from each other. Accordingly, time points when the devices 1510-3 and 1510-4 that have received the BLE beacon join the transmission period or communication period may differ from each other. In other words, according to an embodiment of the present disclosure, the device A 1510-1 may periodically transmit a BLE beacon for announcing the start of transmission, and the devices 1510-3 and 1510-4 that received the BLE beacon at different timing may join a Wi-Fi communication period for the reception of the second proximity service data in the case where a reception condition is satisfied.

According to an embodiment of the present disclosure, the transmitting device B 1510-2 may determine which device has been joined. When the receiving devices 1510-3 and 1510-4 join the transmission period, each of the receiving devices 1510-3 and 1510-4 may announce their presence through a Wi-Fi beacon or a separate Wi-Fi message. In this case, each of the receiving devices 1510-3 and 1510-4 may include a communication ID transmitted by the device A 1510-1 through the BLE beacon in the Wi-Fi beacon or the separate message. Based on the communication ID, the transmitting device B 1510-2 may determine whether the receiving devices 1510-3 and 1510-4 are correct receiving devices.

Similarly to an embodiment of the present disclosure described above, the devices 1510-1 to 1510-4 which transmit data without a separate connection process may retain previously allocated IP addresses. In this case, likewise to the communication ID, the IP addresses may be transmitted to the devices 1510-1 to 1510-4 through a certain message, such as a separate Wi-Fi message or an address resolution protocol. The transmitting device B 1510-2 may unicast, multicast, or broadcast the second proximity service data through the IP address identified as described above.

In addition, when a transmission period ends, the device A 1510-1 may transmit a BLE beacon for announcing the end of the transmission. That is, the service data guide information 1560-2 transmitted after the end of the transmission period may include information for announcing that the transmission of the second proximity service data is completed. In this case, the BLE beacon may not include information relating to the transmission/reception of the second proximity service data. Accordingly, the devices 1510-3 and 1510-4 may recognize that the transmission of the second proximity service data has been completed, and may stop monitoring the Wi-Fi channel. According to an embodiment of the present disclosure, the information for announcing that the transmission of the second proximity service data has been completed may be transmitted from the device B 1510-2 through a Wi-Fi connection.

The second proximity service data may be transmitted according to Wi-Fi. The second proximity service data may include a plurality of types (e.g., type A and type B) of data. However, according to an embodiment of the present disclosure, the second proximity service data may include a single type of data. In this case, the transmission period of the second proximity service data may be allocated to a period other than the transmission period of the first proximity service data according to BLE. That is, the second proximity service data may be transmitted during a time interval that does not overlap in time with the first proximity service data. Furthermore, the second proximity service data may be transmitted through a different channel than the first proximity service data.

Figure 16:
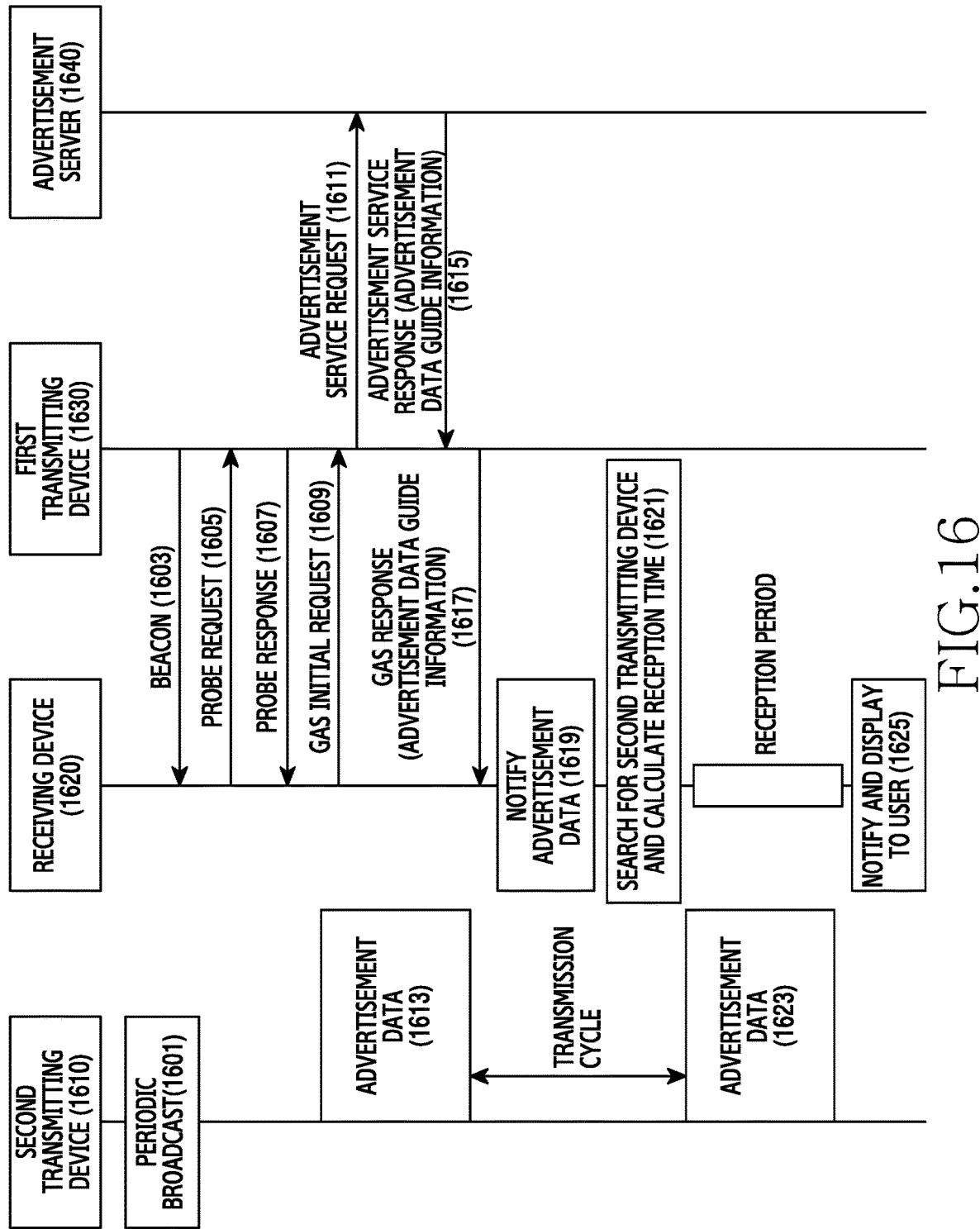
FIG. 16 is a flow diagram of a method of providing proximity service data according to an embodiment of the present disclosure.

FIG. 16 is a flow diagram of a procedure of providing proximity service data according to an embodiment of the present disclosure. FIG. 16 is an example of the case of using an advertisement system based on the IEEE 802.11u standard.

Referring to FIG. 16, in operation 1601, a second transmitting device 1610 may periodically transmit proximity service data. As second proximity service data, the proximity service data may include at least one type of data. The second transmitting device 1610 may include an AP or a user equipment.

In operation 1603, a receiving device 1620 may receive a beacon transmitted by a first transmitting device 1630. The beacon is a signal for announcing the presence of the first transmitting device 1603. The beacon may include information for notifying that an advertisement service is enabled. As a device for transmitting first proximity service data, the first transmitting device 1630 may include an AP or a user equipment.

In operation 1605, the receiving device 1620 may transmit a probe request to the first transmitting device 1630. The probe request is a signal transmitted in order to scan an AP in the relevant channel. The probe request may be transmitted to a certain AP, or may be broadcast to a plurality of APs.

In operation 1607, the first transmitting device 1630 may transmit a probe response to the receiving device 1620. The probe response is a response signal to the probe request. The probe response may include information on the first transmitting device 1630, and may include information for notifying that an advertisement service is enabled.

In operation 1609, the receiving device 1620 may transmit a GAS request to the first transmitting device 1630. That is, the receiving device 1620 queries the first transmitting device 1630 about information of an external network. The GAS request may be a signal according to an ANQP protocol. In this case, the GAS request is transmitted after the receiving device 1620 receives the probe response from the first transmitting device 1630. In other words, the GAS request is transmitted in a pre-association state.

In operation 1611, the first transmitting device 1630 may transmit an advertisement service request to an advertisement server 1640. That is, the first transmitting device 1630 requests proximity service data for advertisement from the advertisement server 1640 according to a query of the receiving device 1620. The advertisement server 1640 may be a server device connected to the internet network, an internal application, or a storage device.

In operation 1613, the second transmitting device 1610 may transmit advertisement data, namely, second proximity service data. That is, the second transmitting device 1610 determines that a transmission period has come, and transmits the second proximity service data. The advertisement data may include at least one of audio advertisement data, audio and video advertisement data, and image advertisement data. In this case, since the receiving device 1620 does not receive guide information yet, the receiving device 1620 may not receive the advertisement data transmitted by the second transmitting device 1610.

In operation 1615, the advertisement server 1640 may transmit an advertisement service response to the first transmitting device 1630. The advertisement service response includes proximity service data for advertisement. For example, the proximity service data may include first proximity service data, and at least one of an image, audio, a video, and text. For example, according to the embodiment of the present disclosure, the proximity service data includes advertisement data guide information for the second proximity service data. For example, the guide information may include at least one of a transmission start time, a transmission cycle, a transmission period, identification information (e.g., basic service set identification (BSSID)) of a transmitting device (e.g., the second transmitting device 1610), channel information, and a description of data for the second proximity service data.

In operation 1617, the first transmitting device 1630 may transmit a GAS response to the receiving device 1620. The GAS response includes proximity service data provided from the advertisement server 1640, namely, the first proximity service data. For example, according to an embodiment of the present disclosure, the GAS response includes advertisement data guide information.

In operation 1619, the receiving device 1620 may notify of advertisement data. In other words, the receiving device 1620 outputs the first proximity service data received from the first transmitting device 1630. In this case, the output may include at least one of a screen display and an audio output. In this case, prior to the output, the receiving device 1620 may display a screen for asking a user whether to display advertisement, and may output the first proximity service data according to the user's approval.

In operation 1621, the receiving device 1620 may search for the second transmitting device 1610 and calculates a reception time of advertisement data transmitted by the second transmitting device 1610. That is, the receiving device 1620 prepares to receive the second proximity service data transmitted by the second transmitting device 1610 based on the advertisement data guide information. For example, the receiving device 1620 may activate a module corresponding to a communication method for transferring the second proximity service data, tune a channel frequency, and determine a reception time point.

In operation 1623, the second transmitting device 1610 may transmit advertisement data, namely, second proximity service data. That is, the second transmitting device 1610 determines that a transmission period has come, and transmits the second proximity service data. In this case, the advertisement data is broadcast according to the advertisement data guide information. Accordingly, the receiving device 1620 performs a reception operation during a period determined according to the advertisement data guide information. The advertisement data may include at least one of audio advertisement data, audio and video advertisement data, and image advertisement data. In this case, since the receiving device 1620 does not receive guide information yet, the receiving device 1620 may not receive the advertisement data transmitted by the second transmitting device 1610.

In operation 1625, the receiving device 1620 may notify a user of proximity service data, namely, the second proximity service data. In other words, the receiving device 1620 outputs the second proximity service data received from the second transmitting device 1610. In this case, the output may include at least one of screen display and audio output. In this case, prior to the output, the receiving device 1620 may display a screen asking the user whether to display advertisement, and may output the second proximity service data according to the user's approval.

FIG. 16 is described above based on the network configured in accordance with the IEEE 802.11u standard. That is, an AP (e.g., the first transmitting device 1630) as a proxy for a GAS request/response exists, and a server (e.g., the advertisement server 1640) for storing advertisement information exists. However, an embodiment of the present disclosure based on the IEEE 802.11u standard is not limited to an infrastructure that is the same as or similar to that illustrated in FIG. 16. A user device serving as a mobile AP may exist, and an internal server of the user device or a connected external terminal may function as a server for storing the advertisement information. That is, the various embodiments of the present disclosure may also be applied to an inter-device advertisement system based on the IEEE 802.11u standard.

Figure 17:
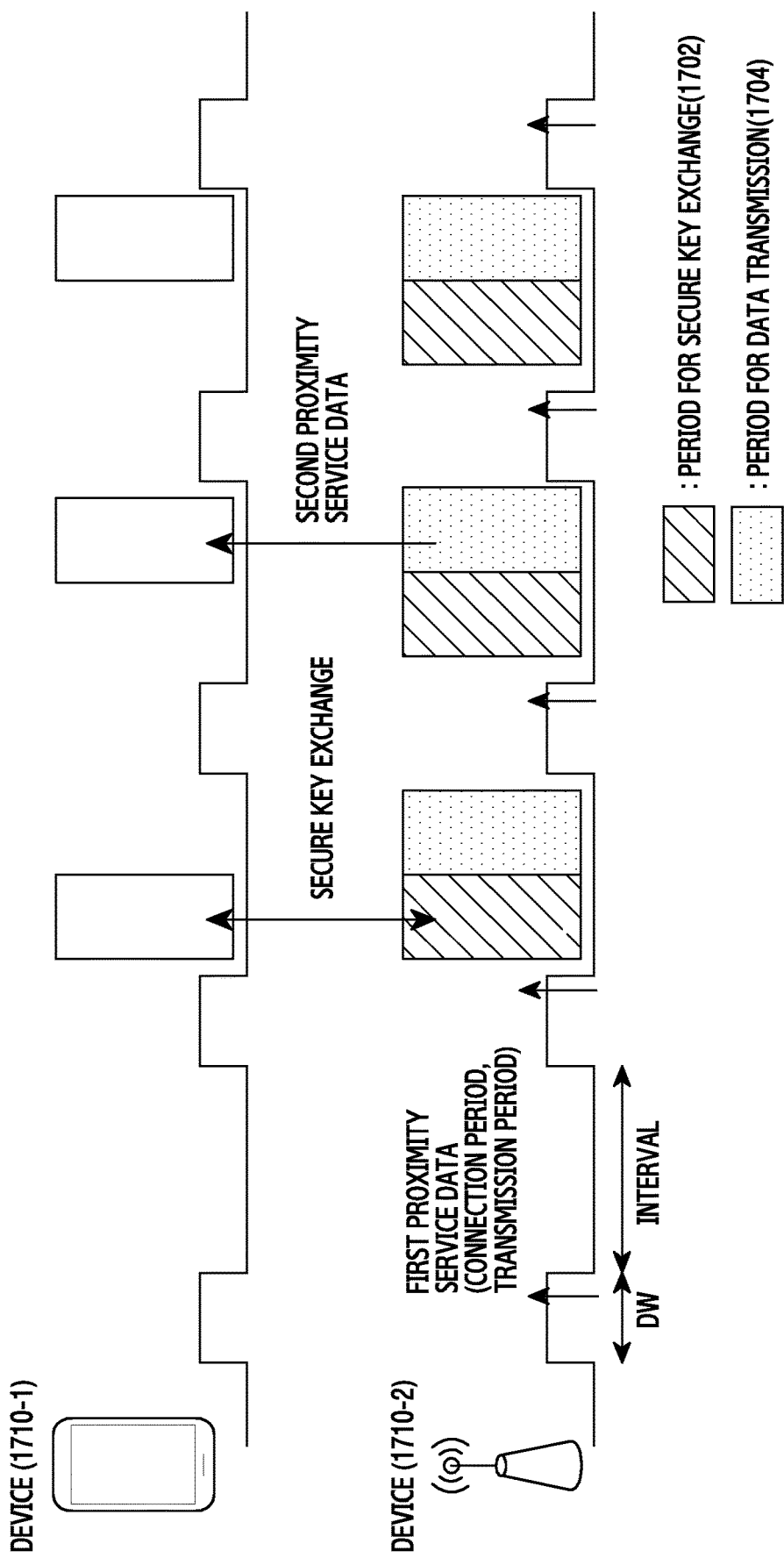
FIG. 17 is a diagram of a secure key exchange method for proximity service data according to an embodiment of the present disclosure.

FIG. 17 is a diagram of a secure key exchange method for proximity service data according to an embodiment of the present disclosure. FIG. 17 is an example of the case where security is applied to second proximity service data, namely, a case where the second proximity service data is encrypted.

Referring to FIG. 17, first proximity service data transmitted by a transmitting device 1710-2 may include guide information for the second proximity service data. The guide information may include information for a secure key exchange between the transmitting device 1710-2 transmitting the second proximity service data and a receiving device 1710-1 in addition to information necessary for receiving the second proximity service data. For example, in the case where the key is exchanged based on a connection, the information for secure key exchange may include information for a connection. Likewise to guide information for data transmission, the information for connection may indicate at least one of a communication method for connection and a period for which a connection is made. That is, the transmitting device 1710-2 may operate in a period 1702 for secure key exchange and in a period 1704 for data transmission, where the periods 1702 and 1704 may occupy mutually exclusive resources.

The receiving device 1701 that has identified the period 1702 for secure key exchange and a connection method establishes a connection with the transmitting device 1710-2 in the period 1702 for secure key exchange. For example, the connection may be made according to a method such as a Wi-Fi protected setup of Wi-Fi. However, according to another embodiment of the present disclosure, the key may be exchanged based on no connection. In this case, the operation of establishing the connection may be omitted. According to an embodiment of the present disclosure, the first proximity service data may include key information for the connection, thereby sharing the key.

In the period 1702 for secure key exchange, the transmitting device 1710-2 and the receiving device 1710-1 may synchronize a key for encrypting the second proximity service data based on a connection or no connection. In the case where the key is exchanged based on a connection, the key utilized in the connection may be used as an encryption key for transmitting the second proximity service data. In this case, after the secure key exchange is performed, the receiving device 1710-1 may not stand by in the rest of the period 1702 for a secure key exchange, and may perform a reception operation in the period 1704 for data transmission.

Figure 18:
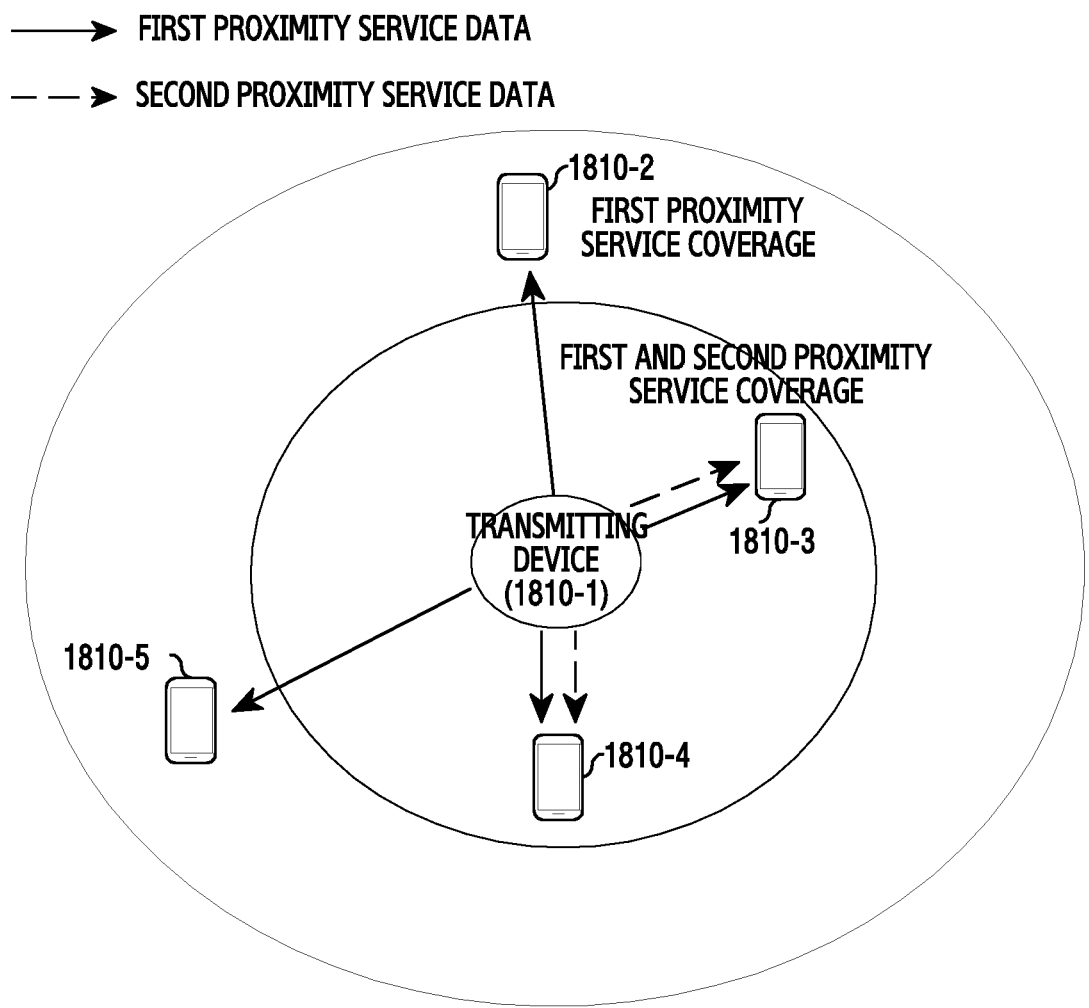
FIG. 18 is a diagram of coverage of proximity service data according to an embodiment of the present disclosure.

FIG. 18 is a diagram of coverage of proximity service data according to an embodiment of the present disclosure.

Referring to FIG. 18, coverage of second proximity service data and coverage of first proximity service data may differ from each other. That is, a transmitting device 1810-1 may use different transmission powers for the first proximity service data and the second proximity service data. Accordingly, receiving devices 1810-2, 1810-3, 1810-4, and 1810-5 may fail to receive the second proximity service data according to locations thereof.

That is, a presence or absence in coverage may be used as a condition for determining whether the receiving devices can receive the second proximity service data. For example, the condition may include a threshold value for one of a received signal strength indicator (RSSI), a distance, a signal to noise ratio (SNR), a bit error rate, and a frame error rate. In addition, the condition may include guide information for the second proximity service data. That is, the receiving devices 1810-2, 1810-3, 1810-4, and 1810-5 may determine the RSSI, the distance, and the like through a signal including the first proximity service data, and when a quality is greater than the condition specified in the guide information, the receiving devices may attempt to receive the second proximity service data in a period for data transmission indicated in the guide information.

Figure 19:
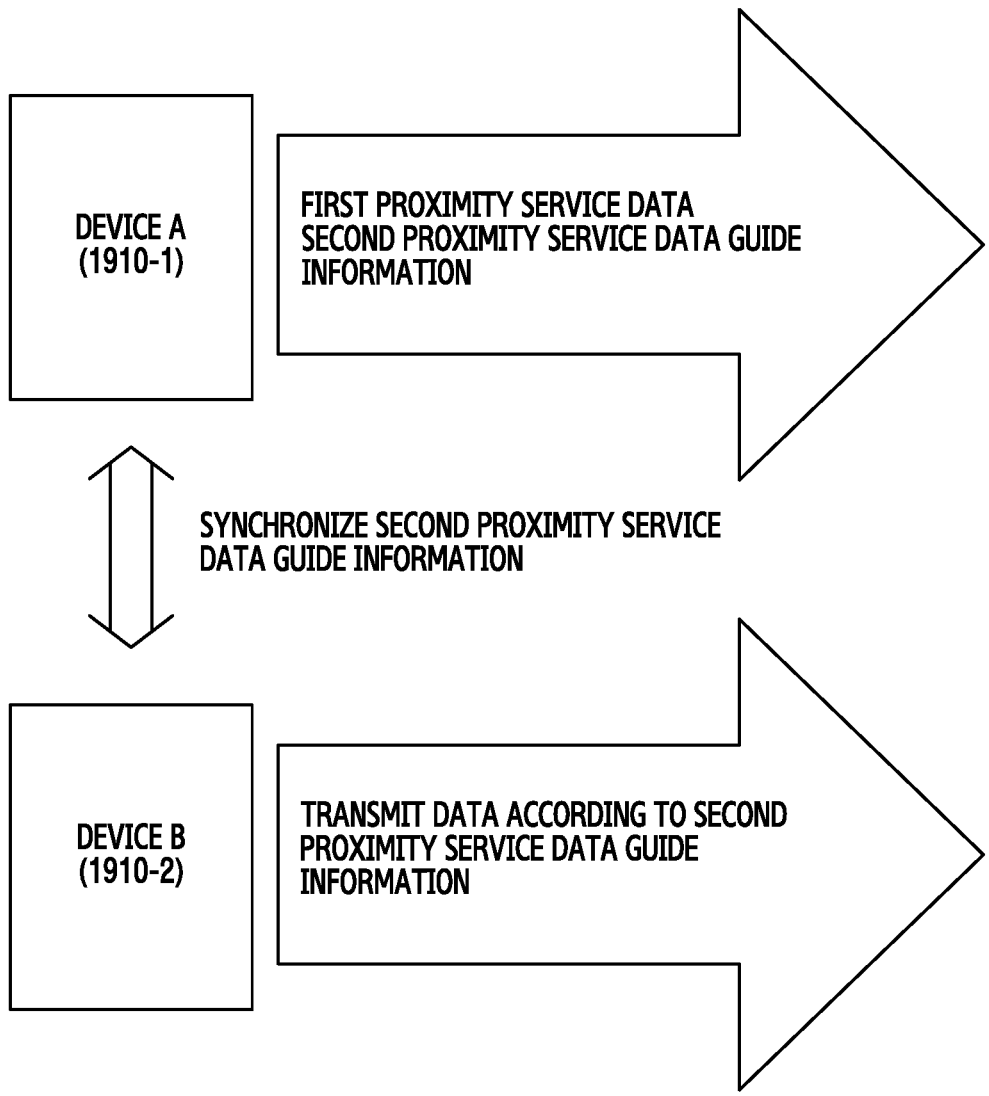
FIG. 19 is a diagram of an interaction between subjects that provide proximity service data according to an embodiment of the present disclosure.

FIG. 19 is a diagram of an interaction between subjects that provide proximity service data according to an embodiment of the present disclosure. FIG. 19 is an example of the case where first proximity service data and second proximity service data are transmitted by different devices.

Referring to FIG. 19, the first proximity service data is transmitted by device A 1910-1, and the second proximity service data is transmitted by device B 1910-2. The first proximity service data includes guide information for transmitting the second proximity service data. The guide information may include information on the device B 1910-2 functioning to transmit the second proximity service data. In this case, the device A 1910-1 transmitting the first proximity service data and the device B 1910-2 transmitting the second proximity service data synchronize the guide information for transmitting the second proximity service data. The guide information may be synchronized by an operator offline, or may be synchronized by a procedure predefined between the device A 1910-1 and the device B 1910-2. For example, the predefined procedure may include an initial guide information determining step, an updated guide information providing step, and the like. In this case, the guide information may be provided from the device A 1910-1 to the device B 1910-2, or vice versa. Alternatively, the guide information may be determined by a request and identification between the device A 1910-1 and the device B 1910-2.

The device A 1910-1 and the device B 1910-2 may be connected through short-range communication or an external net to communicate with each other. For example, the external net may be an IP network, and the device A 1910-1 and the device B 1910-2 may be connected to each other through a cloud service. The device A 1910-1 may have control authority for controlling the transmission of the device B 1910-2. That is, the device B 1910-2 may transmit the second proximity service data under the control of the device A 1910-1.

The information on the device B 1910-2, which is included in the guide information, may include location information of the device B 1910-2. Accordingly, a receiving device may determine whether a plurality of devices that transmit the second proximity service data are distributed in a long range. In the case where a device transmitting the second proximity service data is located in a long range, the receiving device can reduce power consumption by selectively activating a reception function.

Figure 20:
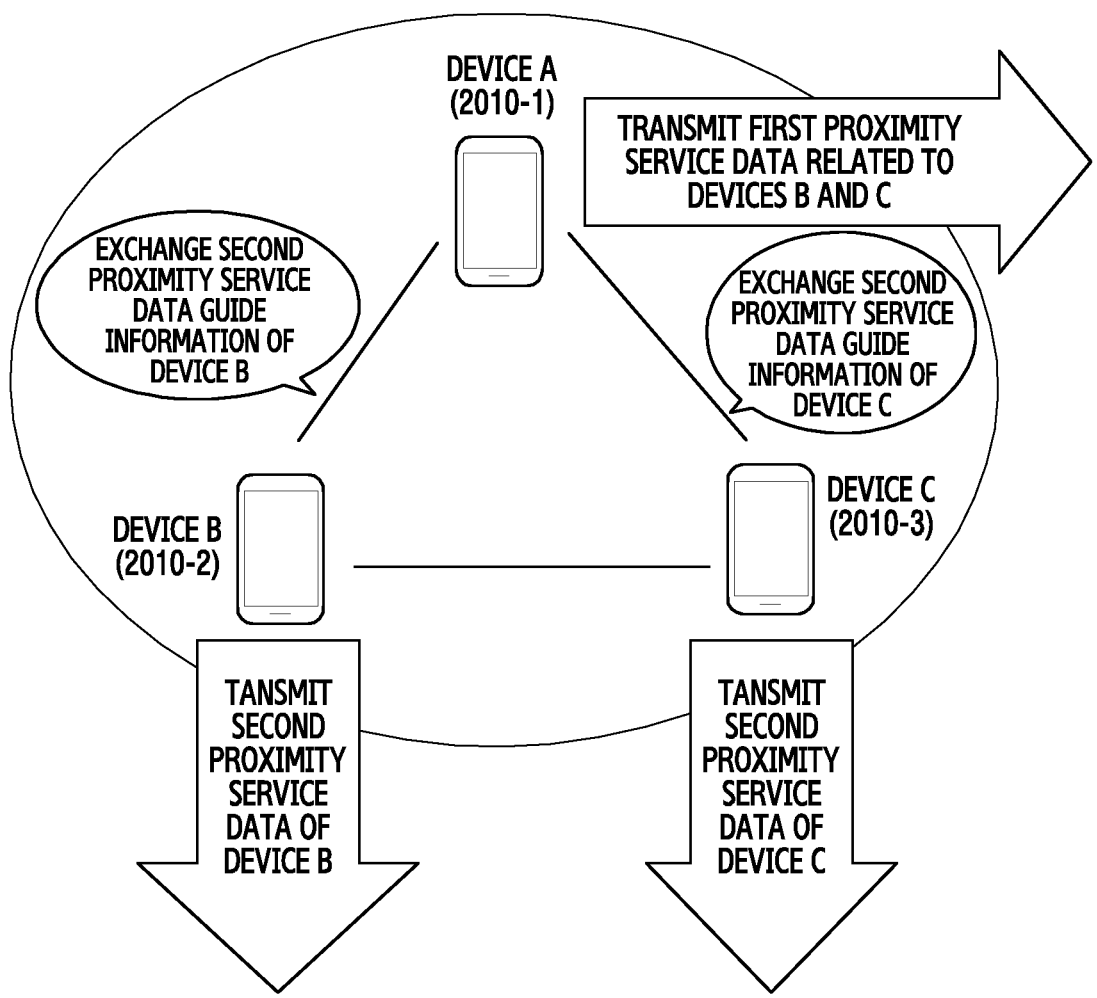
FIG. 20 is a diagram of subjects that provide proximity service data according to an embodiment of the present disclosure.

FIG. 20 is a diagram of subjects that provide proximity service data according to an embodiment of the present disclosure. FIG. 20 is an example of the case where second proximity service data is transmitted by a plurality of devices.

Referring to FIG. 20, device A 2010-1, device B 2010-2, and device C 2010-3 form a group. For example, the group may be formed based on Wi-Fi direct, independent basic service set (IBSS), mobile hotspot network, Bluetooth connection network, or the like.

The device A 2010-1 transmits first proximity service data, and the device B 2010-2 and the device C 2010-3 transmit second proximity service data. In this case, the data transmitted by the device B 2010-2 and the data transmitted by the device C 2010-3 may include different content. According to an embodiment of the present disclosure, the device A 2010-1 may transmit the first proximity service data, and simultaneously transmit guide information for the second proximity service data of the device B 2010-2 and guide information for the second proximity service data of the device C 2010-3. The device A 2010-1, the device B 2010-2, and the device C 201-03 may synchronize the guide information for the second proximity service data through a connection network. Accordingly, the device B 2010-2 and the device C 2010-3 may transmit the second proximity service data thereof according to the guide information transmitted by the device A 2010-1.

According to an embodiment of the present disclosure described above, the first proximity service data includes the guide information for the second proximity service data. However, in the case where it is unnecessary to transmit the second proximity service data, the first proximity service data may not include the guide information. Accordingly, a transmitting device may determine whether it is necessary to transmit the second proximity service data, and if not, the transmitting device may not transmit the guide information. An example of controlling the transmission of the second proximity service data and the guide information is illustrated in FIG. 21, which is described below.

Figure 21:
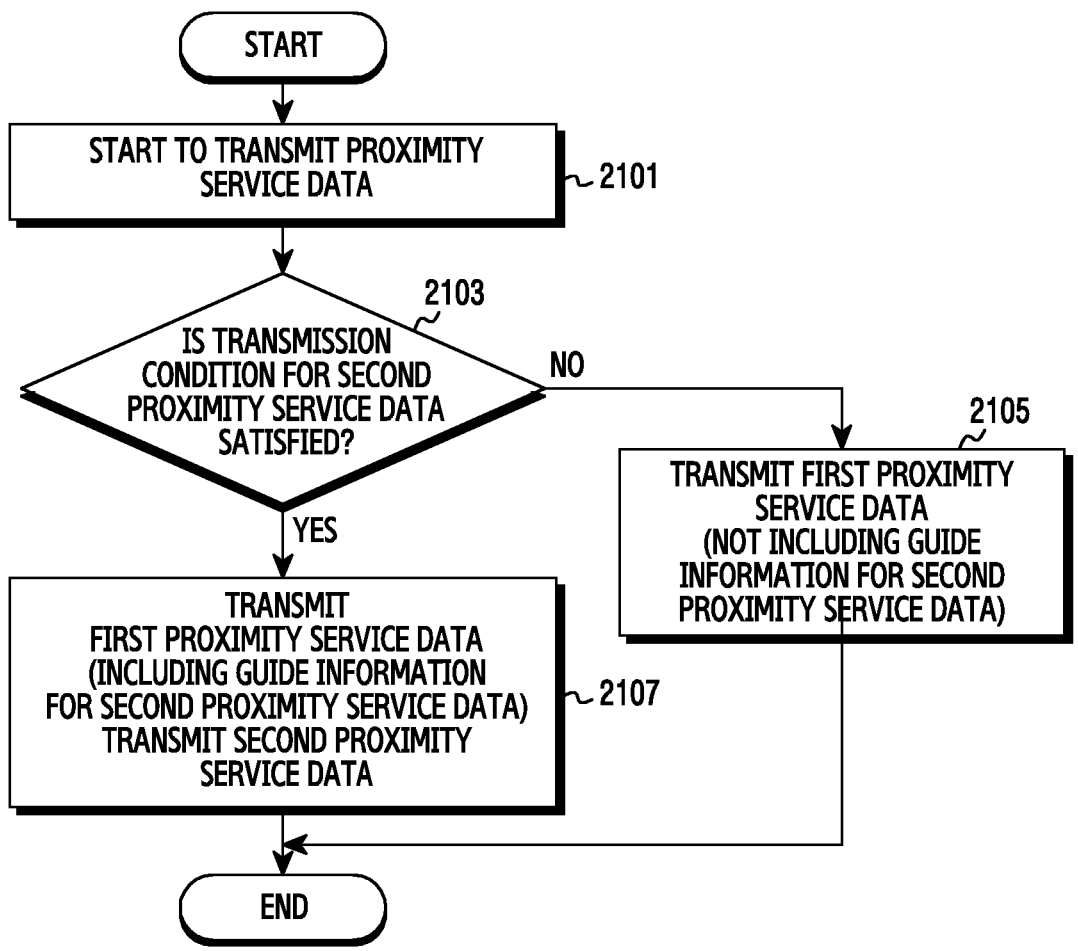
FIG. 21 is a flowchart of a method of providing proximity service data according to an embodiment of the present disclosure.

FIG. 21 is a flowchart of a method of providing proximity service data according to an embodiment of the present disclosure. FIG. 21 is an example of the case of selectively transmitting second proximity service data.

Referring to FIG. 21, a transmitting device may start to transmit proximity service data in operation 2101. The transmitting device may determine whether a transmission condition for second proximity service data is satisfied in operation 2103. When the determination result indicates that the transmission condition is not satisfied, the transmitting device may transmit first proximity service data that does not include guide information in operation 2105. In contrast, when the determination result indicates that the transmission condition is satisfied, the transmitting device may transmit first proximity service data that includes the guide information in operation 2107. Further, the transmitting device may transmit the second proximity service data, or control another device to transmit the second proximity service data.

In FIG. 21, the condition may be defined differently according to an embodiment of the present disclosure. For example, the condition may be constant transmission. In another example, the condition may be defined such that the second proximity service data is transmitted in at least one case among a case where a device capable of receiving a proximity service is identified to be present on the periphery, a case where a device for receiving a proximity service on the periphery and a transmitting device have the same service or service ID, the same venue ID, the group ID, and the like, a case where the capability of a receiving device (e.g., supported connectivity, a battery level, sleep mode or not, a device type, a presence or absence of a display means, the size of the display means, etc.) satisfies a pre-defined reference, a case where the distance away from a receiving device (e.g., a distance measured through RSSI or RTT) satisfies a pre-defined reference, a case where a receiving device is stored in a transmitting device, a case where the transmission of the second proximity service data may be selected and data may be indicated through a user interface (UI), and a case where a user consents to transmission.

Figure 22:
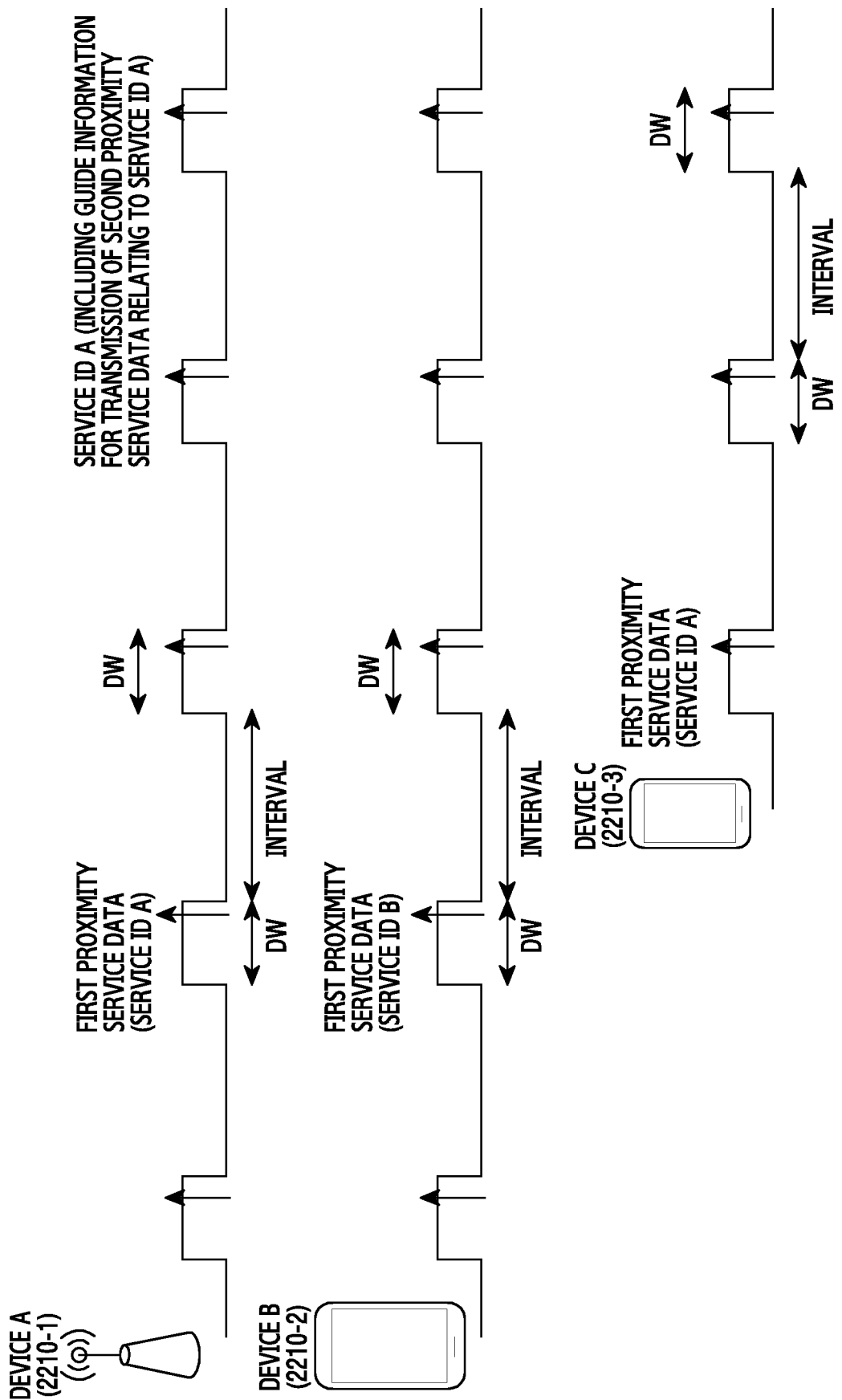
FIG. 22 is a diagram of a method of selectively providing proximity service data according to an embodiment of the present disclosure.

FIG. 22 is a diagram of a method of selectively providing proximity service data according to an embodiment of the present disclosure. FIG. 22 illustrates transmission of proximity service data between synchronized devices in an NAN network. FIG. 22 is an example of the case of selectively transmitting second proximity service data depending on whether service IDs coincide with each other.

Referring to FIG. 22, device A 2210-1, device B 2210-2, and device C 2210-3 transmit signals through synchronized DWs. In this case, the device A 2210-1, the device B 2210-2, and the device C 2210-3 transmit first proximity service data. In this case, when service IDs of synchronized service frames or the first proximity service data are the same in the respective DWs, guide information for transmitting corresponding second proximity service data may be transmitted, and the second proximity service data may be transmitted in the period indicated by the guide information.

For example, a description is provided below based on the device A 2201-1. The device A 2210-1 transmits first proximity service data for a service corresponding to service ID A. Further, the device B 2210-2 transmits first proximity service data for a service corresponding to service ID B. Since the service IDs of the device A 2210-1 and the device B 2210-2 differ from each other, neither the device A 2210-1 nor the device B 2210-2 transmits second proximity service data and guide information. Thereafter, the device C 2210-3 transmits first proximity service data for the service corresponding to the service ID A. Accordingly, the device A 2210-1 identifies that the service ID of the service provided by the device C 2210-3 coincides with its service ID, and transmit guide information for the second proximity service data relating to the service ID A.

In FIG. 22, the device B 2210-2 and the device C 2210-3 transmit proximity service data. However, according to an embodiment of the present disclosure, the device B 2210-2 and the device C 2210-3 may only transmit service IDs other than proximity service data.

Figure 23:
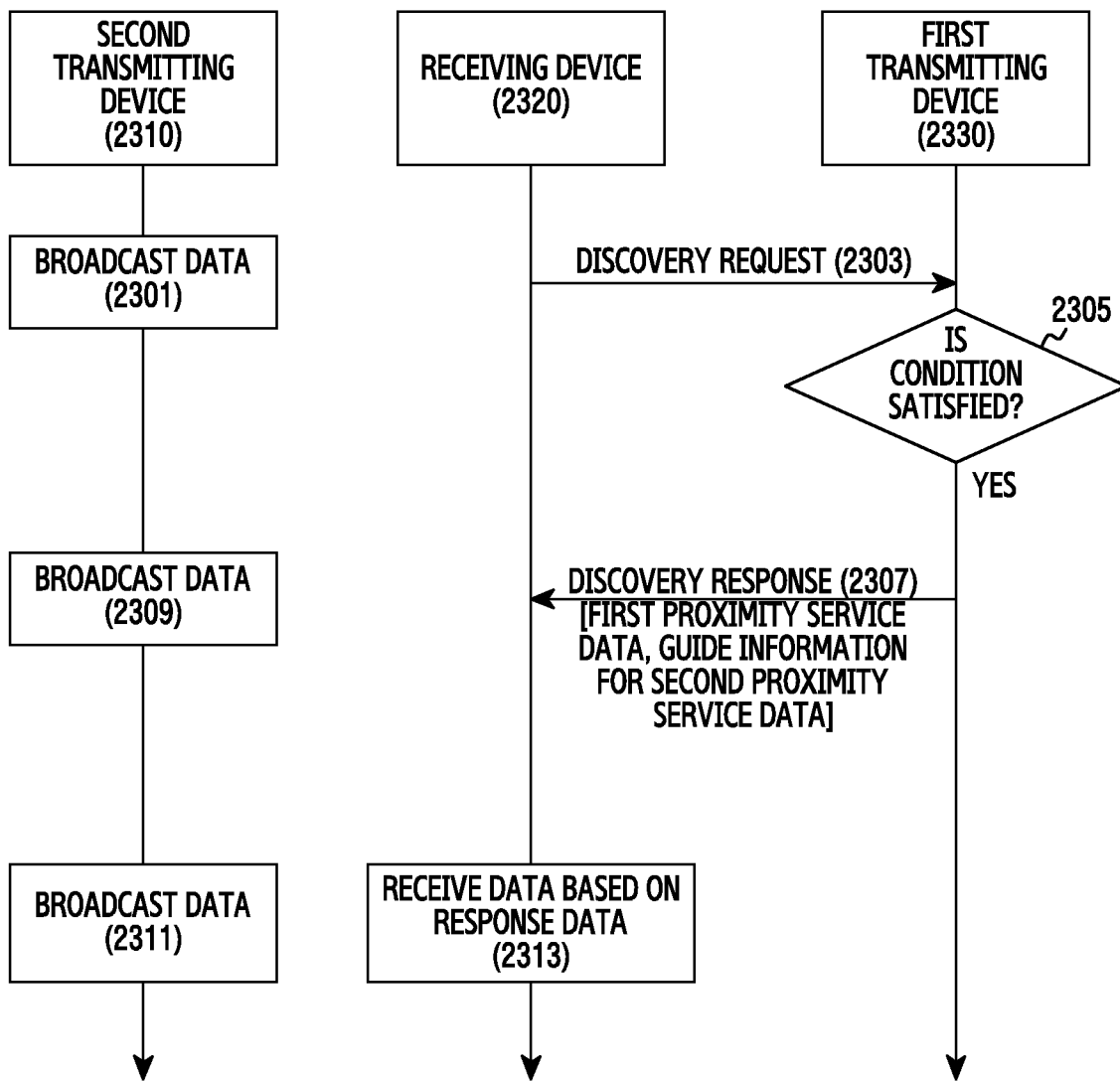
FIG. 23 is a flow diagram of a method of selectively providing proximity service data according to an embodiment of the present disclosure.

FIG. 23 is a flow diagram of a procedure of selectively providing proximity service data according to an embodiment of the present disclosure. FIG. 23 is an example of the case where discovery is made between devices. For example, the discovery may be performed by the IEEE 802.11scan, Wi-Fi peer to peer (P2P) scan, the IEEE 802.11uscan, the Bluetooth scan, or the like. For example, the discovery of FIG. 23 is performed by a procedure in which another device transmits a discovery response in response to an active discovery request of a receiving device 2320.

Referring to FIG. 23, in operation 2301, a second transmitting device 2310 may broadcast data, namely, proximity service data. The second proximity service data may be periodically broadcast. In operation 2303, the receiving device 2320 may transmit a discovery request. The discovery request is received by a first transmitting device 2330. The first transmitting device 2330 is a device that transmits first proximity service data.

In operation 2305, the first transmitting device 2330 may determine whether a condition for transmission of guide information is satisfied. For example, the condition may be defined to be satisfied in at least one case among a case where the device type of the receiving device 2320 corresponds to a pre-defined reference, a case where connectivity/service supported by the receiving device 2320 corresponds to a pre-defined reference, a case where the receiving device 2320 pertains to a pre-allowed device list, and a case where the distance away from the receiving device 2320 is less than or equal to a threshold value. In this case, the list may have the format of a contact list, a storage list, or a favorite list of a device. When the condition is satisfied, the first transmitting device 2330 may transmit a discovery response in operation 2307. In this case, the discovery response includes first proximity service data, and further includes guide information for the second proximity service data. In operation 2309, the second transmitting device 2310 may broadcast the second proximity service data. Then, in operation 2311, the second transmitting device 2310 may broadcast the second proximity service data. Accordingly, in operation 2313, the receiving device 2320 may receive the second proximity service data based on response data. In other words, the receiving device 2320 may receive the second proximity service data in the transmission period indicated by the guide information.

In FIG. 23, the second transmitting device 2310 periodically transmits the second proximity service data irrespective of the determination of the first transmitting device 2330. However, according to an embodiment of the present disclosure, the second transmitting device 2310 may selectively transmit the second proximity service data according to the control of the first transmitting device 2330. In this case, the first transmitting device 2330 may control the second transmitting device 2310 to transmit the second proximity service data when the condition in operation 2305 is satisfied.

Figure 24:
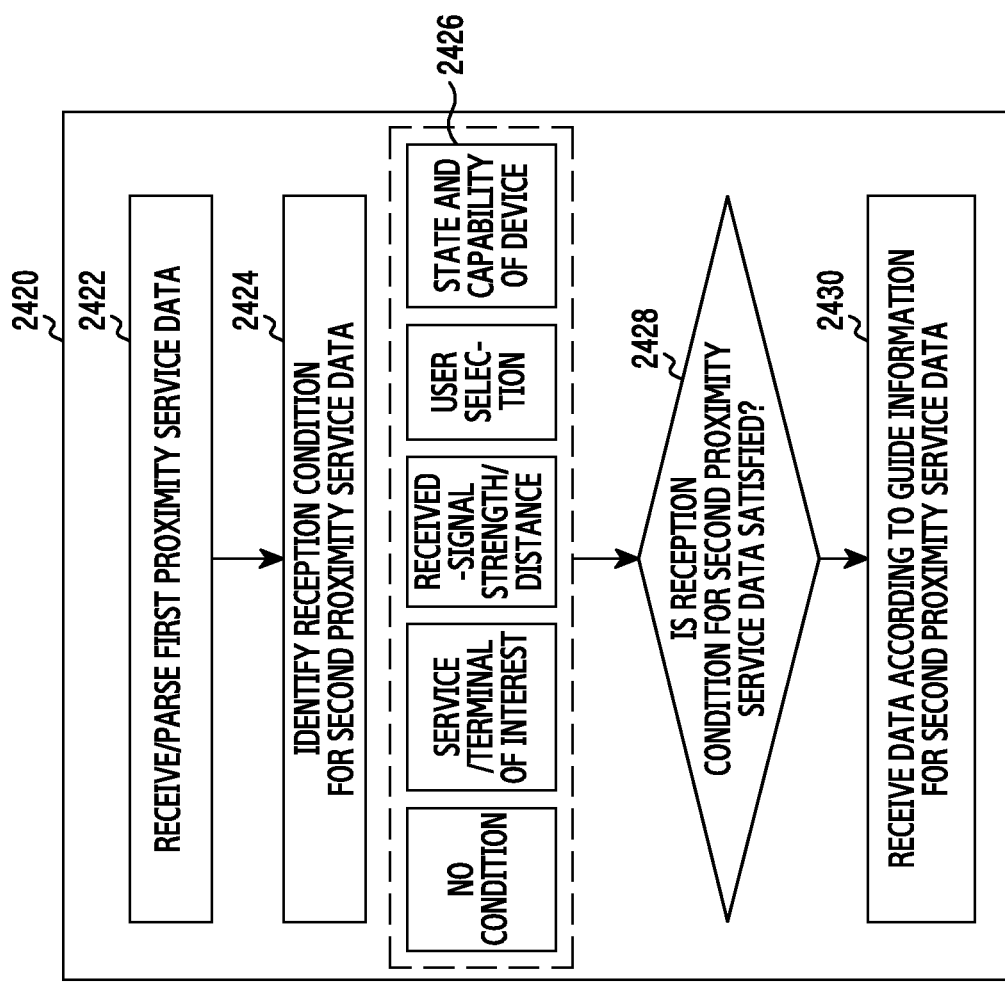
FIG. 24 is a block diagram of an electronic device according to an embodiment of the present disclosure.

FIG. 24 is a block diagram of an electronic device according to an embodiment of the present disclosure.

Referring to FIG. 24, a proximity service data providing device 2410 transmits first proximity service data and second proximity service data. According to an embodiment of the present disclosure, the first proximity service data and the second proximity service data may be transmitted by different devices.

A receiving device 2420 includes a block 2422 for receiving and parsing the first proximity service data, a block 2424 for identifying a reception condition for the second proximity service data, a block 2426 for storing the reception condition, a block 2428 for determining whether the reception condition is satisfied, and a block 2430 for receiving data according to guide information for the second proximity service data. In this case, the reception condition may not exist. Alternatively, the reception condition may be defined in regard to at least one of a service/terminal of interest or not, received-signal strength, a distance, a user selection, and a state and capability of a device. Accordingly, the receiving device 2420 identifies information by receiving and parsing the first proximity service data. The identified information may be transferred to a user UI layer and may be notified to a user. The receiving device 2420 identifies a stored reception condition for the second proximity service data before receiving the second proximity service data. If there is no reception condition, the receiving device 2420 may receive the second proximity service data without a separate determination when the guide information included in the first proximity service data is identified.

In the case where the condition is defined in regard to a service/terminal of interest or not, the receiving device 2420 may determine whether to receive the second proximity service data according to whether the transmitting device that transmits the first proximity service data corresponds to a pre-stored allowed or favorite device. Further, the receiving device 2420 may receive the second proximity service data when a corresponding service satisfies a service filtering condition stored in the receiving device 2420.

In the case where the condition is defined in regard to received-signal strength, a distance, a reception error rate, etc., the receiving device 2420 measures at least one of received-signal strength, a distance, and a reception error rate by analyzing the first proximity service data. When at least one of the received-signal strength, the distance, and the reception error rate corresponds to a pre-defined reference, the receiving device 2420 may determine to receive the second proximity service data.

In the case where the condition is defined in regard to a user selection, the receiving device 2420 may notify a user of information on the first proximity service data through a UI, and may display information relating to the second proximity service data through a display unit. In this case, when a user selection (e.g., a click) is input, the receiving device 2420 may determine to receive the second proximity service data based on the input.

In the case where the condition is defined in regard to capability of the receiving device 2420, the receiving device 2420 analyzes the first proximity service data in order to determine whether the second proximity service data can be received or displayed by using the current capacity of the receiving device. Further, the receiving device 2420 may determine whether to receive the second proximity service data according to the determination result. For example, in the case where the receiving device 2420 does not include a display unit, or the display unit is not suitable for representing content, the receiving device 2420 may not receive the second proximity service data.

In the case where the condition is defined in regard to a state of the receiving device 2420, the receiving device 2420 may be in a sleep state, or may determine whether to receive the second proximity service data based on a battery level. For example, when the receiving device 2420 is in the sleep state, or when the battery level is less than or equal to a threshold value, the receiving device 2420 may not receive the second proximity service data.

When at least one of the pre-defined conditions described above is satisfied, the receiving device 2420 determines to receive the second proximity service data. Accordingly, the receiving device 2420 may receive the second proximity service data in the transmission period indicated by the guide information.

Figure 25:
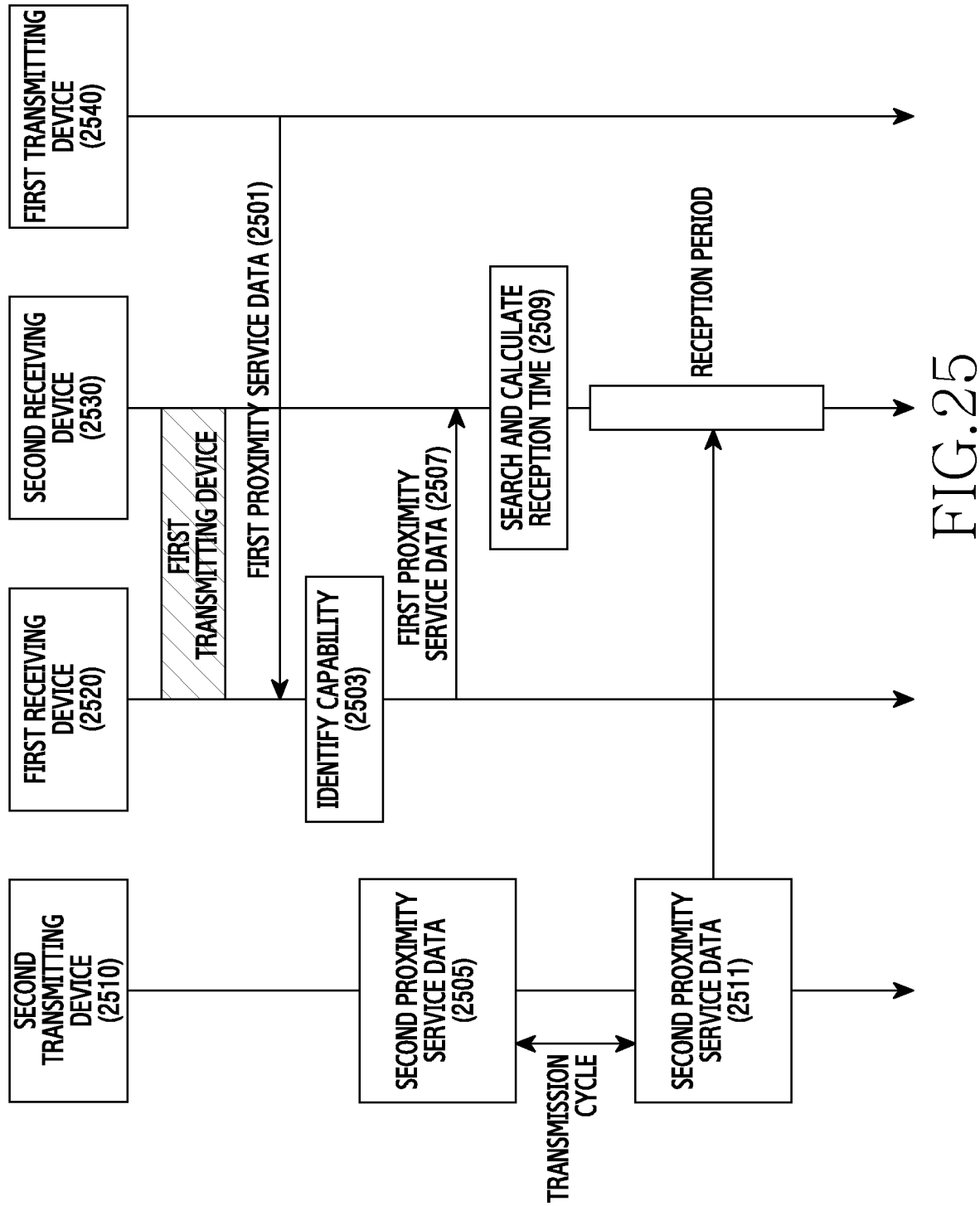
FIG. 25 is a flow diagram of a method of providing proximity service data by a plurality of receiving devices according to an embodiment of the present disclosure.

FIG. 25 is a flow diagram of a method of providing proximity service data by a plurality of receiving devices according to an embodiment of the present disclosure. FIG. 25 is an example of the case where first proximity service data and second proximity service data are received by different receiving devices. For example, in the case where the capability or state of a receiving device that receives the first proximity service data fails to satisfy a pre-defined condition, the second proximity service data may be received by another receiving device.

Referring to FIG. 25, initially, a first receiving device 2520 and a second receiving device 2530 are connected to each other. In operation 2501, the first receiving device 2520 may receive the first proximity service data from a first transmitting device 2540. The first proximity service data may include guide information for the second proximity service data and condition information for the reception of the second proximity service data.

In operation 2503, the first receiving device 2520 may identify capability thereof. In this case, the capability may include at least one of whether a bearer for receiving the second proximity service data is supported, a presence or absence of a display unit, a supported resolution of the display unit, the size of the display unit, whether functionality necessary for outputting the second proximity service data is supported, whether the receiving device is in a sleep state, and a residual quantity of a battery. Although FIG. 25 is an example of identifying the capability, other pieces of information for determining the condition, other than the capability of the first receiving device 2520, may be identified according to an embodiment of the present disclosure. In FIG. 25, the first receiving device 2520 determines whether a condition for receiving the second proximity service data is satisfied.

In operation 2505, a second transmitting device 2510 may transmit the second proximity service data. The second proximity service data may be periodically transmitted. According to an embodiment of the present disclosure, the second transmitting device 2510 may transmit the second proximity service data according to the control of the first transmitting device 2540.

In operation 2507, the first receiving device 2520 may transmit the first proximity service data to the second receiving device 2530. That is, the first receiving device 2520 transfers the second proximity service data it received to the second receiving device 2530. In this case, the first receiving device 2520 also provides the guide information to the second receiving device 2530. The second receiving device 2530 may be selected due to a connection or connection history to the periphery. The first proximity service data to be provided to the second receiving device 2530 may be transferred by forwarding data of a chip level. In this case, the host of the second receiving device 2530 in a sleep state may not be woken up, thereby reducing current consumption.

In operation 2509, the second receiving device 2530 may search for the second transmitting device 2510 indicated by the guide information, and calculates a reception time, namely, a transmission period indicated by the guide information.

In operation 2511, the second transmitting device 2510 may transmit the second proximity service data. The second proximity service data may be periodically transmitted. Accordingly, the second receiving device 2530 may receive the second proximity service data.

The embodiment of the present disclosure illustrated in FIG. 25 may be applied to a mobile device (e.g., a smart phone) and a wearable device (e.g., a smart watch). In other words, the first receiving device 2520 may be a wearable device, and the second receiving device 2530 may be a mobile device. In the case where the mobile device and the wearable device are used while being connected to each other, a user may generally receive a basic notification through the wearable device. In this case, although the wearable device may receive the first proximity service data, the wearable device may consume a large amount of power to receive and display the second proximity service data, and a display unit may not be large enough to receive and display the second proximity service data. Accordingly, the wearable device may transfer the first proximity service data to the mobile device, and may transfer the reception of the second proximity service data.

Figure 26A:
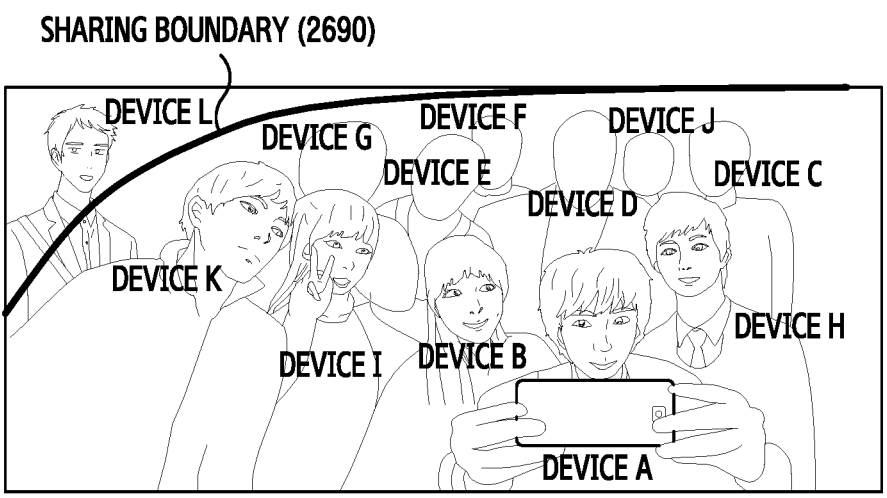
FIGS. 26A and 26B are diagrams of proximity service data transfer according to an embodiment of the present disclosure.
Figure 26B:
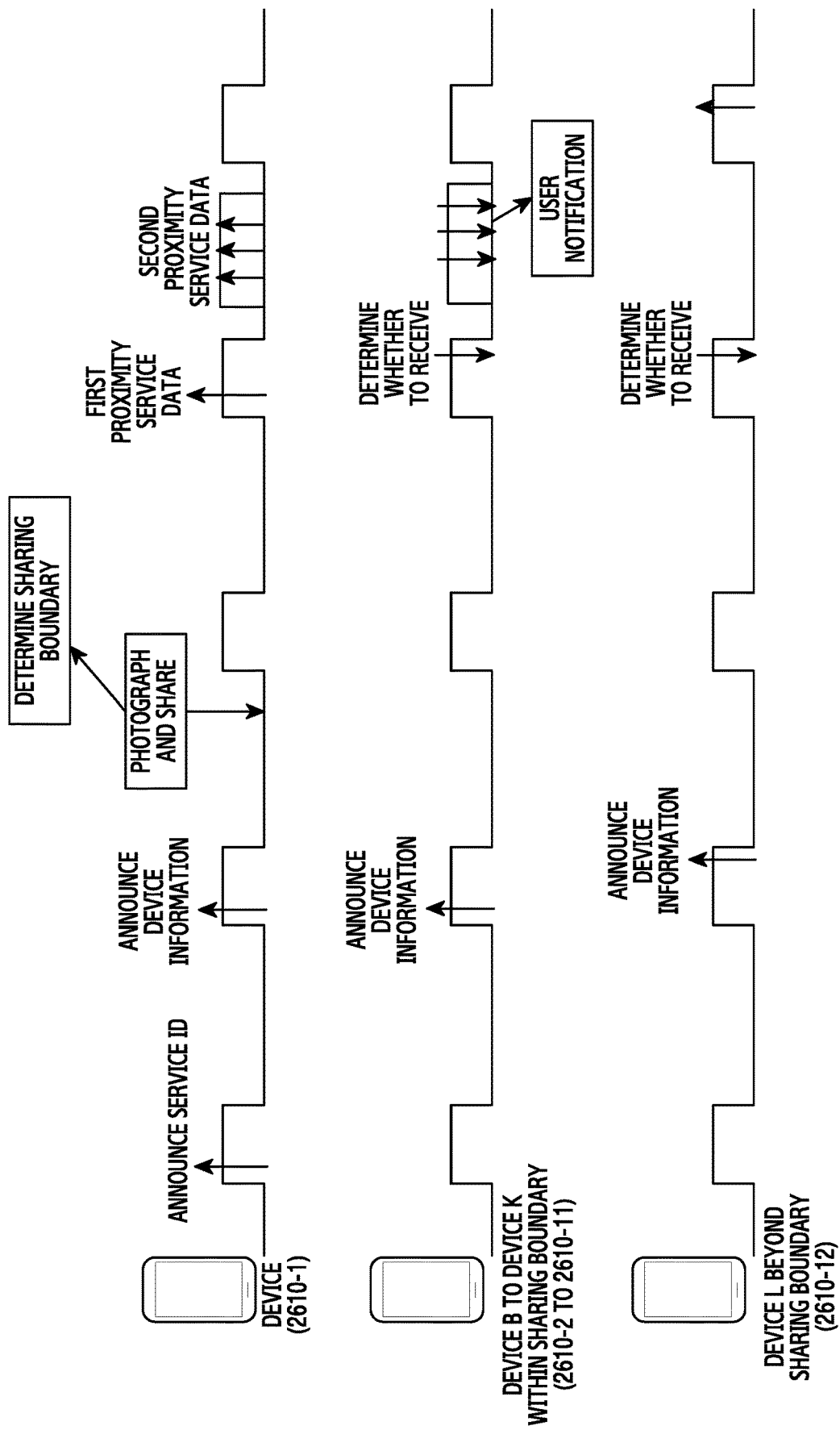

FIGS. 26A and 26B are diagrams of proximity service data transfer according to an embodiment of the present disclosure. In FIGS. 26A and 26B, NAN is utilized, and sharing a photographed image is illustrated.

Referring to FIG. 26A, a plurality of synchronized devices 2610-1 to 2610-12 exist. Proximity service data transmission, according to an embodiment of the present disclosure, may be utilized to transfer an image taken by one of the devices 2610-1 to 2610-12 to the other devices therearound. As such, surrounding users can be automatically provided with the image without special actions thereof. However, the image is transmitted to the devices 2610-2 to 2610-11 other than the device L 2610-12 beyond a sharing boundary 2690.

Referring to FIG. 26B, for the purpose for sharing an image with the surrounding devices 2610-2 to 2610-11, the device A 2610-1 executes a service for taking an image. For example, the device A 2610-1 may activate a sharing mode of a camera application. The synchronized device A 2610-1 executes the service and announces a service ID or a service name corresponding to the service through a DW. The service ID may be included in first proximity service data according to an embodiment of the present disclosure. However, first proximity service data that includes the service ID may not include service data guide information.

In the case where the synchronized surrounding devices 2610-2 to 2610-12 retain the same service, that is, in the case where the other devices 2610-2 to 2610-12 recognize the sharing mode of the camera application, the other devices 2610-2 to 2610-12 may announce device information thereof in response to the announcement of the service ID. The device information may include the phone number of a relevant device, an image of the device owner, and the like, and may further include an ID for distinguishing the device owner. In addition, the device A 2610-1 may also transmit the device information. The device information may be included in first proximity service data according to various embodiments of the present disclosure. However, first proximity service data that includes the device information may not include service data guide information.

When an image is taken by the device A 2610-1, the device A 2610-1 may transmit the image to the other devices 2610-2 to 2610-11. In this case, the image may be shared only with the limited devices 2610-2 to 2610-11. For example, only the devices 2610-2 to 2610-11 having actually participated in taking the image may be defined as sharing targets. The device A 2610-1 which transmits the image may specify the devices 2610-2 to 2610-11 which will receive the image, by adding the sharing boundary 2690 condition. For example, a camera measures the distance away from a subject for a focal length before taking an image, and the device A 2610-1 may define the sharing boundary 2690 based on the distance information and may transmit information on the sharing boundary 2690. In this case, the sharing boundary 2690 may include at least one of a value representing a distance, a received signal strength indicator (RSSI) value corresponding to the distance, and round trip time (RTT) information. The sharing boundary 2690 condition may be transmitted as service data guide information. That is, the device A 2610-1, after taking the image, may transmit first proximity service data including service data guide information that includes the sharing boundary 2690 condition. In this case, only the devices 2610-2 to 2610-11 located within the sharing boundary 2690 may participate in the reception of the second proximity service data.

In an embodiment of the present disclosure in which the device A 2610-1 limits the sharing boundary 2690 of receiving devices, a sharing range may be restricted based on the size of a subject in addition to the camera focal length. Since the size of a subject included in an image is generally inversely proportional to a distance, a sharing range may be restricted based on the size of the subject. For example, the device A 2610-1 may identify the size of a subject (e.g., the size of a face) included in an image, estimate a distance from the size, and specify a reception condition using an RSSI or RTT determined from the distance value or the distance.

In an embodiment of the present disclosure, a sharing range may be restricted based on a phone number. As described above, the synchronized devices 2610-1 to 2610-11 may share device information (e.g., a phone number) when the sharing mode of the camera application is executed. The device A 2610-1 may transmit the image, namely, the second proximity service data only to the devices 2610-2 to 2610-11 included in a contact, namely, a phone number list. In this case, the device A 2610-1 may specify a target terminal ID. The target terminal ID may be transmitted through the first proximity service data. In this case, the devices 2610-2 to 2610-11 which receive the image may also selectively participate in the reception according to whether the phone number of the device A 2610-1 is included in the contact.

According to an embodiment of the present disclosure, a sharing range may be restricted based on a dwell time. Even if device information, for example, phone numbers transmitted from the other devices 2610-2 to 2610-12 are not included in the contact of the device A 2610-1, the device A 2610-1 may include a device that is located within the RSSI boundary of the device A 2610-1 for a predetermined period of time in a reception target device. The predetermined period of time may be defined by a pre-defined number of DWs.

According to an embodiment of the present disclosure, a sharing range may be restricted based on a face recognition result. That is, in the case where a face extracted from a photographed image coincides with a face on another user's already stored image, the corresponding device may be included as a sharing target. For example, the device A 2610-1 may recognize people's faces on an image taken by a camera, and when the faces coincide with an image of another device included in the contact, the device A 2610-1 may select the corresponding device as a target device that will share the image.

Unlike the embodiment of the present disclosure illustrated in FIG. 26B, the device A 2610-1 may include information relating to a transmission period, data information, and the like in first proximity service data, and may not specify separate target device information or a reception condition. In this case, unlike as illustrated in FIG. 26B, all of the devices 2610-2 to 2610-12 that received the first proximity service data may receive second proximity service data.

The example illustrated in FIGS. 26A and 26B uses NAN. However, according to an embodiment of the present disclosure, the example illustrated in FIGS. 26A and 26B may be carried out based on BLE.

Figure 27:
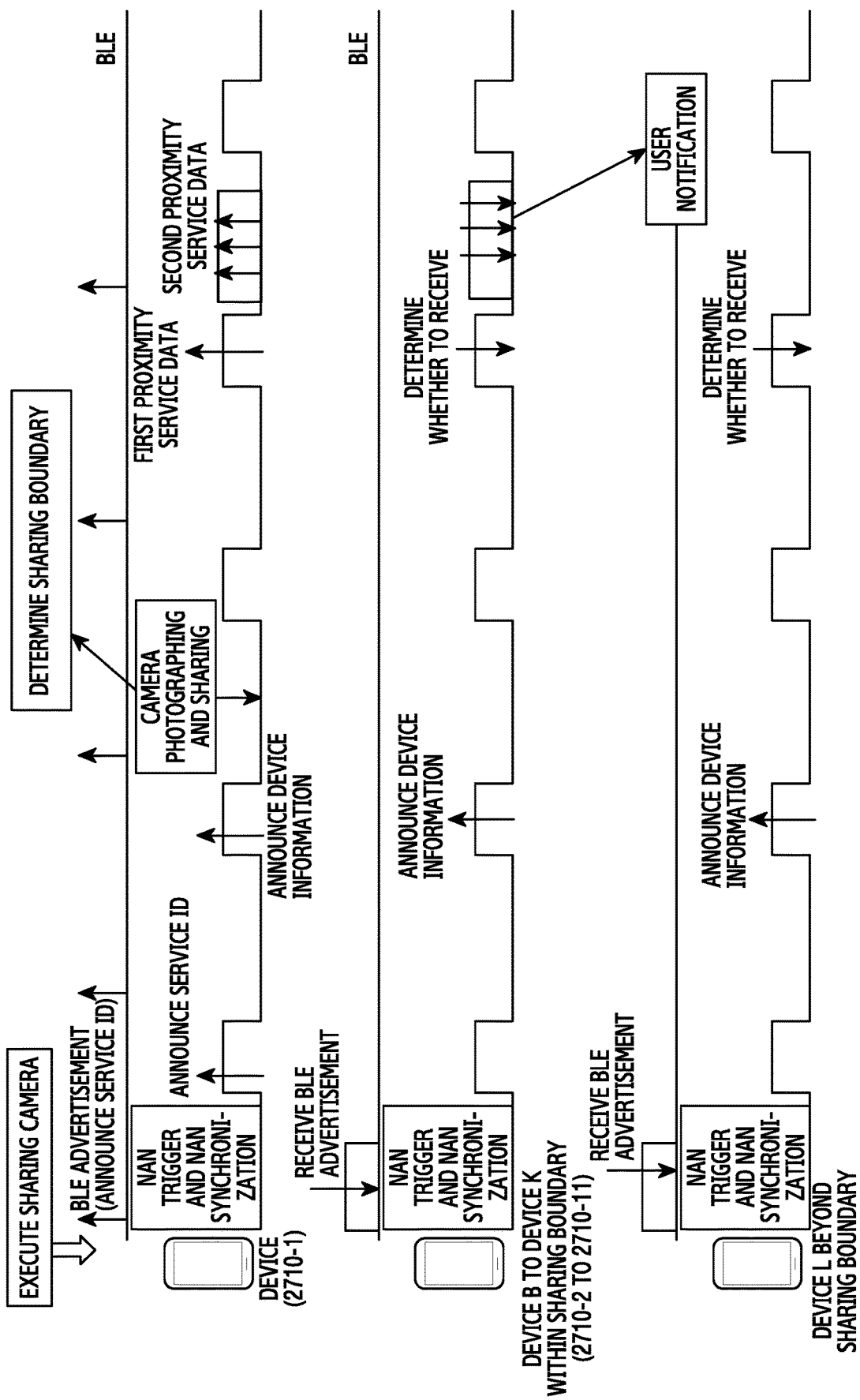
FIG. 27 is a diagram of a method of providing proximity service data according to an embodiment of the present disclosure.

FIG. 27 is a diagram of a method of providing proximity service data according to an embodiment of the present disclosure. FIG. 27 is an example of the case of using both NAN and BLE.

An NAN module may not operate due to power consumption or the use of another communication module (e.g., a Wi-Fi module). In this case, NAN modules of devices may be triggered through a BLE beacon as illustrated in FIG. 27. Similarly to the embodiment illustrated in FIG. 26B, device A 2710-1 announces a service ID in order to inform that a sharing camera service is executed. However, the service ID is transmitted through a BLE beacon. Simultaneously, the device A 2710-1 starts an operation for NAN synchronization. Then, in the case where devices that already operate with NAN exist, the device A 2710-1 may synchronize with the devices. Other devices 2710-2 to 2710-12 that perform a receiving operation in a BLE scan mode receive the BLE beacon and start an NAN synchronization operation. That is, the device A 2710-1 transmits a signal for instructing activation of the NAN module. A device in which NAN is already activated and operates may omit the synchronization operation.

Thereafter, the other devices 2710-2 to 2710-12 may announce device information thereof in response to the announcement of the service ID in cases where the other devices 2710-2 to 2710-12 retain the same service, that is, in cases where the other devices 2710-2 to 2710-12 recognize a sharing mode of a camera application. The device information may include the phone number of a relevant device, an image of the device owner, and the like, and may further include an ID for distinguishing the device owner. In addition, the device A 2710-1 may also transmit the device information.

When an image is taken by the device A 2710-1, the device A 2710-1 may transmit the image to the other devices 2710-2 to 2710-12. In this case, only the limited devices 2710-2 to 2710-11 may share the image. For example, only the devices 2710-2 to 2710-11 that actually participated in taking the image may be defined as sharing targets. The device A 2710-1 which transmits the image may specify the devices 2710-2 to 2710-12 which will receive the image, by adding a sharing boundary condition. For example, a camera measures the distance away from a subject for a focal length before taking an image, and the device A 2710-1 may define the sharing boundary based on the distance information and may transmit information on the sharing boundary. In this case, the sharing boundary may include at least one of a value representing a distance, an RSSI value corresponding to the distance, and RTT information. In this case, only the devices 2710-2 to 2710-11 located within the sharing boundary may participate in the reception of the second proximity service data.

Figure 28A:
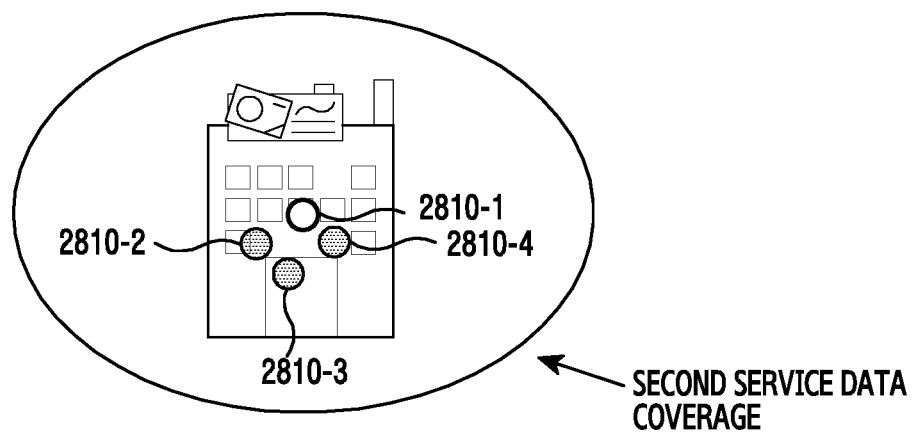
FIGS. 28A and 28B are diagrams of proximity service data transfer according to an embodiment of the present disclosure.
Figure 28B:
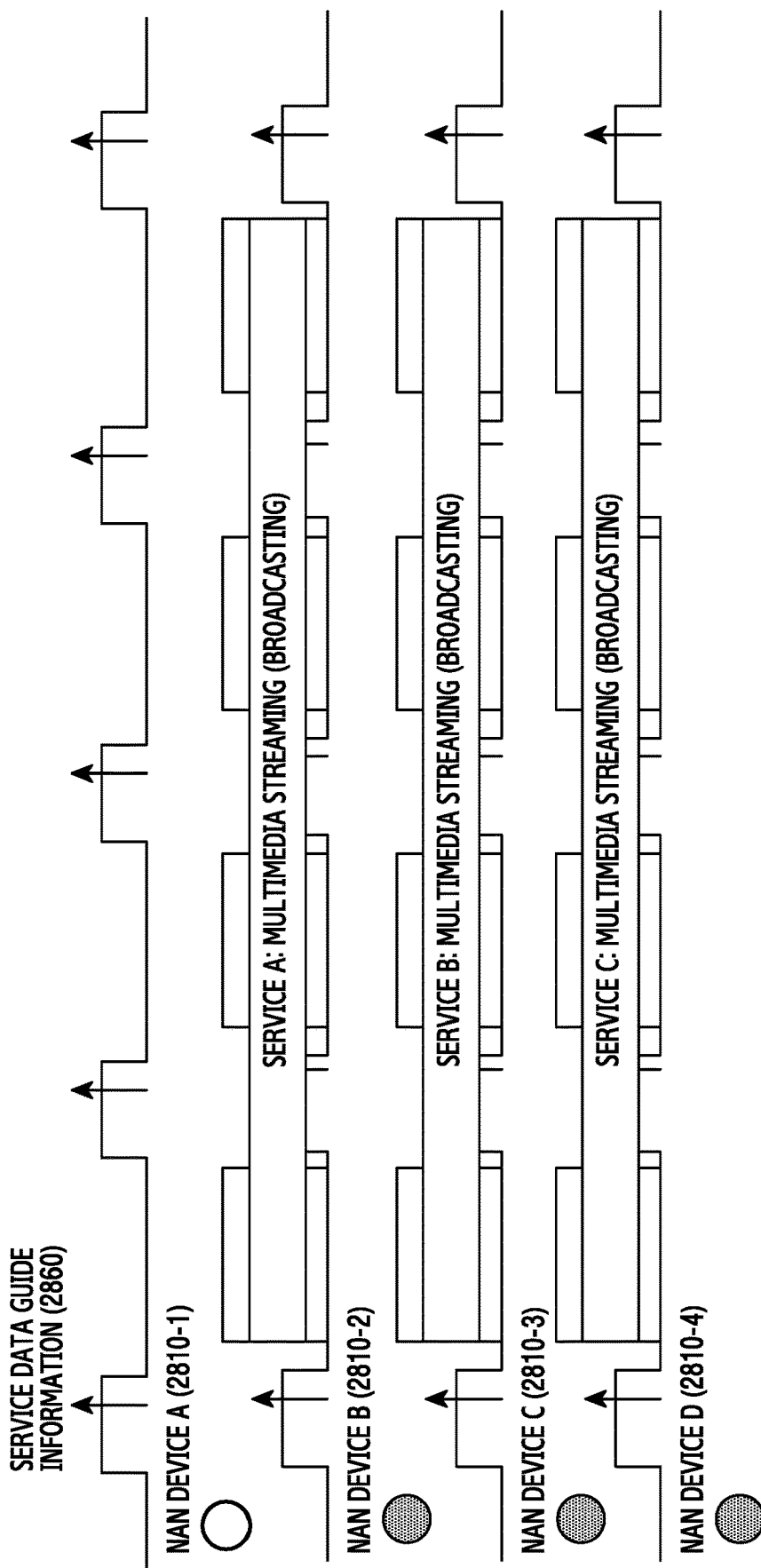

FIGS. 28A and 28B are diagrams of proximity service data transfer according to an embodiment of the present disclosure. A case of providing a multimedia streaming service to customers in a specific store is exemplified in FIGS. 28A and 28B.

Referring to FIG. 28A, devices 2810-1 to 2810-4 are located in a building. That is, the devices 2810-1 to 2810-4 are located in a coverage area where the devices 2810-1 to 2810-4 can communicate with each other. In other words, the devices 2810-1 to 2810-4 are located in a second service data coverage area.

Referring to FIG. 28B, the device A 2810-1 transmits first proximity service data. The first proximity service data may include service data guide information 2860 that contains data description information on second proximity service data, transmission channel related information, transmission period related information, transmitting device information, and the like. In FIG. 28B, the second proximity service data is transmitted by the device A 2810-1 and another device B 2810-2. In this case, the second proximity service data may be divided into a plurality of segments, where each segment may be transmitted by the different devices 2810-2 to 2810-4. The devices 2810-2 to 2810-4 may transmit different service data and may use different channels. Alternatively, in the case where the same transmission channel is used, the transmission periods of the devices 2810-2 to 2810-4 may be determined to be different from each other. In another example, in the case where the same transmission period is used, the devices 2810-2 to 2810-4 may transmit data based on competition according to the Wi-Fi standard.

Accordingly, the service data guide information 2860 transmitted by the device A 2810-1 may include information on the devices 2810-2 to 2810-4. For example, if second proximity service data transmitted by the device B 2810-2 pertains to service A, second proximity service data transmitted by the device C 2810-3 pertains to service B, and second proximity service data transmitted by the device D 2810-3 pertains to service C, the service data guide information 2860 may include guide information for the service A, guide information for the service B, and guide information for the service C. For example, service A may provide a movie, service B may provide a television program, and service C may provide music.

In the case where devices of customers that visit a store send feedback messages, the second proximity service data may be transmitted to selected devices. In this case, the second proximity service data may be transmitted through at least one scheme of unicasting, multicasting, and broadcasting. Alternatively, in order to communicate only in the coverage area illustrated in FIG. 28A, an RSSI boundary for receiving the second proximity service data may be restricted to the range of the store. In this case, a service may be limited to the customers in the store.

Although FIGS. 28A and 28B are illustrated as being carried out based on NAN, an embodiment of the present disclosure may be carried out based on various other connectivity methods.

Figure 29A:
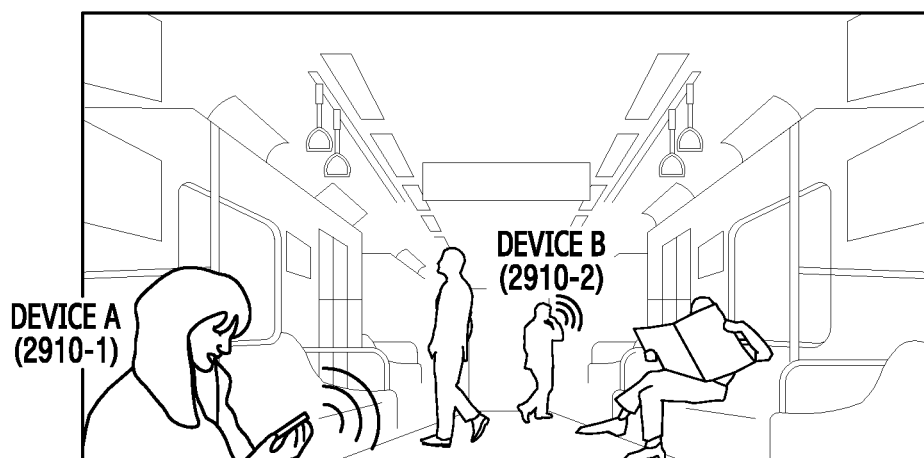
FIGS. 29A and 29B are diagrams of proximity service data transfer according to an embodiment of the present disclosure.
Figure 29B:
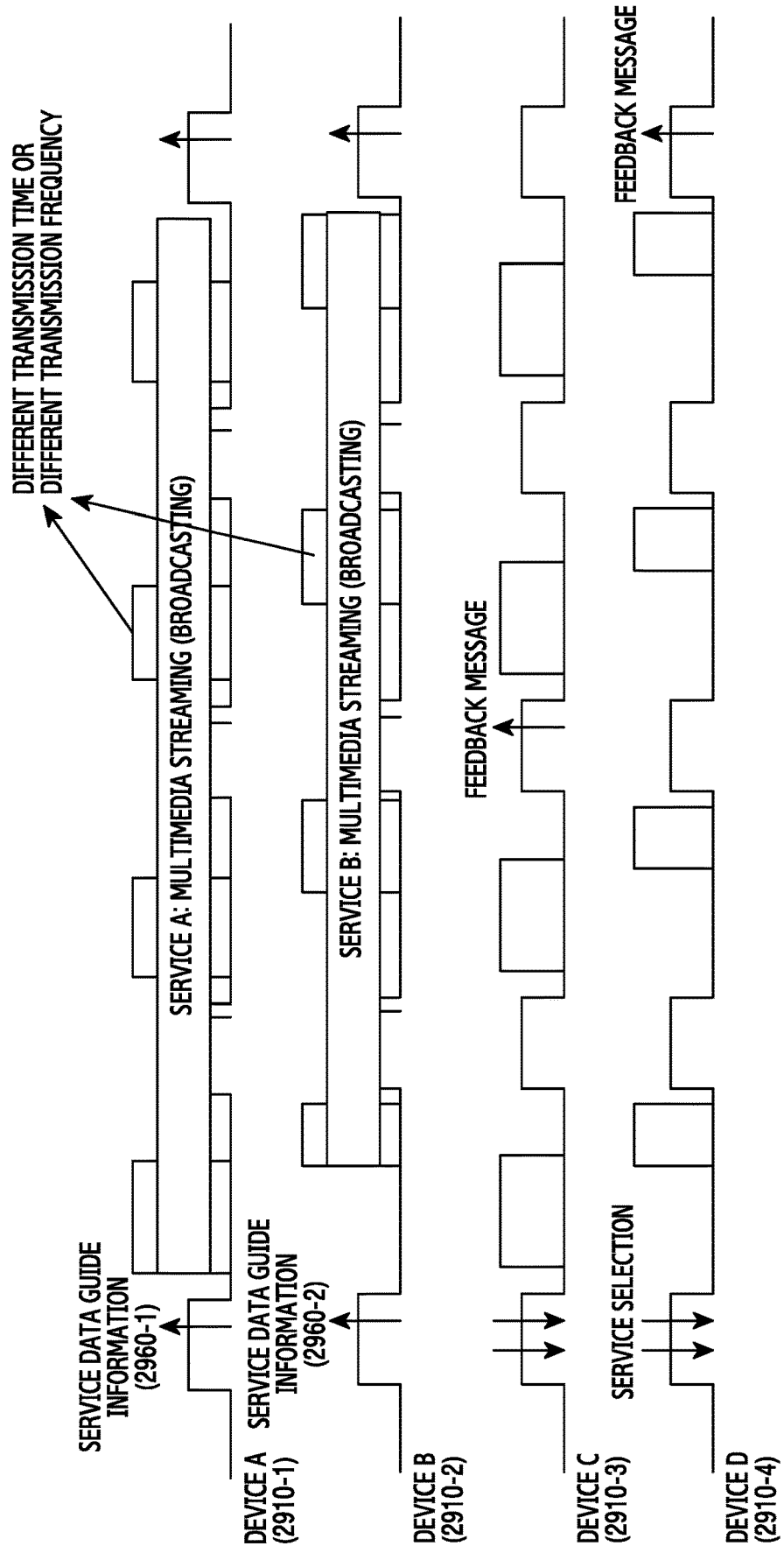

FIGS. 29A and 29B are diagrams of proximity service data transfer according to an embodiment of the present disclosure. FIGS. 29A and 29B illustrate an example of a service scenario for establishing a personal music broadcast between users that are in a public place, such as public transportation, for a predetermined period of time.

Referring to FIGS. 29A and 29B, device NAN A 2910-1 and device NAN B 2910-2 may transmit, through first proximity service data, service data guide information 2960-1 and 2960-2 that include service data description information, a transmission channel, transmitting device information, and time information for second proximity service data. In this case, any surrounding device may provide a personal music broadcast. In FIG. 29A, the two devices A 2910-1 and B 2910-2 establish personal music broadcasts. Data of the personal music broadcasts may be included in second proximity service data, and may include all music or streaming services that a terminal owner wants to share.

Referring to FIG. 29B, the device A 2910-1 and the device B 2910-2 establish music broadcasts, respectively. Since the devices provide the different music broadcasts, the device A 2910-1 transmits service data guide information 2960-1 for service A, and the device B 2910-2 transmits service data guide information 2960-2 for service B. In the case where the plurality of transmitting devices A 2910-1 and B 2910-2 establish the music broadcasts, at least one of a channel and time for transferring second proximity service data may be different. Alternatively, the transmitting devices A 2910-1 and B 2910-2 may transmit the second proximity service data based on competition in the same channel and transmission period.

The transmitting devices A 2910-1 and B 2910-2 may provide the second proximity service data including data of the music broadcasts to all surrounding devices synchronized with NAN through a broadcasting scheme. Further, in the case where first proximity service data for informing that a music broadcast is established is transmitted, and thereafter surrounding devices transmit responses to the establishing of the music broadcast within a pre-defined DW, the transmitting devices A 2910-1 and B 2910-2 may broadcast, multicast, or unicast the second proximity service data only for the devices that transmitted the responses.

As illustrated in FIG. 29B, in the case where the plurality of music broadcasts are established, receiving devices C 2910-3 and D 2910-4 may select a service to be received by a user selection. In addition, the receiving devices C 2910-3 and D 2910-4, while receiving a broadcast, may transmit, through NAN, feedback messages including user inputs with an assessment of the broadcast.

Although FIGS. 29A and 29B are illustrated as being carried out based on NAN, an embodiment of the present disclosure may be carried out based on various other connectivity methods.

In general, when device discovery for connection is performed, only brief information, such as a brief name of a peer device, an MAC address, an IP address, etc. is identified so that there is a deficiency in the selection of a target for connection or file transmission. Accordingly, in FIGS. 30A and 30B, which illustrate an application example for overcoming a problem caused by a deficiency in information on a counterpart, all synchronized devices may transmit a larger amount of device introduction information in a certain channel and transmission period when a certain device makes a discovery request in a network synchronized through NAN.

Figure 30A:
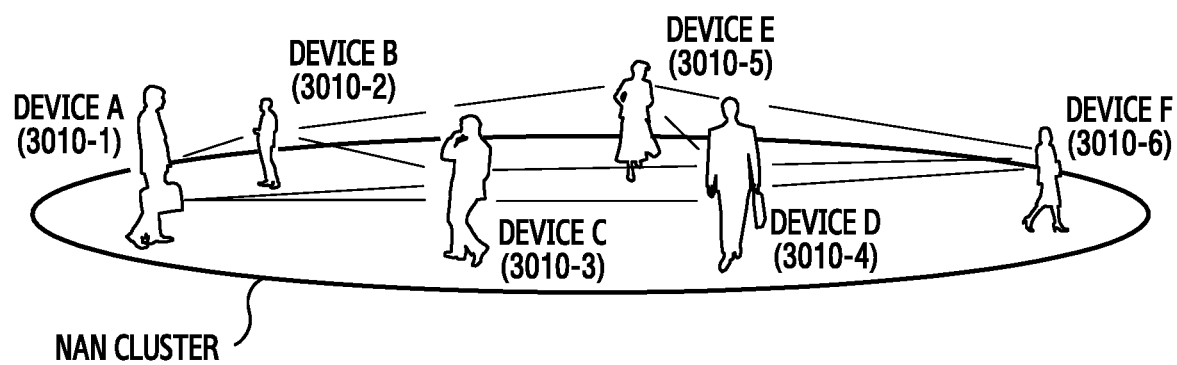

FIGS. 30A and 30B are diagrams of proximity service data transfer according to an embodiment of the present disclosure. FIGS. 30A and 30B illustrate an example of acquiring and displaying richer counterpart information during discovery between devices.

As illustrated in FIG. 30A, a plurality of devices A 3010-1 to F 3010-6 are located in a single NAN cluster. Accordingly, each of the plurality of devices A 3010-1 to F 3010-6 may discover the remaining devices through a discovery procedure.

Referring to FIG. 30B, in the case where discovery is requested in accordance with a condition of a user or a device, the device A 3010-1 may transmit an additional message with a meaning of a discovery request in addition to first proximity service data information. The additional message may include a certain service name or ID or a pre-defined protocol name or ID. The first proximity service data may include attributes of service data to be transmitted. In other words, service data guide information 3060 included in the first proximity service data may include description information for introduction/advertisement information. For example, the description information may inform that the second proximity service data includes device introduction/advertisement information, such as a representative image, a greeting message, an emoticon, a business card, and the like. That is, the introduction/advertisement information may be included in second proximity service information according to an embodiment of the present disclosure. Further, the first proximity service data may include a transmission channel, a transmission period, and transmitting device information.

The transmitting device information may be indicated as all devices, including the transmitting device, which constitute a surrounding NAN network. In this case, MAC addresses, IP addresses, and device names of all surrounding devices B 3010-2 to F 3010-6 including a device that triggers discovery by transmitting the first proximity service data may be included in the transmitting device information. In addition, a service name, a service ID, and a service protocol name and ID may be further included in the transmitting device information in order to involve only a device that drives a service to be transmitted in discovery. Alternatively, a name and ID for representing a group, such as an NAN cluster ID, may be included in the transmitting device information in order to request discovery from all devices synchronized with an NAN network.

The devices B 3010-2 to F 3010-6 included in an NAN cluster transmit their introduction information in the channel and transmission period 3080 which are specified by the device A 3010-1 that requested the discovery. The introduction information may be transmitted based on competition.

In FIG. 30B, the device A 3010-1 transmits device introduction information 3070-1, the device B 3010-2 transmits device introduction information 3070-2, the device C 3010-3 transmits device introduction information 3070-3, the device D 3010-4 transmits device introduction information 3070-4, the device E 3010-5 transmits device introduction information 3070-5, and the device F 3010-6 transmits device introduction information 3070-6. Accordingly, each of the devices A 3010-1 to F 3010-6 may receive introduction information of the other devices.

The introduction information may include device introduction/advertisement information that includes a representative image, a greeting message, an emoticon, a business card, and the like of each device. In addition, the device A 3010-1 may receive device introduction information of all the surrounding devices B 3010-2 to F 3010-6, and may express the device introduction information as a discovery result. Likewise, the devices B 3010-2 to F 3010-6 other than the device A 3010-1 may also receive the device introduction information, and may utilize the device introduction information as the discovery result.

Figure 31A:
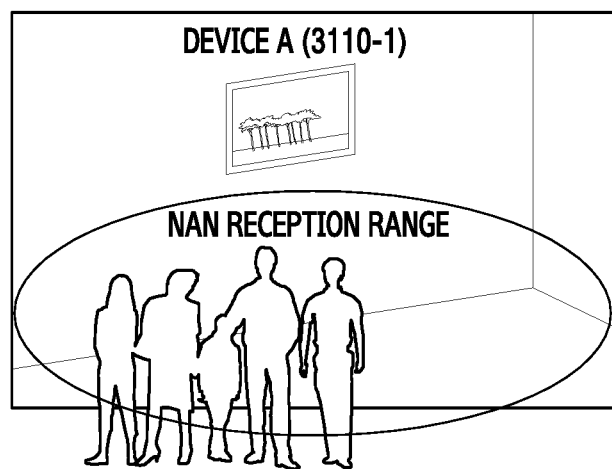
FIGS. 31A, 31B, and 31C are diagrams of proximity service data transfer according to an embodiment of the present disclosure.
Figure 31B:
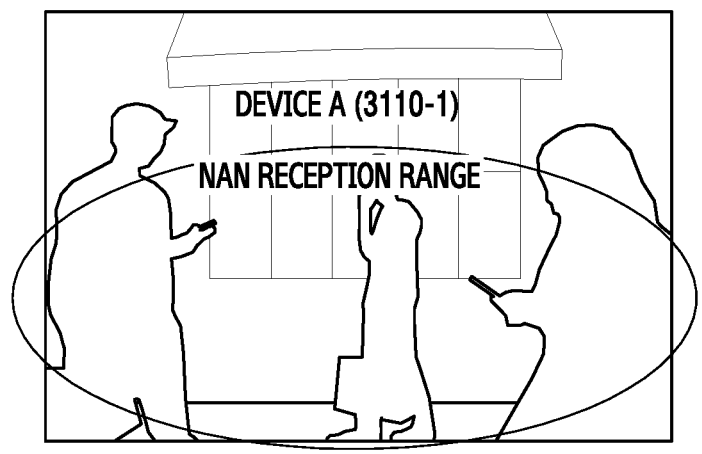
Figure 31C:
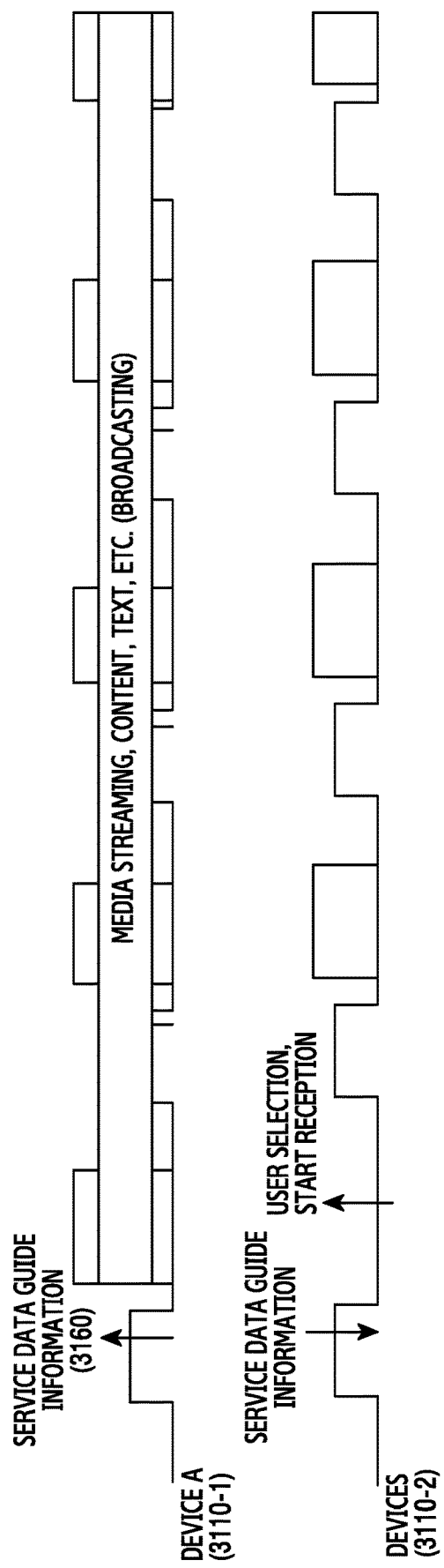

FIGS. 31A, 31B, and 31C are diagrams of proximity service data transfer according to an embodiment of the present disclosure. FIGS. 31A, 31B, and 31C illustrate an example of the case where a proximity service data transfer method is utilized in a museum, a store, and the like.

FIG. 31A illustrates a situation where device A 3110-1, that transmits an explanation of a picture in a museum or an art gallery, is present in the museum or art gallery, and FIG. 31B illustrates a situation where device A 3110-1, that transmits explanation of a product in a store, is present in the store. The device A 3110-1 may transmit data including the explanation of a work or the explanation of a product to other devices 3110-2 located in a predetermined reception coverage area. The coverage area may be adjusted by control of power transmitted to the vicinity of the picture or the product. Alternatively, the device A 3110-1 may indicate an RSSI, a distance, an RTT, and the like as a reception condition for second proximity service data.

Referring to FIG. 31C, the device A 3110-1 transmits first proximity service data that includes service data guide information 3160. The service data guide information 3160 may include a transmission channel, description information, transmission time information, and the like for second proximity service data. The other devices 3110-2 that receive the service data guide information 3160 receive the first proximity service data and notify a user of the data reception. Accordingly, the user may approve the provision of additional information as a response to the notification. In the case where the user approves the provision of the additional information, the receiving devices 3110-2 may receive the second proximity service data according to the service data guide information 3160 included in the first proximity service data.

Figure 32:
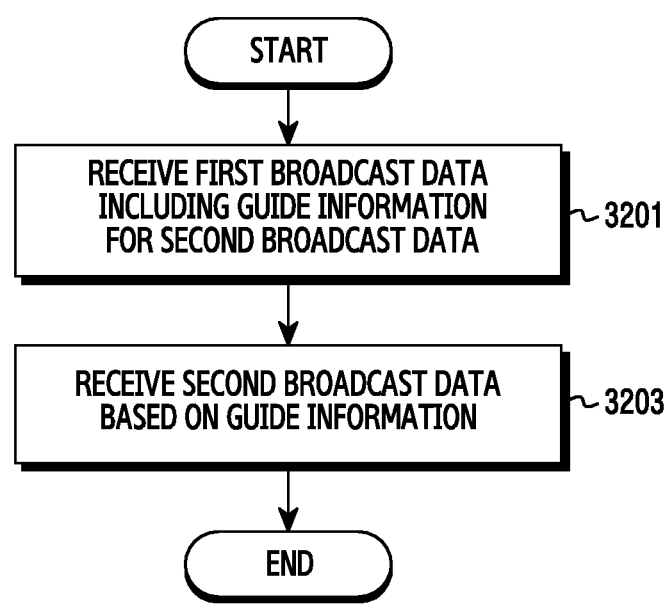
FIG. 32 is a flowchart of a method of an electronic device according to an embodiment of the present disclosure.

FIG. 32 is a flowchart of a method of an electronic device according to an embodiment of the present disclosure. FIG. 32 is an example of receiving proximity service data, namely, advertisement data by the electronic device.

Referring to FIG. 32, the electronic device may receive first proximity service data in operation 3201. In this case, the first proximity service data includes guide information necessary for receiving second proximity service data. In other words, the first proximity service data includes guide information that includes information on the second proximity service data. In this case, the second proximity service data is data previously established when the first proximity service data is transmitted. The information on the second proximity service data may be associated with a resource (e.g., a transmission time point) for transferring the second proximity service data, a transmission method for transmitting the second proximity service data, an attribute for content of the second proximity service data, a transmitter or receiver of the second proximity service data, and the like. For example, the guide information may include at least one of information on a device that transmits the second proximity service data, information on a transmission method for transmitting the second proximity service data, information on a channel for transferring the second proximity service data, information on a transmission start time of the second proximity service data, information on a transmission end time of the second proximity service data, information on a transmission cycle of the second proximity service data, information on a transmission period of the second proximity service data, information on security of the second proximity service data, information on a period allocated in order to exchange a key for the second proximity service data, information on a condition for determining whether to receive the second proximity service data, description information on content included in the second proximity service data, identification information of a target that will receive the second proximity service data, and information for determining a geographical reception boundary of the second proximity service data.

Then, the electronic device may receive the second proximity service data based on the guide information in operation 3203. In this case, the second proximity service data may be received from a device that transmitted the first proximity service data, or may be received from a device other than the device that transmitted the first proximity service data.

In FIG. 32, the electronic device receives the second proximity service data. However, according to an embodiment of the present disclosure, the operation 3203 may be omitted. In this case, the electronic device may determine whether to receive the second proximity service data, and, when not receiving the second proximity service data, the electronic device may transmit the first proximity service data to another electronic device. That is, the electronic device may transfer the task of receiving the second proximity service data to the other electronic device. For example, the electronic device may determine whether to receive the second proximity service data based on at least one of whether a bearer for receiving the second proximity service data is supported, a presence or absence of a display unit, a supported resolution of the display unit, the size of the display unit, whether functionality necessary for outputting the second proximity service data is supported, whether the electronic device is in a sleep state, a residual quantity of a battery, a distance away from a device that transmits the second proximity service data, a signal quality of a signal including the first proximity service data, a user command, identification information of a service to which the second proximity service data pertains, and identification information of the device that transmits the second proximity service data.

The electronic device may receive a key for the second proximity service data for a first period indicated by the guide information, and may receive the second proximity service data for a second period indicated by the guide information. In this case, the key may be synchronized based on a connection or no connection.

The electronic device may perform an operation of IP allocation before the operation 3201. For example, the electronic device may allocate an IP address thereof according to a pre-defined rule, and may transmit the IP address to at least one surrounding device. In this case, when the IP address collides with an IP address allocated by another device, that is, when it is identified that the other device has allocated an IP address identical to the IP address, the electronic device transmits a message for informing of the collision of the IP address. Accordingly, the other electronic device, which has determined the same IP address after the electronic device, reallocates another IP address.

Figure 33:
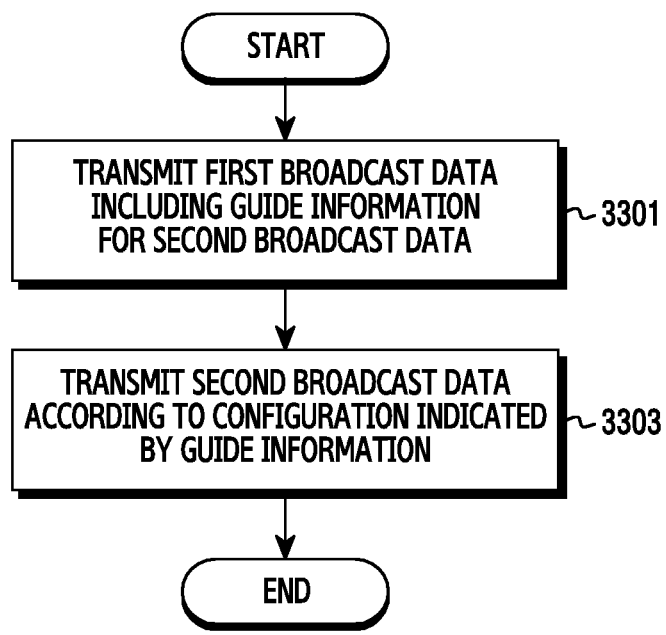
FIG. 33 is a flowchart of a method of an electronic device according to an embodiment of the present disclosure.

FIG. 33 is a flowchart of a method of an electronic device according to an embodiment of the present disclosure. FIG. 33 is an example of transmitting proximity service data, namely, advertisement data by the electronic device.

Referring to FIG. 33, the electronic device may transmit first proximity service data in operation 3301. The first proximity service data includes guide information necessary for receiving second proximity service data. In other words, the first proximity service data includes guide information that includes information on the second proximity service data. For example, the information on the second proximity service data may be associated with a resource (e.g., a transmission time point) for transferring the second proximity service data, a transmission method for transmitting the second proximity service data, an attribute for content of the second proximity service data, a transmitter or receiver of the second proximity service data, and the like. For example, the guide information may include at least one of information on a device that transmits the second proximity service data, information on a transmission method for transmitting the second proximity service data, information on a channel for transferring the second proximity service data, information on a transmission start time of the second proximity service data, information on a transmission end time of the second proximity service data, information on a transmission cycle of the second proximity service data, information on a transmission period of the second proximity service data, information on security of the second proximity service data, information on a period allocated in order to exchange a key for the second proximity service data, information on a condition for determining whether to receive the second proximity service data, description information on content included in the second proximity service data, identification information of a target that will receive the second proximity service data, and information for determining a geographical reception boundary of the second proximity service data.

Then, the electronic device may transmit the second proximity service data according to a configuration indicated by the guide information in operation 3303. The first and second proximity service data may include advertisement content, and the second proximity service data may include high-capacity data, as compared to the first proximity service data.

In FIG. 33, the electronic device includes the guide information in the first proximity service data. However, according to an embodiment of the present disclosure, when a pre-defined condition is satisfied, the electronic device may transmit the first proximity service data that does not include the guide information. For example, the pre-defined condition may include at least one of whether a device to receive the second proximity service data exists within a predetermined distance, whether a device for using the device to which the second proximity service data pertains exists within a predetermined distance, capability information of a device that received the first proximity service data, a state of the device that received the first proximity service data, a distance from the device that received the first proximity service data, a signal quality for the device that received the first proximity service data, and whether the device that received the first proximity service data is included in a pre-defined list.

In FIG. 33, the electronic device transmits the second proximity service data. However, according to an embodiment of the present disclosure, the operation 3303 may be omitted. In this case, the electronic device may control another electronic device to transmit the second proximity service data in a period indicated by the guide information.

Prior to operation 3301, the electronic device may transmit a signal requesting the activation of a second communication method for transferring the first proximity service data through a first communication method. Accordingly, the electronic device may perform synchronization for the second communication method with at least one other electronic device.

Figure 34:
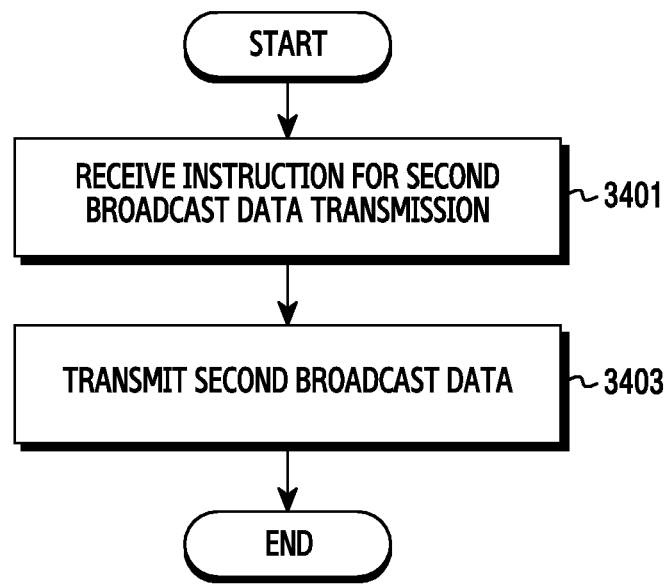
FIG. 34 is a flowchart of a method of an electronic device according to an embodiment of the present disclosure.

FIG. 34 is a flowchart of a method of an electronic device according to an embodiment of the present disclosure. FIG. 34 is an example of transmitting proximity service data, namely, advertisement data by the electronic device under control of another electronic device.

Referring to FIG. 34, the electronic device may receive an instruction for second proximity service data transmission in operation 3401. The instruction is received from another electronic device that transmitted the first proximity service data. The electronic device and the other electronic device may be connected through short-range communication or an external network. The first and second proximity service data may include advertisement content, and the second proximity service data may include high-capacity data, as compared to the first proximity service data.

Then, the electronic device may transmit the second proximity service data in operation 3403. The electronic device transmits the second proximity service data according to a configuration indicated by guide information that is included in the first proximity service data transmitted by the other electronic device. For example, the guide information may include at least one of information on a device that transmits the second proximity service data, information on a transmission method for transmitting the second proximity service data, information on a channel for transferring the second proximity service data, information on a transmission start time of the second proximity service data, information on a transmission end time of the second proximity service data, information on a transmission cycle of the second proximity service data, information on a transmission period of the second proximity service data, information on security of the second proximity service data, information on a period allocated in order to exchange a key for the second proximity service data, information on a condition for determining whether to receive the second proximity service data, description information on content included in the second proximity service data, identification information of a target that will receive the second proximity service data, and information for determining a geographical reception boundary of the second proximity service data. At this time, the second proximity service data is transmitted through a proximity service that uses low power.

In FIG. 34, the electronic device receives an instruction for the second proximity service data transmission. However, according to an embodiment of the present disclosure, operation 3401 may be omitted. For example, in the case where the electronic device is set in advance to transmit the second proximity service data, the operation 3401 may be omitted.

According to an embodiment of the present disclosure, an electronic device may synchronize guide information with other electronic device. For example, the electronic device may notify the other electronic device of the guide information. Alternatively, the electronic device may be provided with the guide information from the other electronic device. In an embodiment of the present disclosure, among the electronic device and the other electronic device, one may request guide information, and a procedure approved by the other may be performed. In an embodiment of the present disclosure, the guide information may be synchronized by an operator offline.

The embodiments disclosed herein are provided merely to easily describe technical details of the present disclosure and to facilitate understanding of the present disclosure, but are not intended to limit the scope of the present disclosure. Therefore, various modifications and changes may be made without departing from the scope and spirit of the present disclosure as defined by the appended claims and their equivalents.

What is claimed is:

1. An electronic device operable in a neighbor awareness networking (NAN) cluster, the electronic device comprising:
a wireless fidelity (Wi-Fi) transceiver; and
a processor, coupled with the Wi-Fi transceiver, configured to:
perform a time synchronization with at least one device in the NAN cluster, wherein the at least one device comprises an external electronic device,
after performing the time synchronization, receive, from the external electronic device through the Wi-Fi transceiver, a frame including first data within at least one discovery window (DW) among a plurality of DWs, wherein the first data comprises channel information for transferring second data, and transmission time information for transferring the second data, and
control the Wi-Fi transceiver to receive the second data at a channel corresponding to the channel information during a time duration corresponding to the transmission time information, wherein the transmission time information includes first information for indicating a start of the time duration indicated by a relative time with respect to a discovery window to which the electronic device and the external electronic device is synchronized.

2. The electronic device of claim 1, wherein the Wi-Fi transceiver is configured to switch from a low-power mode to an active mode to receive the second data at the channel corresponding to the channel information during the time duration corresponding to the transmission time information,
wherein power consumption of the Wi-Fi transceiver in the low-power mode is less than power consumption of the Wi-Fi transceiver in the active mode.

3. The electronic device of claim 1, wherein the first data further comprises at least one of interface address information for transmitting the second data by the external electronic device, or interface address information for receiving the second data by a reception device.

4. The electronic device of claim 1, wherein the frame comprises at least one of a service discovery frame or an action frame.

5. The electronic device of claim 1, wherein the transmission time information includes at least one of a start offset, a time duration, or a period.

6. The electronic device of claim 1, wherein the channel is outside the plurality of DWs, and
wherein the time duration is outside the plurality of DWs.

7. The electronic device of claim 1, wherein the first data further comprises a security key, and
wherein the security key is configured for decrypting the second data.

8. The electronic device of claim 1, further comprising:
a Bluetooth low energy (BLE) module;
wherein the processor is further configured to:
receive, through the BLE module, a BLE signal comprising a service identifier, the signal for triggering an NAN operation of the Wi-Fi transceiver,
in response to the service identifier corresponding to an NAN operation, perform the time synchronization with at least one device in the NAN cluster for providing a service indicated by the service identifier, the service being associated with an external electronic device that transmit the BLE signal.

9. The electronic device of claim 1, wherein the processor is further configured to power on the Wi-Fi transceiver in response to a service identifier corresponding to an NAN operation.

10. The electronic device of claim 1, wherein the processor is further configured to:
execute an application providing a sharing service for a multimedia content, and
provide, using the executed application, the received second data as the multimedia content,
wherein the multimedia content comprises at least one of an image, a video, music, an emoticon, a business card, a greeting message, or advertisement content.

11. The electronic device of claim 1, wherein the transmission time information includes information for receiving second data during a plurality of time intervals.

12. The electronic device of claim 1, wherein the first data comprises information on a device for transmitting the second data and information on a target device receiving the second data.

13. The electronic device of claim 1, wherein the processor is further configured to:
receive a signal for discovery through the Wi-Fi transceiver, and
perform the time synchronization based on the received signal for discovery.

14. An electronic device operable in a neighbor awareness networking (NAN) cluster, the electronic device comprising:
a wireless fidelity (Wi-Fi) transceiver; and
a processor, coupled with the Wi-Fi transceiver, configured to:
perform a time synchronization with at least one device in the NAN cluster,
after performing the time synchronization, transmit, to the at least one device through the Wi-Fi transceiver, a frame including first data within at least one discovery window (DW) among a plurality of DWs, wherein the first data comprises channel information for transferring second data, and transmission time information for transferring the second data, and
control the Wi-Fi transceiver to transmit the second data at a channel corresponding to the channel information during a time duration corresponding to the transmission time information, wherein the transmission time information includes first information for indicating a start of the time duration indicated by a relative time with respect to a discovery window to which the electronic device and the external electronic device are synchronized.

15. The electronic device of claim 2, wherein the Wi-Fi transceiver is configured to switch from a low-power mode to an active mode to transmit the second data at the channel corresponding to the channel information during a time duration corresponding to the transmission time information, wherein power consumption of the Wi-Fi transceiver in the low-power mode is less than the power consumption of the Wi-Fi transceiver in the active mode.

16. The electronic device of claim 14, wherein the first data further comprises at least one of interface address information for transmitting the second data by the electronic device or interface address information for receiving the second data by a reception device.

17. The electronic device of claim 14, wherein the frame comprises at least one of a service discovery frame or an action frame.

18. The electronic device of claim 14, wherein the time transmission information further includes at least one of a start offset, a time duration, or a period.

19. The electronic device of claim 14, wherein the channel is outside the plurality of DWs, and wherein the time duration is outside the plurality of DWs.

20. The electronic device of claim 14, wherein the first data further comprises a security key configured for decrypting the second data.

21. The electronic device of claim 14, wherein the processor is further configured to:

execute an application providing a sharing service for a multimedia content, and in response to executing the application, perform the time synchronization with the at least one device in the NAN cluster for providing the sharing service, wherein the second data comprises the multimedia content associated with the application, and wherein the comprises at least one of an image, a video, music, an emoticon, a business card, a greeting message, or advertisement content.

22. The electronic device of claim 14, wherein the transmission time information includes information for receiving second data during a plurality of time intervals.

23. The electronic device of claim 14, wherein the first data comprises information on a device for transmitting the second data and information on a target device receiving the second data.

24. The electronic device of claim 14, wherein the processor is further configured to:

receive a signal for discovery through the Wi-Fi transceiver, and perform the time synchronization based on the received signal for discovery.

* * * * *